United States Patent
Teixeira et al.

(10) Patent No.: US 12,103,572 B2
(45) Date of Patent: Oct. 1, 2024

(54) SYSTEMS AND METHODS FOR ESTIMATING VEHICLE LOCATIONS

(71) Applicant: Humatics Corporation, Waltham, MA (US)

(72) Inventors: Pedro Teixeira, Cambridge, MA (US); Michael Kuhlman, Malden, MA (US); Reza Rezaie, Woodland Hills, CA (US); Joshua Senna, San Mateo, CA (US); Aaron Whittemore, Millville, MA (US)

(73) Assignee: Humatics Corporation, Waltham, MA (US)

(*) Notice: Subject to any disclaimer, the term of this patent is extended or adjusted under 35 U.S.C. 154(b) by 0 days.

(21) Appl. No.: 18/193,575

(22) Filed: Mar. 30, 2023

(65) Prior Publication Data

US 2023/0311961 A1 Oct. 5, 2023

Related U.S. Application Data

(60) Provisional application No. 63/326,130, filed on Mar. 31, 2022.

(51) Int. Cl.
*B61L 25/02* (2006.01)
*G01S 5/02* (2010.01)
(Continued)

(52) U.S. Cl.
CPC .......... *B61L 25/028* (2013.01); *B61L 25/026* (2013.01); *G01S 5/0264* (2020.05);
(Continued)

(58) Field of Classification Search
CPC .... B61L 3/008; B61L 25/021; B61L 15/0072; B61L 25/026; B61L 25/025;
(Continued)

(56) References Cited

U.S. PATENT DOCUMENTS 7,725,252 B2 5/2010 Heddebaut et al.
8,063,825 B1 11/2011 Yang
(Continued)

FOREIGN PATENT DOCUMENTS

CN 110228506 A 9/2019
WO WO 2021/092149 A1 5/2021

OTHER PUBLICATIONS

Burroughs, Humatics and Siemens to develop Ultra Wideband specification for MTA. International Railway Journal. Jul. 2021. 1 page. https://www.railjournal.com/signalling/humatics-and-siemens-to-develop-ultra-wideband-specification-for-mta/#:~:text=The%20New%20York%20Metropolitan%20Transit,UWB%20in%20conjunction%20with%20CBTC.
(Continued)

*Primary Examiner* — John Kwon
(74) *Attorney, Agent, or Firm* — Wolf, Greenfield & Sacks, P.C.

(57) ABSTRACT

Described herein are techniques for determining motion characteristics of trains traveling along a train track. In some embodiments, a processor may determine an estimated position of a train using an observed position obtained using one or more UWB antennas and an observed position obtained using one or more GNSS receivers. In some embodiments, a processor may access information specifying a geometry of a train track and determining the position of a train along the train track using an observed position determined using one or more UWB antennas and/or GNSS receiver(s) and the information specifying the geometry of the train track. In some embodiments, a processor may determine estimated positions of a train using the geometry of the train track and at least one observation of the train obtained using one or more positioning devices and select the position of the train from among the estimated positions.

20 Claims, 20 Drawing Sheets

(51) Int. Cl.
  *G01S 19/39* (2010.01)
  *G01S 19/47* (2010.01)
  *G01S 19/49* (2010.01)
(52) U.S. Cl.
  CPC ........ *G01S 5/02695* (2020.05); *G01S 19/393* (2019.08); *G01S 19/47* (2013.01); *G01S 19/49* (2013.01); *G01S 2205/01* (2020.05)
(58) Field of Classification Search
  CPC ...... B60W 30/09; B60W 40/04; B60W 50/16; B60W 2050/143; B60W 2720/10; B60W 2050/146; B60W 2420/42; B60W 2520/10; B60W 2520/28
  See application file for complete search history.

(56) References Cited

U.S. PATENT DOCUMENTS

| | | | |
|---|---|---|---|
| 8,477,067 | B2 | 7/2013 | Kanner |
| 11,290,084 | B2 | 3/2022 | Nielsen et al. |
| 11,529,981 | B2 | 12/2022 | Fiquet |
| 2005/0006572 | A1 | 3/2005 | Meyer et al. |
| 2005/0065726 | A1 | 3/2005 | Meyer et al. |
| 2014/0229096 | A1 | 8/2014 | Carlson et al. |
| 2016/0349362 | A1 | 12/2016 | Rohr et al. |
| 2018/0045807 | A1 | 2/2018 | Senna et al. |
| 2019/0054942 | A1 | 2/2019 | Carlson |
| 2019/0283787 | A1 | 9/2019 | Carlson et al. |
| 2019/0337545 | A1 | 11/2019 | Carlson et al. |
| 2020/0317235 | A1 | 10/2020 | Carlson et al. |
| 2021/0046961 | A1* | 2/2021 | Whittemore ............ B61L 23/06 |
| 2021/0107537 | A1* | 4/2021 | Ross ..................... B61L 25/025 |
| 2021/0107546 | A1* | 4/2021 | Ross ....................... B61L 27/04 |
| 2021/0129878 | A1 | 5/2021 | Senna et al. |
| 2021/0129881 | A1* | 5/2021 | Senna ..................... B61L 27/70 |
| 2021/0155275 | A1 | 5/2021 | Fisher et al. |
| 2022/0080955 | A1 | 3/2022 | Diamond et al. |
| 2022/0084398 | A1 | 3/2022 | Zhang et al. |
| 2022/0135096 | A1* | 5/2022 | Revol ................... B61L 25/025 701/19 |
| 2022/0234634 | A1 | 7/2022 | Beach et al. |
| 2022/0345201 | A1 | 10/2022 | Nishimoto et al. |
| 2023/0078911 | A1 | 3/2023 | Resnik |
| 2023/0311962 | A1 | 10/2023 | Teixeira et al. |
| 2023/0314550 | A1 | 10/2023 | Kuhlman et al. |

OTHER PUBLICATIONS

Crapart et al., 5G positioning and hybridization with GNSS observations. ITSNT 2018, International Technical Symposium on Navigation and Timing. Oct. 13, 2018. 8 pages.

Destino et al., Performance analysis of hybrid 5G-GNSS localization. 2018 52nd Asilomar Conference on Signals, Systems, and Computers. Oct. 28, 2018:8-12.

Maymo-Camps et al., 5G positioning and hybridization with GNSS observations. Proceedings of the International Technical Symposium on Navigation and Timing (ITSNT), Toulouse, France Nov. 13, 2018. 7 pages.

Mueck et al., 5G Champion-Rolling out 5G at 2018 Winter Olympic Games. IEEE Globecom. Dec. 2016. 6 pages.

Otegui et al., Evaluation of experimental GNSS and 10-DOF MEMS IMU measurements for train positioning. IEEE Transactions on Instrumentation and Measurement. Jun. 5, 2018;68(1):269-79.

Spinsante et al., Hybridized-GNSS approaches to train positioning: Challenges and open issues on uncertainty. Sensors. Mar. 29, 2020;20(7):1885. 17 pages.

Wang et al., Adaptive Threshold for Zero-Velocity Detector in ZUPT-Aided Pedestrian Inertial Navigation. IEEE Sensors Letters. Oct. 2019. 4 pages.

U.S. Appl. No. 18/193,580, filed Mar. 30, 2023, Kuhlman et al.

U.S. Appl. No. 18/193,584, filed Mar. 30, 2023, Teixeira et al.

International Search Report and Written Opinion for International Application No. PCT/US2023/065176 mailed Aug. 16, 2023.

Xue et al., A bank of Kalman filters and a robust Kalman filter applied in fault diagnosis of aircraft engine sensor/actuator. IEEE Second International Conference on Innovative Computing, Information and Control (ICICIC 2007). Sep. 2007. 4 pages.

* cited by examiner

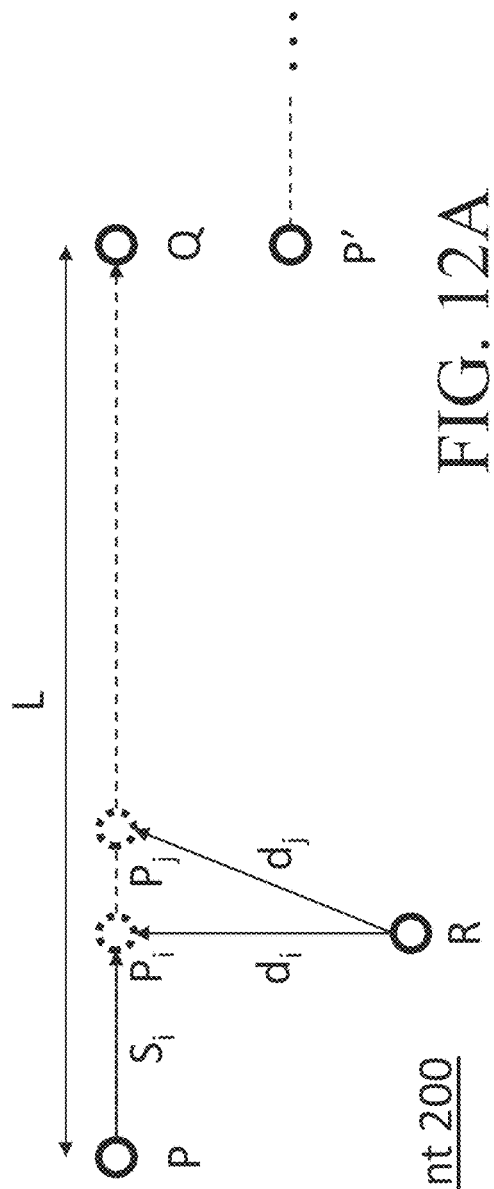
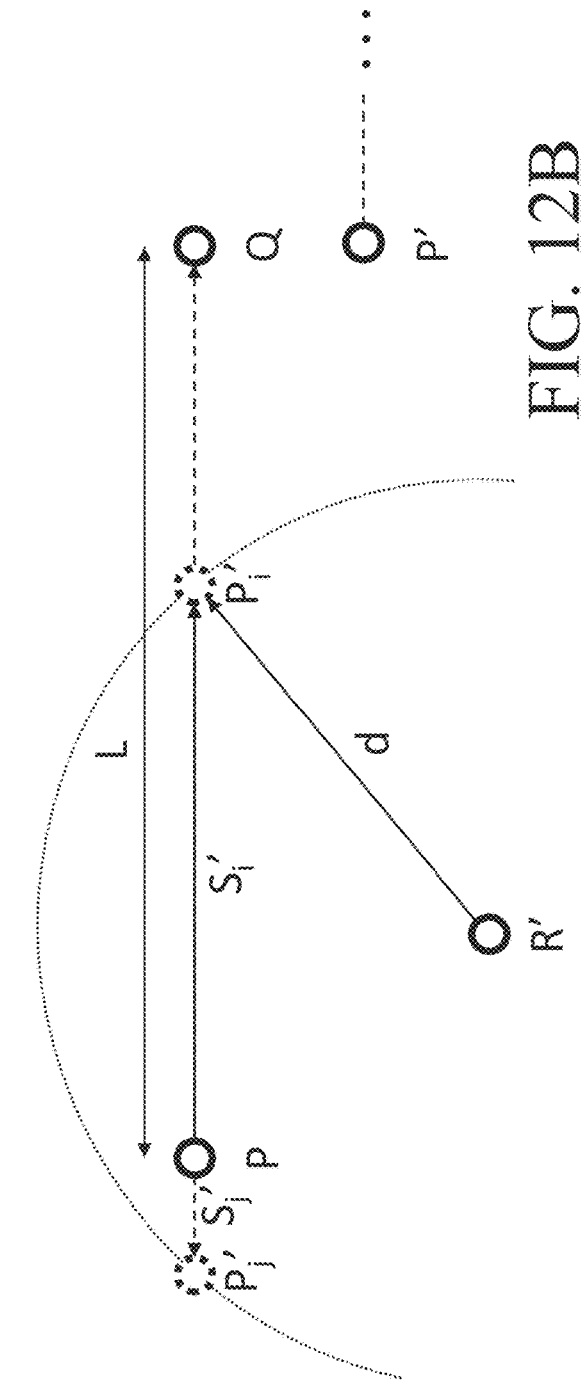
FIG. 12A
FIG. 12B

SYSTEMS AND METHODS FOR ESTIMATING VEHICLE LOCATIONS

CROSS REFERENCE TO RELATED APPLICATIONS

This application claims priority under 35 U.S.C. § 119(e) to U.S. Provisional Application Ser. No. 63/326,130, filed Mar. 31, 2022, and entitled "SYSTEMS AND METHODS FOR ESTIMATING VEHICLE LOCATIONS," which is incorporated by reference in its entirety herein.

BACKGROUND

Train systems, such as urban subway systems, employ train control mechanisms to facilitate the safe movement of trains about the various train tracks of the train system. To prevent collisions between trains moving along the same track, conventional train control systems monitor segments of the track to ensure that only a single train is traveling within any particular segment.

SUMMARY

Some embodiments of the technology described herein relate to a system for determining a position of a train traveling along a train track, the system comprising at least one ultra-wideband (UWB) antenna configured to transmit and/or receive at least one UWB signal to and/or from at least one anchor node positioned proximate the train track, at least one global navigation satellite system (GNSS) receiver configured to receive at least one GNSS signal, and at least one processor configured to determine at least one first observed position of the train along the train track using an arrival time of the at least one UWB signal, determine at least one second observed position of the train along the train track using at least one GNSS signal received by the at least one GNSS receiver, and determine an estimated position of the train along the train track using the at least one first observed position and the at least one second observed position of the train along the track.

In some embodiments, the at least one processor is further configured to determine at least one distance between the at least one UWB antenna and the at least one anchor node using the arrival time of the at least one UWB signal. In some embodiments, the at least one UWB antenna is configured to transmit a first UWB signal of the at least one UWB signal to the at least one anchor node, the at least one UWB antenna is configured to receive a second UWB signal of the at least one UWB signal from the at least one anchor node, and the at least one processor is configured to determine the at least one distance using a transmit time of the first UWB signal and an arrival time of the second UWB signal.

In some embodiments, the system further comprises at least one inertial measurement unit (IMU) configured to generate IMU data responsive to movement of the train along the train track, and the at least one processor is configured to determine the estimated position of the train along the train track further by using the IMU data.

In some embodiments the at least one processor is configured to determine the estimated position of the train along the train track by executing a recursive state estimator. In some embodiments, the recursive state estimator comprises at least one Kalman filter and/or at least one Kalman smoother. In some embodiments, the at least one processor is configured to determine the position of the train along the track at least in part by providing the at least one first observed position and the at least one second observed position along the train track as input to the recursive state estimator.

In some embodiments, the at least one processor is configured to execute a bank of recursive state estimators that includes the recursive state estimator. In some embodiments, the bank of recursive state estimators comprises a bank of Kalman filters. In some embodiments, the at least one second observed position comprises a first observed train position, and the at least one processor is configured to determine the estimated position of the train along the train track at least in part by determining whether to update any of the Kalman filters in the bank of Kalman filters using the first observed train position and, when the at least one processor determines that at least one Kalman filter in the bank of Kalman filters is to be updated, providing the first observed train position as input to the at least one Kalman filter and updating at least one respective state of the at least one Kalman filter using the first observed train position. In some embodiments, when the at least one processor determines not to update any of the Kalman filters in the bank of Kalman filters using the first observed train position, the at least one processor is configured to add and initialize a new Kalman filter in the bank of Kalman filters and provide the first observed train position as input to the new Kalman filter.

In some embodiments, the bank of Kalman filters comprises a first Kalman filter, and the at least one processor is configured to determine whether to update any of the Kalman filters in the bank of Kalman filters at least in part by determining whether to update the first Kalman filter using the first observed train position, and determine whether to update the first Kalman filter at least in part by determining a measure of consistency between a position of the train estimated by the first Kalman filter and the first observed train position. In some embodiments, the measure of consistency between the position of the train estimated by the first Kalman filter and the first observed train position is a measure of distance between the position of the train estimated by the first Kalman filter and the first observed train position. In some embodiments, the measure of consistency between the position of the train estimated by the first Kalman filter and the first observed train position is a likelihood of observing the first observed train position according to the state estimated by the first Kalman filter.

In some embodiments, the at least one processor is configured to determine the at least one first observed position of the train along the track further by integrating the at least one first observed position with a geometry of the train track. In some embodiments the at least one processor is configured to determine the at least one second observed position of the train further by determining whether the at least one second observed position is RF visible using the at least one UWB antenna and/or the at least one GNSS receiver.

Some embodiments of the technology described herein relate to a method of determining a position of a train traveling along a train track, the method comprising transmitting and/or receiving, using at least one ultra-wideband (UWB) antenna, at least one UWB signal to and/or from at least one anchor node positioned proximate the train track, receiving, using at least one global navigation satellite system (GNSS) receiver, at least one GNSS signal, determining, by at least one processor, at least one first observed position of the train along the train track using an arrival time of the at least one UWB signal, determining, by the at least one processor, at least one second observed position of the train along the train track using at least one GNSS signal received by the at least one GNSS receiver, and determining, by the at least one processor, an estimated position of the train along the train track using the at least one first observed position and the at least one second observed position of the train along the track.

Some embodiments of the technology described herein relate to a non-transitory computer-readable medium having stored thereon instructions that, when executed by at least one processor, cause the at least one processor to perform a method of determining a position of a train traveling along a train track, the method comprising transmitting and/or receiving, using at least one ultra-wideband (UWB) antenna, at least one UWB signal to and/or from at least one anchor node positioned proximate the train track, receiving, using at least one global navigation satellite system (GNSS) receiver, at least one GNSS signal, determining, by the at least one processor, at least one first observed position of the train along the train track using an arrival time of the at least one UWB signal, determining, by the at least one processor, at least one second observed position of the train along the train track using at least one GNSS signal received by the at least one GNSS receiver, and determining, by the at least one processor, an estimated position of the train along the train track using the at least one first observed position and the at least one second observed position of the train along the track.

Some embodiments of the technology described herein relate to a system for determining a position of a train traveling along a train track, the system comprising at least one radio-frequency (RF) antenna configured to transmit and/or receive an RF signal to and/or from at least one anchor node positioned proximate the train track and at least one processor configured to obtain an arrival time of the RF signal, access information specifying a geometry of the train track, and determine the position of the train along the train track using the arrival time and the information specifying the geometry of the train track.

In some embodiments, the at least one processor is further configured to determine at least one distance between the at least one RF antenna and the at least one anchor node using the arrival time and to determine the position of the train along the train track using the at least one distance and the information specifying the geometry of the train track. In some embodiments, the at least one distance comprises a first distance between the at least one RF antenna and a first anchor node of the at least one anchor node that is at a first position proximate the train track and a second distance between the at least one RF antenna and a second anchor node of the at least one anchor node that is at a second position proximate the train track, and the at least one processor is configured to identify a first observed position of the train along the train track using the first distance, the first position, and the information specifying the geometry of the train track, identify a second observed position of the train along the train track using the second distance, the second position, and the information specifying the geometry of the train track, and count a discrepancy between the first observed position and the second observed position against at least one of the first and second anchor nodes. In some embodiments, the at least one RF antenna is configured to transmit a first RF signal to the at least one anchor node, the at least one RF antenna is configured to receive a second RF signal from the at least one anchor node, the RF signal is the second RF signal, and the at least one processor is configured to determine the at least one distance using a transmit time of the first RF signal and an arrival time of the second RF signal.

In some embodiments, the at least one RF antenna comprises at least one ultra-wideband (UWB) antenna, and wherein the RF signal comprises at least one UWB signal. In some embodiments, the system further comprises at least one global navigation satellite system (GNSS) receiver configured to receive at least one GNSS signal, and the at least one processor is further configured to determine the position of the train using the at least one GNSS signal received by the at least one GNSS receiver.

In some embodiments, the system further comprises at least one inertial measurement unit (IMU) configured to generate IMU data responsive to motion of the train along the train track, and the at least one processor is further configured to determine the position of the train further using the IMU data.

In some embodiments, the at least one processor is configured to determine an estimated position of the train along the train track by executing a recursive state estimator and determine the position of the train using an output from the recursive state estimator. In some embodiments, the recursive state estimator comprises at least one Kalman filter and/or at least one Kalman smoother.

In some embodiments, the at least one processor is configured to execute a bank of recursive state estimators that includes the recursive state estimator. In some embodiments, the at least one processor is configured to determine the position of the train along the track at least in part by determining at least one observed position of the train along the train track using the arrival time and the information specifying the geometry of the train track and providing the at least one observed position of the train as input to the recursive state estimator. In some embodiments, the bank of recursive state estimators comprises a bank of Kalman filters.

In some embodiments, the at least one observed position of the train comprises a first observed train position, and wherein the at least one processor is configured to determine the estimated position of the train along the train track at least in part by determining whether to update any of the Kalman filters in the bank of Kalman filters using the first observed train position and, when the at least one processor determines that at least one Kalman filter in the bank of Kalman filters is to be updated, providing the first observed train position as input to the at least one Kalman filter and updating at least one respective state of the at least one Kalman filter using the first observed train position. In some embodiments, when the at least one processor determines not to update any of the Kalman filters in the bank of Kalman filters using the first observed train position, the at least one processor is configured to initialize a new Kalman filter in the bank of Kalman filters.

In some embodiments, the bank of Kalman filters comprises a first Kalman filter and the at least one processor is configured to determine whether to update any of the Kalman filters in the bank of Kalman filters at least in part by determining whether to update the first Kalman filter using the first observed train position and determine whether to update the first Kalman filter at least in part by determining a measure of consistency between a position of the train estimated by the first Kalman filter and the first observed train position. In some embodiments, the measure of consistency between the position of the train estimated by the first Kalman filter and the first observed train position is a measure of distance between the position of the train estimated by the first Kalman filter and the first observed train position. In some embodiments, the measure of consistency between the position of the train estimated by the first Kalman filter and the first observed train position is a likelihood of observing the first observed train position according to the state estimated by the first Kalman filter.

In some embodiments, the at least one processor is configured to determine the position of the train along the train track at least in part by integrating the arrival time with the geometry of the train track to obtain at least one observed position of the train along the train track. In some embodiments, the at least one processor is configured to integrate the arrival time with the geometry of the train track at least in part by using the information specifying the geometry of the train track to identify the at least one observed position of the train as being along the geometry of the train track and consistent with the arrival time and at least one position of the at least one anchor node. In some embodiments, the at least one processor is configured to determine at least one distance between the at least one RF antenna and the at least one anchor node using the arrival time and to integrate the at least one distance with the geometry of the train track at least in part by using the information specifying the geometry of the train track to identify the at least one observed position of the train as being along the geometry of the train track and disposed at the at least one distance from the at least one position of the at least one anchor node. In some embodiments, the at least one processor is configured to determine the at least one observed position of the train further by determining whether the at least one observed position is RF visible using the at least one RF antenna.

In some embodiments, the system further comprises at least one global navigation satellite system (GNSS) receiver configured to receive at least one GNSS signal, and the at least one processor is configured to determine the position of the train further using consistency between the at least one observed position and a second observed position determined using the at least one GNSS signal. In some embodiments, the at least one processor is configured to determine the at least one observed position of the train further by determining whether the at least one observed position is RF visible using the at least one UWB antenna and/or the at least one GNSS receiver.

Some embodiments of the technology described herein relate to a method of determining a position of a train traveling along a train track, the method comprising transmitting and/or receiving, using at least one radio-frequency (RF) antenna, an RF signal to and/or from at least one anchor node positioned proximate the train track, obtaining, by at least one processor, an arrival time of the RF signal, accessing, by the at least one processor, information specifying a geometry of the train track, and determining, by the at least one processor, the position of the train along the train track using the arrival time and the information specifying the geometry of the train track.

Some embodiments of the technology described herein relate to a non-transitory computer-readable medium having instructions stored thereon that, when executed by at least one processor, cause the at least one processor to perform a method of determining a position of a train traveling along a train track, the method comprising transmitting and/or receiving, using at least one radio-frequency (RF) antenna, an RF signal to and/or from at least one anchor node positioned proximate the train track, obtaining, by at least one processor, an arrival time of the RF signal, accessing, by the at least one processor, information specifying a geometry of the train track, and determining, by the at least one processor, the position of the train along the train track using the arrival time and the information specifying the geometry of the train track.

Some embodiments of the technology described herein relate to a system for determining a position of a train traveling along a train track, the system comprising at least one positioning device configured to determine at least one observation of the train along the train track and at least one processor configured to determine a plurality of estimated positions of the train using information specifying a geometry of the train track and the at least one observation of the train and select the position of the train from among the plurality of estimated positions.

In some embodiments, the at least one positioning device is selected from the group consisting of at least one radio-frequency (RF) antenna configured to receive at least one RF signal from at least one anchor node positioned proximate the train track, at least one global navigation satellite system (GNSS) receiver configured to receive at least one GNSS signal, and at least one inertial measurement unit (IMU) configured to generate IMU data responsive to motion of the train along the train track, and the at least one processor is configured to determine the at least one observed position of the train using the at least one RF signal, the at least one GNSS signal, and/or the IMU data. In some embodiments, the at least one positioning device comprises at least one RF antenna configured to receive at least one RF signal from at least one anchor node positioned proximate the train track, the at least one RF antenna comprises at least one ultra-wideband (UWB) antenna, and the at least one RF signal comprises at least one UWB signal.

In some embodiments, the at least one processor is configured to determine the plurality of estimated positions of the train along the train track by executing a recursive state estimator and select the position of the train using an output from the recursive state estimator. In some embodiments, the recursive state estimator comprises at least one Kalman filter and/or at least one Kalman smoother.

In some embodiments, the processor is configured to execute a bank of recursive state estimators that includes the recursive state estimator and select the position of the train from among a plurality of outputs from the bank of recursive state estimators. In some embodiments, the at least one processor is configured to determine the plurality of estimated positions of the train along the track at least in part by providing the at least one observed position of the train as input to a plurality of recursive state estimators of the bank of recursive state estimators and obtaining the plurality of estimated motions of the train as outputs from the plurality of recursive state estimators. In some embodiments, the bank of recursive state estimators comprises a bank of Kalman filters.

In some embodiments, the at least one observed position of the train comprises a first observed train position, and wherein the at least one processor is configured to determine the plurality of estimated positions of the train along the train track at least in part by determining whether to update any of the Kalman filters in the bank of Kalman filters using the first observed train position and, when the at least one processor determines that at least one Kalman filter in the bank of Kalman filters is to be updated, providing the first observed train position as input to the at least one Kalman filter and updating at least one respective state of the at least one Kalman filter using the first observed train position. In some embodiments, when the at least one processor determines not to update any of the Kalman filters in the bank of Kalman filters using the first observed train position, the at least one processor is configured to initialize a new Kalman filter in the bank of Kalman filters.

In some embodiments, the bank of Kalman filters comprises a first Kalman filter, and the at least one processor is configured to determine whether to update any of the Kalman filters in the bank of Kalman filters at least in part by determining whether to update the first Kalman filter using the first observed train position, and determine whether to update the first Kalman filter at least in part by determining a measure of consistency between a position of the train estimated by the first Kalman filter and the first observed train position. In some embodiments, the measure of consistency between the position of the train estimated by the first Kalman filter and the first observed train position is a measure of distance between the position of the train estimated by the first Kalman filter and the first observed train position. In some embodiments, the measure of consistency between the position of the train estimated by the first Kalman filter and the first observed train position is a likelihood of observing the first observed train position according to the state estimated by the first Kalman filter.

In some embodiments, the at least one processor is configured to determine the position of the train along the train track at least in part by integrating the at least one observation with the geometry of the train track to obtain at least one observed position of the train along the train track. In some embodiments, the at least one positioning device comprises at least one RF antenna configured to transmit and/or receive at least one RF signal to and/or from at least one anchor node positioned proximate the train track, the at least one observation comprises an arrival time of the at least one signal, and the at least one processor is configured to integrate the arrival time with the geometry of the train track at least in part by using the information specifying the geometry of the train track to identify at least one observed position of the train as being along the geometry of the train track and consistent with the arrival time and at least one position of the at least one anchor node. In some embodiments, the at least one observation comprises at least one distance between the train and the at least one anchor node positioned proximate the train track, the at least one distance determined using the arrival time, and the at least one processor is configured to integrate the at least one distance with the geometry of the train track at least in part by using the information specifying the geometry of the train track to identify the at least one observed position of the train as being along the geometry of the train track and disposed at the at least one distance from the at least one position of the at least one anchor node. In some embodiments, the at least one processor is configured to determine the position of the train further by determining whether the at least one observed position is RF visible using the at least one RF antenna.

In some embodiments, the at least one positioning device further comprises at least one GNSS receiver configured to receive at least one GNSS signal, and the at least one processor is configured to determine the position of the train further using consistency between the at least one observed position and a second observed position determined using the at least one GNSS signal. In some embodiments, the at least one processor is configured to determine the at least one observed position of the train further by determining whether the at least one observed position is RF visible using the at least one UWB antenna and/or the at least one GNSS receiver.

Some embodiments of the technology described herein relate to a method of determining a position of a train traveling along a train track, the method comprising determining, by at least one positioning device, at least one observation of the train along the train track, determining, by at least one processor, a plurality of estimated positions of the train using information specifying a geometry of the train track and the at least one observation of the train and selecting, by the at least one processor, the position of the train from among the plurality of estimated positions.

Some embodiments of the technology described herein relate to a non-transitory computer-readable medium having instructions stored thereon that, when executed by at least one processor, cause the at least one processor to perform a method of determining a position of a train moving traveling a train track, the method comprising determining, by at least one positioning device, at least one observation of the train along the train track, determining, by at least one processor, a plurality of estimated positions of the train using information specifying a geometry of the train track and the at least one observation of the train and selecting, by the at least one processor, the position of the train from among the plurality of estimated positions.

BRIEF DESCRIPTION OF DRAWINGS

Various aspects and embodiments of the disclosed technology will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 12A is a drawing of an illustrative track segment 200 from a first point P to a second point Q and a point R at which a train is estimated to be positioned, in accordance with some embodiments of the technology described herein.

FIG. 12B is a drawing of the illustrative track segment 200 and a point R' from which the train is estimated to be separated by a distance d, in accordance with some embodiments of the technology described herein.

DETAILED DESCRIPTION

Figure 1:
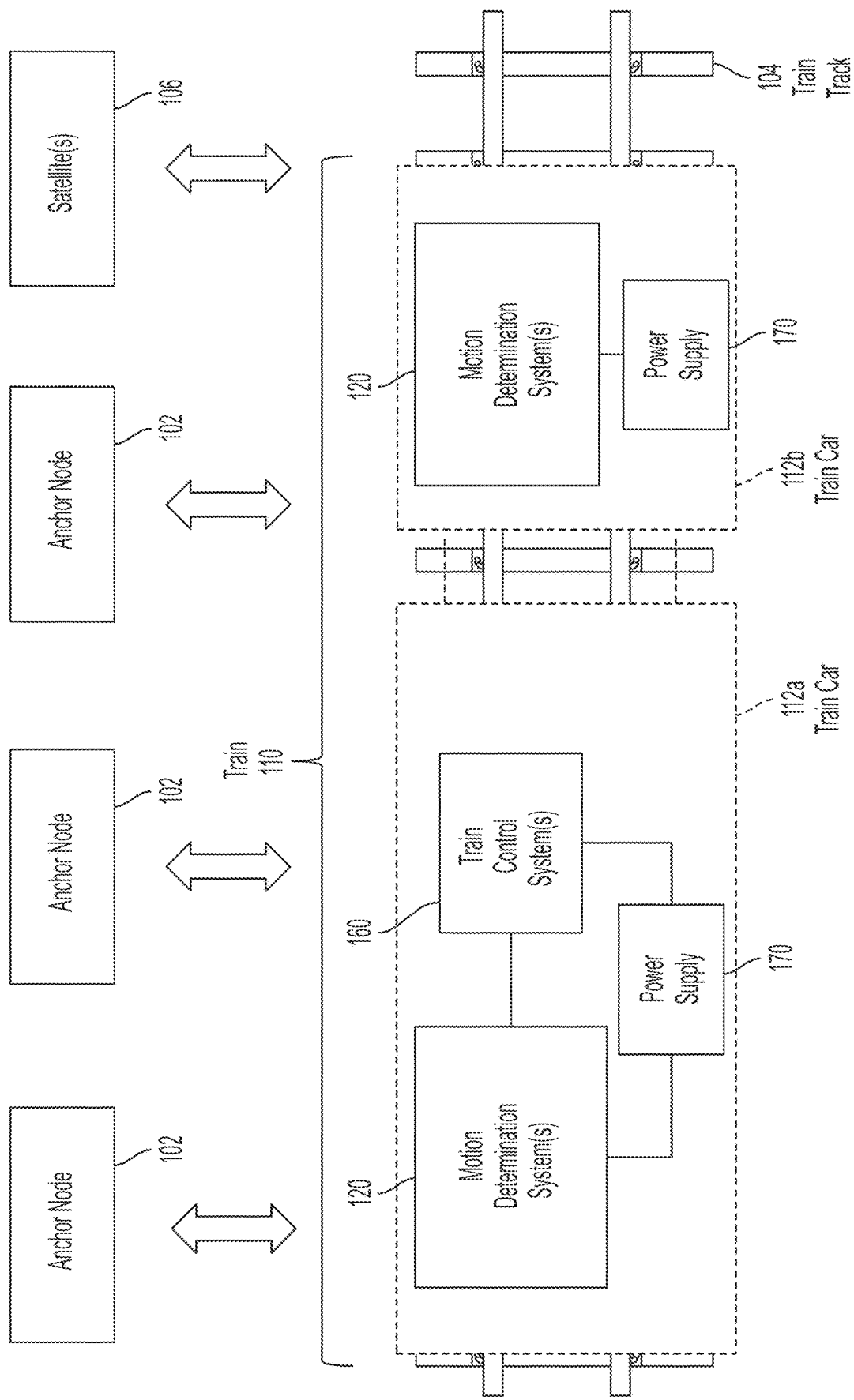
FIG. 1 is a drawing of an illustrative train 110 traveling along a train track 104 and incorporating a system 120 for determining motion characteristics of the train 110, in accordance with some embodiments of the technology described herein.

The inventors recognized that conventional train control systems constrain the capacity of a train system (e.g., rate at which passengers are transported by the train system) because the conventional train control systems are unable to precisely locate trains within the train system. For instance, conventional train control systems permit only one train to travel in a given track segment because the train control systems are not able to precisely locate trains within the track segment, and thus could not prevent a collision between two trains traveling along the same track segment. For example, if two trains were traveling in the same track segment and the leading train stopped, the train control system would be unable to detect the stopping of the leading train and appropriately signal the following train to stop before colliding with the leading train. Additionally, because the train control system may need to stop a train before the train reaches the next track segment, trains within the train system are operated at low speed. For example, if two trains were traveling in consecutive track segments and the leading train stopped while traveling in its track segment, the following train would have to stop before reaching the next track segment because the train control system does not know where the leading train is within the next track segment. Accordingly, the lack of precision in locating trains along the tracks prevents more trains from traveling in the same track segment, and also limits the speed at which trains may safely travel along the tracks.

To address these drawbacks of conventional train control systems, the inventors developed techniques for determining motion characteristics (e.g., position, velocity, acceleration, position uncertainty, velocity uncertainty, acceleration uncertainty, etc.) of trains traveling along a train track with greater accuracy than previously possible. These techniques may be used to safely operate the trains at higher speeds and with shorter separation between trains than previously possible, thereby allowing for an increased capacity of the train system. In some embodiments, the techniques developed by the inventors use ultra-wideband (UWB) RF data, global navigation satellite system (GNSS) data, and/or inertial measurement unit (IMU) data collected by one or more IMUs onboard a train to determine the train's motion characteristics as the train travels along the train track. The inventors recognized that determining the train's motion characteristics using such techniques provides train control systems with enhanced precision, enabling trains to travel faster and closer together along a train track without compromising safety.

Some techniques developed by the inventors facilitate determining motion characteristics using range data obtained via one or more wireless links between electronics onboard the train and electronics positioned along the train track. In some embodiments, the range data may indicate the position, velocity, and/or acceleration of the train. In one example, the train may include one or more radio frequency antennas (e.g., ultra-wideband RF antennas) onboard the train that exchange wireless signals with one or more anchor nodes positioned along the train track. In some embodiments, radio frequency antennas described herein may be configured to receive signals having a center frequency between 3-10 GHz, such as between 3-5 GHz, between 4-5 GHz, and/or between 7-10 GHz. In some embodiments, radio frequency antennas may have a bandwidth of at least 400 MHz, at least 500 MHz, at least 1 GHz, and/or at least 2 GHz. In the above example, the range data may include a distance separating the train from the anchor node(s) (and/or arrival times of one or more signals), and one or more processors located onboard the train may be configured to determine the motion characteristics using the range data. In some embodiments, one or more range processors (e.g., of multiple processors onboard the train) may be packaged with the RF antenna(s) to determine the range data, and another processor may be disposed on a circuit board that is wired to the RF antenna(s) for determining the motion characteristics using the range data.

Some techniques described herein alternatively or additionally facilitate determining motion characteristics using global navigation satellite system GNSS data obtained via one or more GNSS receivers positioned onboard the train. In some embodiments, the GNSS data may indicate the position, velocity, and/or acceleration of the train. In one example, the train may include one or more GNSS receivers onboard the train that receive GNSS signals from one or more satellites and/or constellations. In some embodiments, one or more GNSS processors may be packaged with the GNSS receiver(s) to receive and process the GNSS data. For example, the GNSS processor(s) can be configured to determine global coordinates and/or a velocity of the GNSS receiver(s) based on the timing of one or more received GNSS signals.

Some techniques described herein alternatively or additionally use one or more IMUs onboard the train, which generate motion data responsive to detecting movement of the train (e.g., along the track geometry and/or in elevation with respect to the track, etc.), to determine the motion characteristics of the train. For instance, the motion data generated by the IMU(s) may indicate a position, velocity, and/or acceleration of the train. In one example, one or more processors onboard the train may be configured to determine the motion characteristics using the motion data from the IMU(s). In some embodiments, the processor(s) may be disposed on a circuit board, and the IMU(s) may be disposed on the same circuit board.

Some techniques described herein provide a determined uncertainty to accompany motion characteristics determined using the RF antenna(s), GNSS receiver(s), and/or the IMU(s) described herein. For instance, in some embodiments, the processor(s) onboard the train may be configured to determine an uncertainty of motion characteristics generated using the RF antenna(s), taking into account factors such as how recently the range data was determined, how strong the transmitted and/or received wireless signals were, which onboard or anchor node antenna(s) transmitted and/or received the signals that served as the basis for the range data, and/or whether range data determined using other antennas onboard the train is substantially different from the range data used to determine the motion characteristics, and other such considerations. Alternatively or additionally, in some embodiments, the processor(s) may be configured to determine an uncertainty of motion characteristics generated using the IMU(s), taking into account factors such as how recently the IMU data was generated, whether data from any other IMUs onboard the train is substantially different from the IMU data used to determine the motion characteristics. In some embodiments, the GNSS receiver(s) may provide similar uncertainty data with at least some observations, such as based on a number of satellites from which GNSS signals were received and/or the signal-to-noise ratio (SNR) associated the observation(s).

Some techniques described herein use data from multiple modalities (e.g., one or more RF antennas, GNSS receiver(s), and/or IMU(s), etc.) to determine motion characteristics of a train. In some embodiments, the train may have one or more radio frequency antennas onboard for exchanging signals with one or more track-adjacent anchor nodes to generate range data, and the train may also have one or more GNSS receivers onboard to provide GNSS data responsive to receiving GNSS signals. Alternatively or additionally, the train may have one or more IMUs onboard to generate motion data responsive to detecting movement of the train.

The inventors recognized that using a single modality (e.g., only antenna(s), only GNSS, or only IMU(s)) may cause the motion characteristics determined onboard the train to have an intolerable level of uncertainty for some applications. For instance, in such applications, error in the motion characteristics caused by an environment lacking one of the modalities (e.g., inside a tunnel RF invisible to GNSS), or caused by a temporary failure of one of the modalities (e.g., poor antenna signal due to weather, etc.), may compromise the safety of trains within the systems. Accordingly, multi-modal techniques (e.g., using a combination of one or more RF antennas, GNSS receiver(s), and/or the IMU(s)) may compensate for environments where only some modalities are available. For example, GNSS receivers may be used to determine motion characteristics while the train is outdoors and antennas may be used to determine motion characteristics while the train is in a tunnel. Alternatively or additionally, multi-modal techniques may compensate for uncertainty resulting from a failure of one of the modalities, as the other modality may detect the failure and/or provide the data needed to determine motion characteristics in the absence of the failed modality. For example, range data obtained using the RF antenna(s) and/or GNSS data obtained using the GNSS receiver(s) may be inconsistent with IMU data, thus indicating a failure of the RF antenna and/or an anchor node in communication with the RF antenna. The antenna failure may be mitigated by using the GNSS and/or IMU data, and not using the range data, to determine the motion characteristics of the train.

The inventors further developed techniques for reconciling data received from multiple modalities (e.g., RF antenna(s) and IMU(s), etc.) to mitigate uncertainty in the data. For instance, in some embodiments, the processor(s) onboard the train may be configured to correct data from the IMU(s) using range data from the RF antenna(s), and/or to correct range data from the RF antenna(s) using GNSS data. In one example, the processor(s) may be configured to store previously determined motion characteristics (e.g., position, velocity, and acceleration) in a memory and estimate motion characteristics at a later time using data from the IMU(s). Then, the processor(s) may be configured to determine motion characteristics using range data from the RF antenna(s) to correct the motion characteristics that were estimated using the IMU(s), and/or to use GNSS data to correct motion characteristics determined using the RF antenna(s). In this example, the IMU(s) may be configured to determine the acceleration of the train using measurements of acceleration in the direction of the train track and also in a gravity direction, such that the uphill or downhill slope of the track may be incorporated into estimating the position and/or velocity of the train. The range data received from the RF antenna(s) may be used to correct the position and/or velocity estimates made using the acceleration measurements determined using the IMU(s). Likewise, the GNSS data received from the GNSS receiver(s) may be used to correct the position and/or velocity estimates made using the RF antenna(s) and/or IMU(s). As a result, motion characteristics determined onboard the train may be more accurate by intelligently combining data from the multiple modalities to compensate for one another, increasing the confidence with which train control systems may operate the trains.

In some embodiments, a system for determining a position of a train traveling along a train track may include at least one UWB antenna configured to transmit and/or receive at least one UWB signal to and/or from at least one anchor node positioned proximate the train track. For example, the UWB antenna(s) may be configured only to transmit signals to the anchor node(s), only to receive signals from the anchor node(s), or to both transmit and receive signals to and from the anchor node(s). In some embodiments, the system may further include a processor configured to determine at least one first observed position of the train along the train track using an arrival time of the UWB signal(s). For example, a transmit time of a first UWB signal (e.g., to or from the anchor node) and an arrival time of a second signal (e.g., from or to the anchor node) may indicate a distance between the UWB antenna(s) and the anchor node(s), and the positions of the anchor node(s) may be known to facilitate observing a position of the train. Alternatively or additionally, arrival times of multiple signals at or from multiple anchor nodes, together with known positions of the anchor nodes, may generate one or more observed positions of the UWB antenna(s).

In some embodiments, the system may further include at least one GNSS receiver configured to receive at least one GNSS signal, and the processor(s) may be configured to determine one or more second observed positions using at least one GNSS signal received by the GNSS receiver(s). For example, the GNSS position(s) may indicate where the train is likely to be positioned along the train track. In some embodiments, the processor(s) may be further configured to determine an estimated positions of the train along the train track using the first observed position(s) and at least one second observed position of the train along the train track. For example, the observed position(s) may be provided to an estimator that outputs the position of the train.

The inventors further developed techniques for converting train motion observations from one or more modalities with the geometry of the train track, facilitating and increasing the accuracy of train motion determination. The inventors recognized that trains are generally constrained to move along a train track, and further that the geometry of a train track may be winding and potentially overlap with itself (e.g., when a track forms one or more loops). In some embodiments, a representation of the geometry of a train track may be stored in memory as and/or including a data structure linking positions along the train track to corresponding geographic positions, such as in three-dimensional (3D) space. For example, the representation of the track geometry may be stored with associated data indicating where the geographic positions are situated (e.g., coordinates) within a desired frame of reference. In some embodiments, observed geographic positions of the train (e.g., using GNSS and/or range data) that coincide with the geometry of the train along the track in 3D space may be converted to one or more corresponding positions along the geometry of the train track, facilitating accurate determination of motion characteristics such as velocity and acceleration along the geometry of the train track.

In some embodiments, observations from one or more modalities may be integrated with the geometry of the train track. For example, an observed geographic position of the train may not coincide with the geometry of the train track in 3D space, violating the assumption that movement of the train is confined to the train track. In this example, the observed geographic position can be rectified by identifying one or more other positions coinciding with the geometry of the train track that are likely to be the true position of the train, thereby integrating the observed geographic position with the geometry of the train track. For instance, a position along the geometry of the train track may be identified as a likely position of the train when it is the nearest position along the geometry of the train track to a geographic position observed using GNSS signals. Alternatively or additionally, one or more positions along the geometry of the train track may be identified as likely positions of the train by being consistent with an arrival time of an RF signal transmitted to and/or received from the anchor node. Similarly, where an arrival time of an RF signal would indicate an erroneous observed position of the train along the train track, such as a position in which the anchor node is RF invisible to or from the onboard antenna that communicated with the anchor node, such erroneous positions may be filtered out based on the track geometry in combination with known orientations of the onboard antennas.

In some embodiments, a system for determining a position of a train traveling along a train track may include at least one RF (e.g., UWB) antenna configured to transmit and/or receive an RF signal to and/or from at least one anchor node positioned proximate the train track. For example, the RF antenna(s) may be configured only to transmit signals to the anchor node(s), only to receive signals from the anchor node(s), or to both transmit and receive signals to and from the anchor node(s). In some embodiments, the system may include at least one processor configured to obtain an arrival time of the RF signal. For example, the RF antenna may transmit a first signal to the anchor node(s) at a transmit time and receive a second signal from the anchor node(s) at the arrival time, and/or vice versa. Alternatively or additionally, the RF antenna may transmit the RF signal and the RF signal may arrive at multiple anchor nodes at respective arrival times that include the arrival time, and/or vice versa (e.g., with RF signals arriving at the RF antenna from multiple anchor nodes at the respective arrival times).

In some embodiments, the processor(s) may be configured to access information specifying a geometry of the train track and determine the position of the train along the train track using the arrival time and the information specifying the train track. For example, the information specifying the geometry of the train track may include points in 3D space corresponding to positions where the train may be located along the train track. In this example, the processor(s) may be configured to determine the position of the train along the train track as one of the points in 3D space that is consistent with the arrival time. For instance, a transmit time of a first RF signal and an arrival time of a second RF signal, together with a known position of an anchor node that transmitted the RF first signal and received the second RF signal, or vice versa, may indicate a subset of the points in 3D space as one or more indicated positions of the train along the train track. Alternatively or additionally, arrival times of multiple RF signals at the RF antenna from multiple anchor nodes, or vice versa, together with known positions of the anchor nodes, may indicate a subset of the points in 3D space as one or more indicated positions of the train along the train track.

In some embodiments, IMU data can be integrated with the geometry of the train track, such as by using observed acceleration of the train along an axis that aligns with the train track, and/or portions of the observed acceleration that align with the geometry of the portion of the train track on which the train is determined to be moving. The inventors have recognized that converting and/or integrating train motion observations from one or more modalities with the track geometry facilitates accurate determination of motion characteristics along complex train track trajectories and integration of observations from multiple modalities into a single reference frame to make such determinations.

Some techniques described herein further provide estimation of motion characteristics of a train traveling along a train track, from which a subset of the motion characteristics of the train may be selected. For example, a plurality of estimators (e.g., recursive state estimators) may be executed to track motion characteristics (e.g., position, velocity, acceleration, etc.) and/or associated uncertainties using observed motion characteristics over time. In some embodiments, producing multiple estimations from which an estimate may be selected provides computationally efficient and accurate estimation of train motion characteristics.

In some embodiments, a system for determining a position of a train traveling along a train track may include at least one positioning device (e.g., GNSS, RF, and/or IMU) configured to determine at least one observation of the train along the train track. For example, the observation(s) may include a position, velocity, and/or acceleration of the train observed using GNSS-, RF-, and/or IMU-based data. In some embodiments, the system may further include at least one processor configured to determine a plurality of estimated positions of the train using information specifying a geometry of the train track and the observation(s) of the train. For example, the plurality of estimated positions may be determined by executing one or more recursive state estimators (e.g., a bank of estimators, which may itself be an estimator). For instance, the processor(s) may provide the observation(s) (e.g., one or more points in 3D space corresponding to the train track that are consistent with GNSS-, RF-, and/or IMU-based data) to the recursive state estimator(s) to update the plurality of estimated positions (e.g., tracked using the estimator(s)). In some embodiments, the processor(s) may be further configured to select the position of the train from among the plurality of estimated positions. For example, the processor(s) may select an output of one of the estimator(s) as the position of the train.

Some techniques described herein further provide an interface between the electronics onboard the train tasked with determining the motion characteristics and the train control system. For instance, in some embodiments, the interface may provide the motion characteristics to an onboard control system communication channel that forwards the motion characteristics to a central hub and receives operation commands from the central hub in response. Alternatively or additionally, in some embodiments, the interface may provide the motion characteristics to a decentralized control system hub that generates operation commands for the train from onboard. Accordingly, motion determination systems described herein provide the motion characteristics directly to the train control system.

It should be appreciated that motion characteristics such as positions, velocities, and/or accelerations described herein may be absolute (e.g., within a suitable reference frame) and/or relative (e.g., with respect to an object). For instance, an observed position using GNSS signals may be an absolute position, whereas a distance with respect to an anchor node or a position consistent with different arrival times of RF signals transmitted to or from multiple anchor nodes may be a relative position. It should also be appreciated that the train does not need to be moving in order for the motion determination techniques described herein to be used, as such techniques may be used to determine motion characteristics of a standstill train.

Various aspects described herein may be implemented in any of numerous ways. Examples of specific implementations are provided herein for illustrative purposes only. In addition, the various aspects described in the embodiments below may be used alone or in any combination and are not limited to the combinations described explicitly herein.

FIG. 1 is a drawing of an illustrative train 110 traveling along a train track 104 and incorporating a system 120 for determining motion characteristics of the train 110, in accordance with some embodiments of the technology described herein. In FIG. 1, the train 110 includes multiple train cars 112a and 112b, each including at least one motion determination system 120 and a power supply 170. The motion determination system(s) 120 may be configured to determine a position, velocity, and/or acceleration of the train 110. Train car 112a also includes at least one train control system 160 that may be configured to determine when the train 110 moves and stops, and/or the speed for the train 110 to travel, depending on motion characteristics provided by the motion determination system(s) 120.

FIG. 1 further illustrates anchor nodes 102 positioned along the train track 104 and operating in communication with the motion determination system(s) 120 onboard the train 110 to facilitate determination of motion characteristics of the train 110, as described further herein. While the anchor nodes 102 are illustrated side-by-side with the track 104, it should be appreciated that anchor nodes 102 described herein alternatively or additionally may be positioned above or below the train track 104, or in any other position suitable for exchanging wireless signals with antennas onboard the train 110. In some embodiments, the anchor nodes 102 may have known positions. For example, the positions of the anchor nodes 102 may be surveyed and recorded (e.g., stored in memory of a central database and/or a memory of motion determination system 120) during and/or after installation of the anchor nodes 102.

In some embodiments, anchor nodes 102 may be spaced from each other along the direction of elongation of the train track 104. For example, an average spacing between adjacent anchor nodes 102 may be less than 1 kilometer (km), such as 600 meters (m). In this example, anchor nodes 102 may be capable of transmitting and/or receiving RF signals over a transmission range of at least 100 m, such as 300 m and/or 350 m. In some embodiments, where the train track 104 bends, an anchor node 102 may be positioned on the inner (e.g., shorter) and/or outer (e.g., longer) side of the bend.

In some embodiments, motion determination system(s) 120 may be positioned onboard the train cars 112a and 112b. For example, motion determination system(s) 120 may be positioned in portions of the train cars 112a and 112b that do not house the train crew, passengers, or cargo, such as in an area above the cabin of the train car. Alternatively or additionally, in some embodiments, motion determination system(s) 120 may be positioned in the cabins of the train car 112a and/or 112b. In some embodiments, train control system(s) 160 may be positioned in the same portion of the train car 112a as motion determination system(s) 120. In some embodiments, train control system(s) 160 may be positioned in a different portion of the train car 112a from motion determination system(s) 120.

Each motion determination system 120 onboard the train 110 may be configured to determine motion characteristics of the train 110 traveling along the train track 104 using data gathered from one or more sensors on the train 110. For example, the motion determination system(s) 120 may include one or more radio frequency (RF) antennas, GNSS receiver(s), and/or IMU(s), and one or more processors to determine the motion characteristics using data from the RF antenna(s), GNSS receiver(s), and/or IMU(s). In some embodiments, data from only one modality (e.g., the RF antenna(s), the GNSS receiver(s), the IMU(s), etc.) may be incorporated in determining the motion characteristics. In other embodiments, data from multiple modalities may be incorporated, as described further herein.

For motion determination systems 120 that include the RF antenna(s), the RF antenna(s) may exchange wireless signals with the track-adjacent anchor node(s) 102 to generate range data indicating the position, velocity, and/or acceleration of the train 110. The processor(s) onboard the train 110 (e.g., including one or more range processors) may be configured to determine the range data using the exchanged wireless signals, such as using one or more arrival times of the wireless signals. For example, a transmit time of a first signal and an arrival time of a second signal may provide time of flight measurements that indicate the distance separating the RF antenna(s) from the anchor node(s) 102. As another example, differences in arrival times of multiple signals transmitted to or received from multiple anchor nodes 102 may provide indicate a set of possible positions relative to the anchor nodes 102. In either example, the arrival time(s) of the signals may serve directly or indirectly (e.g., through a distance measurement derived therefrom) as the basis for observing a position of the train.

In some embodiments, the range data may include a distance from the train 110 to the anchor node(s) 102. For example, the RF antenna(s) of the motion determination system 120 may transmit a first signal to an anchor node 102 and the anchor node 102 may transmit a second signal 102 to the motion determination system 120 in response to receiving the first signal. In this example, the round-trip travel time between the transmit time of the first signal and the arrival time of the second signal may indicate the distance between the RF antenna(s) of the motion determination system 120 and the anchor node 102. The distance may be determined by subtracting from the round-trip travel time any known delays, such as a delay between when the anchor node 102 receives the first signal and transmits the second signal, dividing the round-trip travel time by two to obtain the one-way travel time, and multiplying the one-way travel time by the wave speed of the first and second signals (e.g., the speed of light in air). In some embodiments, the RF antenna(s) may transmit signals periodically, such as 10-100 times per second (e.g., 40 Hz), and anchor nodes 102 may be responsive to received signals. Alternatively or additionally, anchor nodes 102 may transmit signals periodically, and the RF antenna(s) may be responsive to received signals.

In some embodiments, the distance between the anchor node 102 and the RF antenna(s) of the motion determination system 120 may be used to determine motion characteristics of the train 110. For example, if the anchor nodes 102 have known positions, a position of the train 110 may be determined using the determined distances between the train 110 and the anchor nodes 102 and the known positions of the anchor nodes 102. Alternatively or additionally, motion characteristics other than position, such as velocity and/or acceleration, may be determined using the distance and the known positions and/or doppler information (e.g., doppler shift) in the received RF signals. In some embodiments, the RF antenna(s) onboard the train 110 may exchange wireless signals with multiple ones of the anchor nodes 102 to generate the range data. Alternatively or additionally, the processor(s) may generate multiple sets of range data corresponding to signals exchanged with the multiple anchor nodes 102 and/or using multiple RF antennas.

In accordance with various embodiments, an exchange of wireless signals as described herein may include any or each of: (1) a motion determination system transmitting a first signal to an anchor node and the anchor node responding by transmitting a second signal to the motion determination system; (2) an anchor node transmitting a first signal to a motion determination system and the motion determination system responding by transmitting a second signal to the anchor node; (3) anchor nodes periodically transmitting signals to motion determination systems at synchronized intervals; and/or (4) a motion determination system periodically transmitting a signal to anchor nodes at synchronized intervals.

For systems in which signals are transmitted periodically at synchronized intervals, time difference of arrival (TDOA) or inverse TDOA (iTDOA) determinations may be made using arrival times of two or more received signals. For example, a motion determination system onboard a train may be configured to receive a first signal from a first anchor node and a second signal from a second anchor node. In this example, the anchor nodes may be configured to transmit the first, second, and third signals at the same time. The differences in arrival times of the first and second signals (e.g., iTDOA), together with known locations of the anchor nodes and the geometry of the train track, in this example, may be used to determine a position of the train. A system may operate similarly in which the first and second anchor nodes receive the same signal transmitted from a motion determination system onboard a train, where the anchor nodes are synchronized in time and in communication with one another to determine differences in arrival times of the signal at each anchor node (e.g., TDOA). Alternatively or additionally, signals from three or more anchor nodes may be used to estimate a position of the train, which may be converted to the geometry of the train track.

For motion determination systems that include one or more GNSS receivers, the GNSS receiver(s) may include one or more GNSS antennas that receive GNSS signals from one or more satellites and/or constellations 106 to generate GNSS data indicating the position, velocity, and/or acceleration of train 110. The processor(s) onboard train 110 (e.g., including one or more GNSS processors) may be configured to determine the GNSS data using the received GNSS signals, such as using time of flight measurements that indicate the distances (e.g., pseudo ranges) separating the GNSS receiver(s) from satellite(s) 106. In some embodiments, the GNSS data may include a triangulated position from the train 110 to satellite(s) 106. For example, the GNSS signal(s) received from satellite(s) 106 may identify the satellite(s) 106, thereby indicating the travel time(s) between transmission of the GNSS signal(s) and reception of the GNSS signal(s) to allow pseudo ranges to be calculated and a position to be triangulated using the pseudo ranges. In some embodiments, GNSS data generated using the GNSS receiver(s) (e.g., a triangulated position) may be used to determine motion characteristics of train 110. For example, a triangulated position may be and/or may indicate the position of train. Alternatively or additionally, motion characteristics other than position, such as velocity and/or acceleration, may be determined using multiple triangulated positions over time.

For motion determination systems 120 that include one or more IMUs, the IMU(s) may generate motion data responsive to detecting motion of the train 110 and provide the motion data to the processor(s) of the system(s) 120. For instance, the IMU(s) may be configured to determine one or more positions, velocities, and/or accelerations of the train 110 in the direction of the train track 104 and/or vertically with respect to the train track 104 (e.g., upwards away from the train track 104 or downwards towards the train track 104). In some embodiments, an IMU may include a gyroscope and/or accelerometer configured to provide signals indicative of acceleration of the train 110 along one or more directions. For example, motion data output by the IMU may be indicative of roll (e.g., rotational about an axis parallel to the direction of elongation of the train 110), pitch (e.g., rotational about an axis parallel to the ground surface and perpendicular to the direction of elongation of the train 110), and/or yaw (e.g., rotational about an axis perpendicular to the ground surface and the direction of elongation of the train 110) acceleration. In some embodiments, the processor(s) may be configured to determine the motion characteristics of the train 110 by accumulating motion data output by the IMU(s) over time. For example, given a position and/or velocity of the train 110 at a first time, the processor(s) may be configured to determine a later position and/or velocity of the train 110 using the position and/or velocity of the first time and the motion data generated by the IMU(s). In some embodiments, the processor(s) may be configured to convert the motion data from the IMU(s) to a direction along the geometry of the track, such as by only using vector components of acceleration along the geometry of the track.

In some embodiments, a motion determination system 120 may include the RF antenna(s), the GNSS receiver(s), and/or the IMU(s), and the processor(s) of the system may be configured to determine the motion characteristics of the train 110 using a combination of the range data from the RF antenna(s), the GNSS data from the GNSS receiver(s), and/or the motion data from the IMU(s). For example, the processor(s) may estimate motion characteristics of the train 110 using the motion data from the IMU(s), such as by estimating a position of the train 110 using a previous position of the train 110 and one or more acceleration measurements (e.g., along the geometry of the train track). In this example, the processor(s) may correct the motion characteristic estimates using range data received using the RF antenna(s) and/or GNSS data received using the GNSS receiver(s), thus reducing the uncertainty of motion characteristics provided from the motion determination system 120 to the train control system(s) 160.

Motion determination systems 120 on the same or different train cars (e.g., 112*a* and 112*b*) may further communicate motion characteristics to one another via wired and/or wireless connections within and/or among the train cars. One or more of the motion determination systems 120 may interface directly with the train control system(s) 160 to provide the motion characteristics to the train control system(s) 160, such that the train control systems 160 are able to determine whether to start, stop, or continue movement of the train 110. For instance, motion characteristics received from multiple trains may indicate that one of the trains is at risk of colliding with another one of the trains. It should be appreciated that, in some embodiments, the train control system(s) 160 may send the motion characteristics to a central control location external to the train and receive motion control instructions in response to sending the transmitted motion characteristics.

In some embodiments, the processor(s) of motion determination system 120 may be configured to perform zero-velocity determination using one or more modalities onboard train 110. As one example, the processor(s) may be configured to determine that the train 110 is not moving in response to data from the IMU(s) indicating the train has zero acceleration. In the same or another example, the processor(s) may be configured to determine that the velocity of the train 110 is below a predefined velocity, that a predefined time has elapsed since the position of the train 110 has been determined to change. In some embodiments, a combination of determinations indicating zero velocity may be used to determine that the train has zero velocity. For example, the processor(s) may be configured to determine a velocity of the train 110 using each modality individually (and/or within each modality, such as using RF signals exchanged with different anchor nodes) so as to generate velocities with little to no correlation, allowing a classifier executed by the processor(s) to identify (e.g., with an associated confidence) whether the train 110 has zero velocity. In some embodiments, an adaptive threshold for zero velocity determination may be used, such as for IMU, RF, and/or GNSS-based velocity determinations. For instance, the threshold may depend on whether a predefined amount of time has elapsed since the train 110 started up, whether the train 110 is in a zone along the track in which the train 110 is expected to stop (e.g., proximate a station), and/or other suitable factors that may affect the likelihood of error in determining zero velocity. In some embodiments, recursive state estimators described further herein may be configured to alternatively or additionally track zero velocity determinations based on individual modalities and/or within individual modalities.

Figure 2:
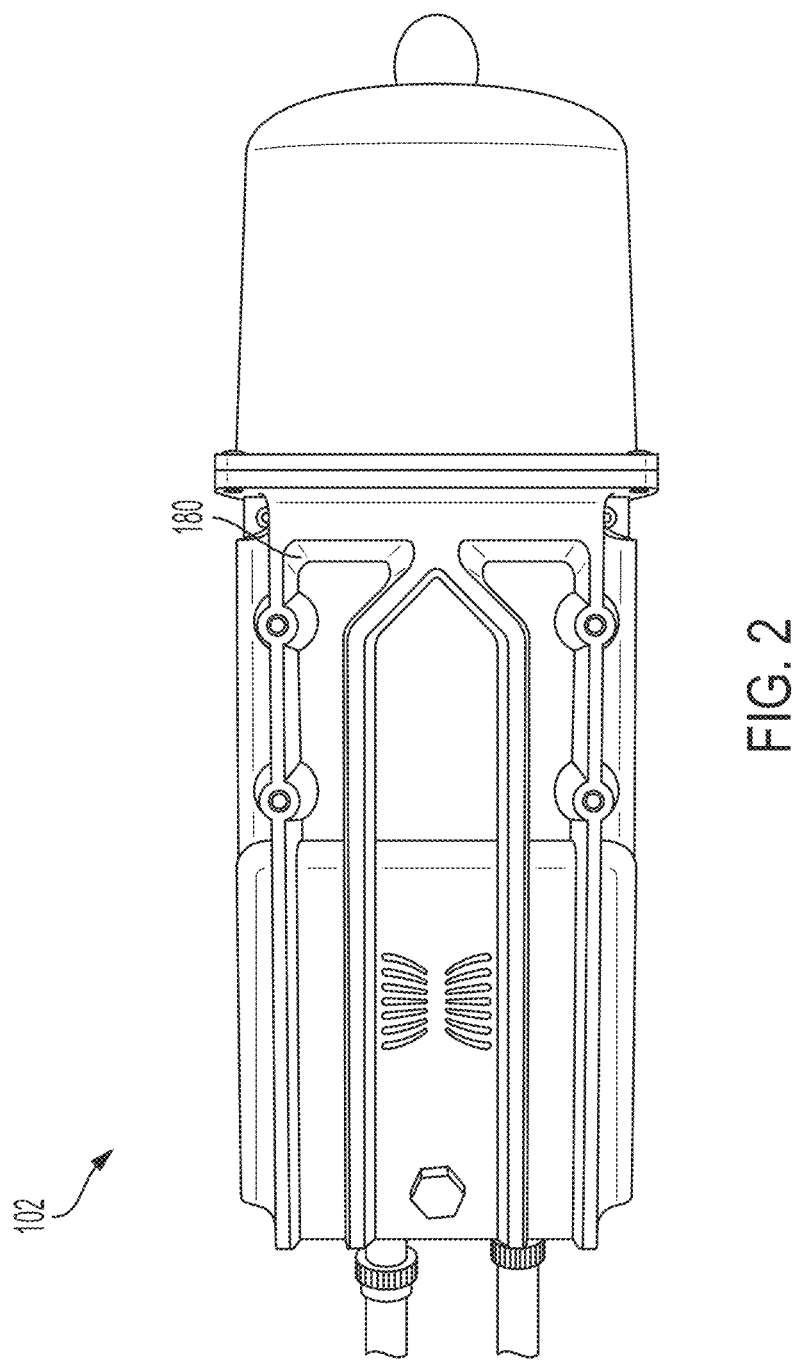
FIG. 2 is a drawing of an illustrative anchor node 102 that may be positioned along a train track, in accordance with some embodiments of the technology described herein.

FIG. 2 is a drawing of an illustrative anchor node 102 that may be positioned along a train track, in accordance with some embodiments of the technology described herein. In some embodiments, anchor node 102 may be mounted on a pole or a wall. For example, anchor node 102 may be placed on a pole or wall adjacent a train track. As shown in FIG. 2, anchor node 102 has a housing 180 containing other components of anchor node 102 (not shown). Such components may include one or more RF subsystems and one or more processors. For example, the RF subsystem(s) may be configured to transmit and/or receive RF signals to and/or from a motion determination system onboard a train for use by the motion determination system in determining motion characteristics of the train, as described herein. In some embodiments, housing 180 may be waterproof and/or dustproof to provide environmental protection for the components of anchor node 102. In some embodiments, anchor node 102 may be positioned outdoors. In some embodiments anchor node 102 may be positioned in a subway tunnel.

In some embodiments, multiple anchor nodes 102 may have a same position along a train track, such as along the direction of elongation of the train track and/or along a direction parallel to the ground below the train track and perpendicular to the direction of elongation of the train track. The inventors recognized that including multiple anchor nodes 102 having a same position (e.g., in a redundant configuration) allows for distance determination between a train and the anchor nodes 102 in the event one of the anchor nodes 102 fails during operation.

Figure 3A:
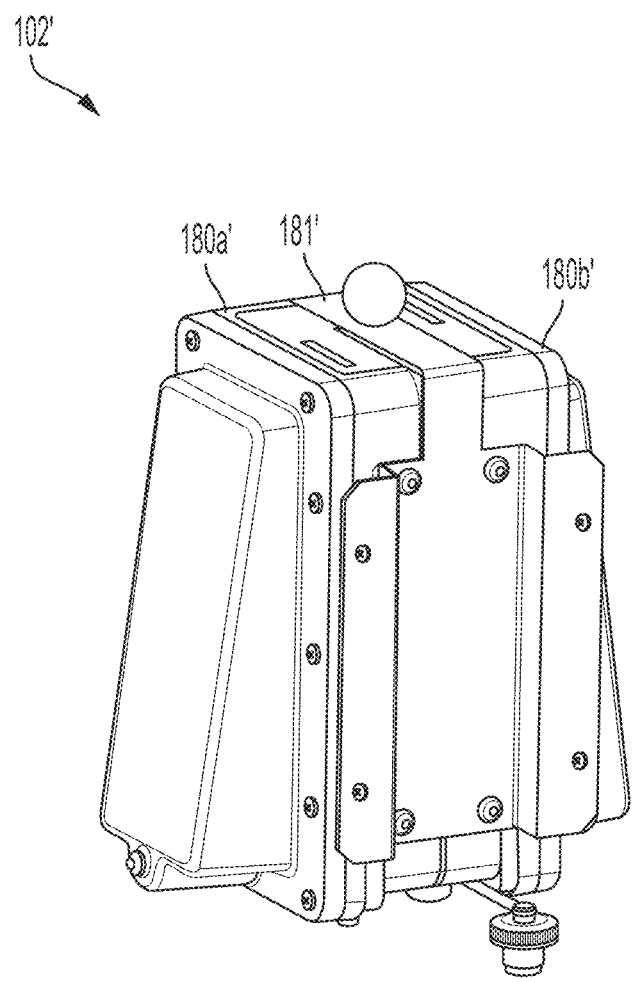
FIG. 3A is a drawing of an alternative illustrative anchor node 102' that may be positioned along a train track, in accordance with some embodiments of the technology described herein.
Figure 3B:
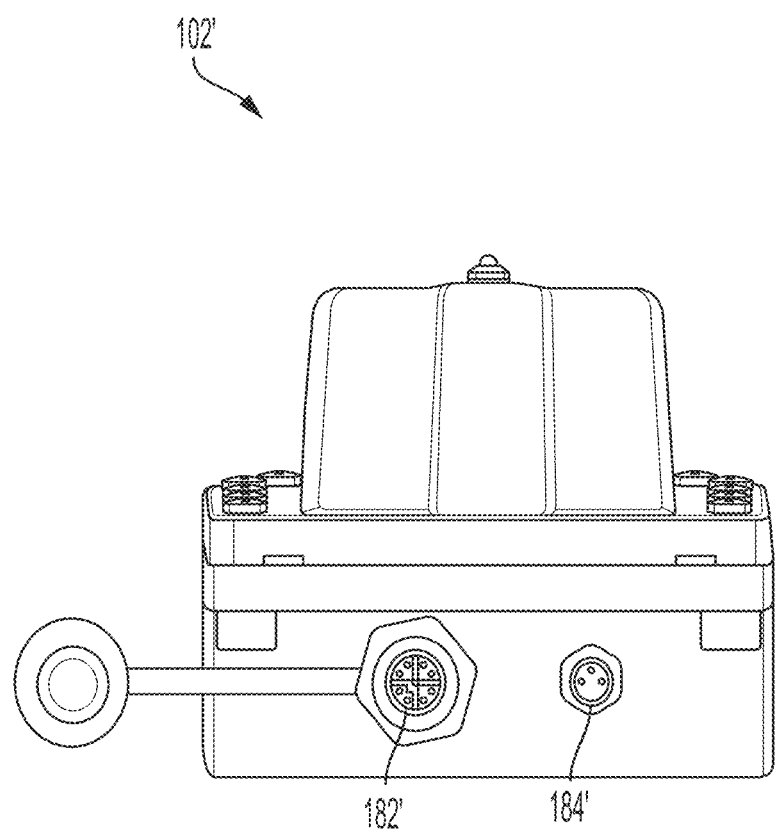
FIG. 3B is a drawing of the anchor node 102' further illustrating power and data ports of the anchor node 102', in accordance with some embodiments of the technology described herein.

FIG. 3A is a drawing of an alternative illustrative anchor node 102' that may be positioned along a train track, in accordance with some embodiments of the technology described herein. FIG. 3B is a drawing of the anchor node 102' further illustrating power and data ports of the anchor node 102', in accordance with some embodiments of the technology described herein.

In some embodiments, anchor node 102' may be configured in the manner described herein for anchor node 102. For example, anchor node 102' may include components configured to transmit and/or receive RF signals to and/or from a motion determination system onboard a train traveling along a train track when anchor node 102' is positioned along the train track.

In some embodiments, anchor node 102' may include multiple antennas oriented in different directions. For example, as shown in FIG. 3A, anchor node 102' includes a pair of housing members 180*a*' and 180*b*' positioned back-to-back and coupled together by a mounting bracket 181'. In some embodiments, each housing member 180*a*' and 180*b*' may include an antenna, such that when placed back-to-back as shown in FIG. 3A, the antennas face in opposite directions.

In some embodiments, each housing member 180a' and 180b' may contain an RF subsystem and one or more processor. For example, the RF subsystem may be configured to transmit and/or receive RF signals via the antenna to and/or from a motion determination system onboard a train for use by the motion determination system in determining motion characteristics of the train, as described herein. As shown in FIG. 3B, a data port 182' and a power port 184' are exposed at a surface of housing member 180b'. Similar ports may be exposed at a surface of housing member 180a'. In some embodiments, data port 182' may be configured to transmit and/or receive data, such as to program the RF subsystem with a known location of anchor node 102' during installation. In some embodiments, power port 184' may be configured to power the RF subsystem and/or processor within housing member 180b'. It should be appreciated that a common RF subsystem and/or processor may be shared among the antennas within separate housing members of an anchor node in other embodiments.

In some embodiments, anchor node 102' may have multiple antennas, each configured to transmit and/or receive signals to and/or from a motion determination system onboard trains traveling on different sides of anchor node 102' along the geometry of a train track. For example, a first antenna of anchor node 102' configured to transmit and/or receive signals to and/or from a motion determination system onboard a train traveling on a first side of anchor node 102' (e.g., on the east side, where the local track geometry is east to/from west), and a second antenna of anchor node 102' configured to transmit and/or receive signals to and/or from a motion determination system onboard a train traveling on a second side of anchor node 102' (e.g., on the west side). In some embodiments, anchor node 102' may be mounted on a pole or wall adjacent the train track with a first antenna facing along the geometry of the train track in the first direction (e.g., facing east) and a second antenna facing along the geometry of the train track in the second direction (e.g., facing west). As shown in FIG. 3A, mounting bracket 181' includes four screw holes that comply with a VESA standard. Anchor node 102' may be mounted on a pole or wall such that the plane in which the four screw holes are disposed is substantially parallel to and faces away from the geometry of the track at the point where anchor node 102' is positioned proximate the track. Using the above example where the track runs east to west, the four screw holes may be disposed in the plane containing the east-west directions and the vertical up-down direction, and the mounting bracket 181' is farther from the track than the housing members 180a' and 180b' are. In some embodiments, multiple anchor nodes 102' may be positioned on the same pole and/or wall for redundancy.

Figure 4:
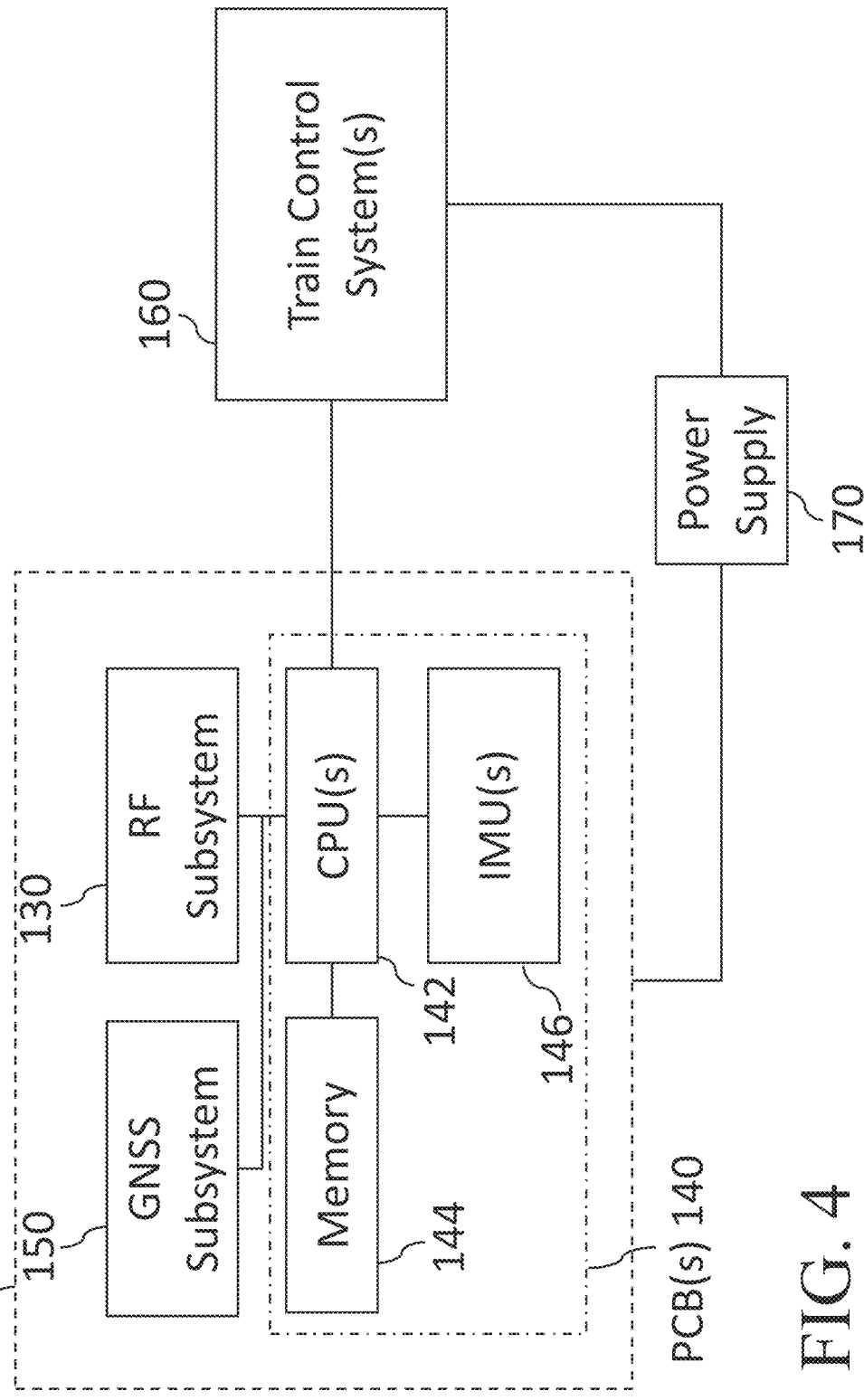
FIG. 4 is a drawing of an illustrative system 120 for determining motion characteristics of the train 110 and a train control system 160, each positioned onboard the train car 112a of FIG. 1, in accordance with some embodiments of the technology described herein.

FIG. 4 is a drawing of illustrative motion determination and train control systems 130 and 160 onboard the train car 112a of FIG. 1, in accordance with some embodiments of the technology described herein. In FIG. 4, the motion determination system 120 includes multiple motion determination modalities, namely an RF subsystem 130 including one or more radio frequency (RF) antennas, a GNSS subsystem 150 including one or more GNSS receivers, and one or more IMUs 146. The motion determination system further includes one or more processors 142 and a memory 144. It should be appreciated that, in accordance with various embodiments, motion determination systems described herein may include only one or a subset of the motion determination modalities, such as the RF antenna(s), the GNSS receiver(s), or the IMU(s), but not each. Although not shown in FIG. 4, in some embodiments, motion determination system 120 may alternatively or additionally include one or more velocity sensors, such as doppler radars, optical sensors, and/or tachometers coupled to processor(s) 142.

As illustrated in FIG. 4, the processor(s) 142, IMU(s) 146, and memory 146 are disposed on one or more PCBs 140 coupled to RF subsystem 130. For instance, RF antenna(s) of RF subsystem 130 may provide range data to the processor(s) 142 for determining the motion characteristics. It should be appreciated that the components disposed on PCB(s) 140 may vary in accordance with various embodiments. For instance, in some embodiments, the IMU(s) 146 is/are not disposed on PCB(s) 140. Alternatively or additionally, the system 120 may include multiple PCBs 140 with components positioned on the multiple PCBs 140. As an example, the IMU(s) 146 may be positioned on respective PCBs 140. Further, in some embodiments, the RF antenna(s) of RF subsystem 130 may be disposed on one or more of PCBs 140.

In some embodiments, memory 144 may store one or more representations of the geometry of one or more train tracks 104. For example, the representation(s) stored in memory 144 may include data structures indicating and/or specifying the geometry of the train track, positions along the geometry of the train track (e.g., along one or more rails of the train track and/or between the rails, such as along the centerline between the rails), the direction of the train track at one or more positions, and/or the shape and/or interconnections of portions of the train track. In some embodiments, the data structures may link positions along the geometry of the train track to geographic positions in 3D space (e.g., longitude, latitude, and/or elevation coordinates). For example, geographic positions in 3D space may use a Euclidean frame of reference and/or a geodetic frame of reference. For instance, the frame of reference may be Earth-centered Earth-fixed (ECEF), a tangent plane local reference frame (e.g., North East Down (NED)), and/or a map projection reference frame (e.g., Universal Traverse Mercator (UTM)). In some embodiments, some or all positions along the track geometry stored in memory 144 may correspond to multiple respective geographic positions in 3D space, such as in the elevation dimension, allowing at least some geographic positions in 3D space to collapse to a lesser number of corresponding track geometry positions. For example, the track geometry positions may be limited only to positions in 3D space that a train (and/or components on the train) can feasibly occupy while the train travels on the train track(s) 104.

In some embodiments, track geometry representation(s) saved in memory 144 may include data structures representing a plurality of track segments. For example, each track segment may include a plurality of track geometry positions corresponding to geographic positions in 3D space. In some embodiments, the data structure(s) may further represent a vector direction (e.g., in 3D space) of the track segment. In one example, the track segment may be represented as a straight line in the vector direction of the track segment for purposes of motion determination. For instance, positions along the track geometry and/or track segments of may be stored as a linked and/or doubly linked list of geometric primitives in memory 144, such as with each geometric primitive linked to the next primitive in the list in memory 144, the next primitive corresponding to an adjacent position along the track geometry and/or track segment. In some embodiments, processor(s) 142 may be configured to convert geographic positions in 3D space (e.g., observed positions based on GNSS and/or RF signals) to positions along the geometry of the train by transforming the geographic positions in 3D space to corresponding track geometry positions represented in memory 144.

In some embodiments, motion determination system 120 may be configured to determine motion characteristics (e.g., an observed position) of a train 110 using signals transmitted and/or received via RF subsystem 130. For example, one or more range processors of RF subsystem 130 may be configured to determine a distance between the RF antenna(s) of RF subsystem 130 and one or more anchor nodes 102, as described further herein including with reference to FIG. 5. In some embodiments, RF subsystem 130 may provide the distance(s) to processor(s) 142, and processor(s) 142 may be configured to determine motion characteristics using the distance(s). For example, if known positions of the anchor nodes 102 are stored in memory 140, processor(s) 142 may be configured to determine the position of train 110 using the known position of an anchor node 102 and the distance between the RF antenna(s) of RF subsystem 130 and the anchor node 102 (e.g., taking into account a known position of the RF antenna(s) onboard train 110). In some embodiments, processor(s) 142 may be configured to integrate the determined distance(s) with the geometry of the train track. For example, processor(s) 142 may be configured to identify one or more observed positions along the geometry of the track stored in memory 144 disposed at the distance(s) with respect to anchor node(s) 102 used to obtain the distance(s).

In some embodiments, motion determination system 120 may be configured to determine motion characteristics (e.g., an observed position) of a train 110 using GNSS signals received using GNSS subsystem 150. For example, one or more GNSS processors of GNSS subsystem 150 may be configured to determine an observed (e.g., triangulated) position of GNSS subsystem 150 using the received GNSS signal(s), as described further herein including with reference to FIG. 5. In some embodiments, GNSS subsystem 150 may be configured to provide the observed position(s) to processor(s) 142, and processor(s) 142 may be configured to determine motion characteristics using the observed position(s). For example, if the observed position coincides with a position along the geometry of the train track stored in memory 144, processor(s) 142 may be configured to convert the observed position of train 110 to the corresponding position along the geometry of the train track stored in memory 144. In some embodiments, processor(s) 142 may be configured to integrate the observed position with the geometry of the train track. For example, processor(s) 142 may be configured to identify one or more position(s) along the track geometry stored in memory 144 nearest the observed position and select the identified position(s) to integrate the observed position with the geometry of the train track.

In some embodiments, processor(s) 142 may be configured to determine a velocity of train 110 using a previous position of train 110 (e.g., stored in memory 144), the current position of train 110, and a travel time of train 110 between the positions. Alternatively or additionally, processor(s) 142 may be configured to determine a velocity of train 110 using an observed velocity of the train from RF subsystem 130 and/or GNSS subsystem 150. Further alternatively or additionally, processor(s) 142 may be configured to determine a velocity of train 110 using an observed velocity from one or more velocity sensors of motion determination system 120 such as a doppler radar, optical sensor, and/or tachometer.

In some embodiments, processor(s) 142 may be configured to determine an acceleration of train 110 using the current velocity of train 110, a previous velocity of train 110 (e.g., stored in memory 144), and a travel time of train 110 between the velocities. In some embodiments, motion determination system 120 may be configured to determine motion characteristics of a train using the IMU(s) 146. For example, the IMU(s) 146 may output to processor(s) 142 one or more signals indicative of roll, pitch, and/or yaw acceleration of the train 110. In this example, a previous position, velocity, and/or acceleration of the train 110 may be stored in memory 144. A current velocity of the train 110 (e.g., along the train track and/or away from the train track) may be determined using a previous velocity of the train 110, the current acceleration of the train 110 (e.g., along a direction of the train track), and a travel time of train 110 between the previous velocity and the current acceleration. A current position and/or pitch of the train 110 may be determined using a previous position of the train 110, the current velocity of the train 110, and the travel time of train 110 between the positions. In some embodiments, processor(s) 142 may be configured to integrate an observed position, velocity, and/or acceleration from IMU(s) 146 with the geometry of the train track, such as by using observations and/or components of observations aligned with the geometry of the portion of the train track the train is determined to be traveling along.

In some embodiments, an analog-to-digital converter (ADC) may be included in IMU(s) 146 and/or coupled between IMU(s) 146 and processor(s) 142 to digitize signals from IMU(s) 146 before the signals are provided to processor(s) 142. In some embodiments, processor(s) 142 may store IMU signals and/or data derived from the IMU signals in memory 144, for example, in association with a time at which the IMU signals were received and/or generated. In some embodiments, signals output from IMU(s) 146 may indicate that the train has zero acceleration, and processor(s) 142 may be configured to determine using these signals that the train is not moving (e.g., in combination with previous signals indicating deceleration).

In some embodiments, motion determination system 120 may be configured to determine motion characteristics of a train using a combination of signals transmitted and/or received using RF subsystem 130, GNSS subsystem 150, and/or IMU(s) 146. For example, processor(s) 142 may receive from RF subsystem 130 one or more distances between the RF antenna(s) of RF subsystem 130 and one or more respective anchor nodes 102, an observed position and/or velocity from GNSS subsystem 150, and one or more signals indicative of roll, pitch, and/or yaw acceleration from IMU(s) 146. In some embodiments, processor(s) 142 may be configured to determine a first set of motion characteristics (e.g., position, velocity, and acceleration) of the train 110 using the distance(s) provided by RF subsystem 130, a second set of motion characteristics of the train 110 using the position and/or velocity from GNSS subsystem 150, and/or a third set of motion characteristics of the train 110 using the signal(s) provided by IMU(s) 146. For example, the sets of motion characteristics may be different. Because IMU(s) 146 may be prone to drift over time, processor(s) 142 may override the second set of motion characteristics with the first set of motion characteristics. For example, when a position determined using RF signals conflicts with a position determined using IMU data, the position determined using RF signals may be selected as the determined position of the train 110. Similarly, motion characteristics determined using GNSS data may override motion characteristics determined using range data and/or IMU data.

In some embodiments, processor(s) 146 may be configured to reconcile motion characteristics determined using RF signals received by RF subsystem 130 with motion characteristics determined using GNSS signals received by GNSS subsystem 150 and/or motion characteristics determined using signals from IMU(s) 146. In some embodiments, processor(s) 146 may adjust motion determination characteristics of IMU(s) 146 if motion characteristics determined using RF and/or GNSS signals conflict with motion characteristics determined using IMU(s) 146. As used herein, motion determination characteristics are parameters that may factor into determining motion characteristics using RF signals, GNSS signals, and/or IMU data, such as estimated IMU accelerometer and/or gyroscope biases. For example, gyroscope and/or accelerometer biases over time may be stored in memory 144 and used to determine motion characteristics from the signal(s) generated by IMU(s) 146. In this example, processor(s) 142 may be configured to update the motion determination characteristics stored in memory 144 based on differences between the determined sets of motion characteristics. In some embodiments, processor(s) 142 may be configured to determine new gyroscope and/or accelerometer biases that reduce and/or minimize residuals between motion characteristics determined using RF signals, GNSS signals, and/or corresponding motion characteristics determined using IMU(s) 146. For example, the new gyroscope and/or accelerometer biases, when applied to the signal(s) received from IMU(s) 146, may reduce and/or minimize discrepancies between positions, velocities, and accelerations determined using RF signals and positions, velocities, and accelerations determined using IMU(s) 146.

In some embodiments, motion determination system 120 may include multiple IMUs 146, GNSS subsystems 150, and/or RF subsystems 130. The inventors recognized that some IMUs 146, GNSS subsystems 150, and/or RF subsystems 130 may fail during operation of motion determination system 120, and including multiple IMUs 146, GNSS subsystems 150, and/or RF subsystems 130 configured redundantly reduces the susceptibility of motion determination system 120 to overall failure. For instance, if an IMU 146, a GNSS subsystem 150, and/or an RF subsystem 130 fails, the failure may be detected as a result of inconsistent data determined among and/or using a combination of the IMUs 146, GNSS subsystems 150, and/or the RF subsystems 130. Upon determining the failure of an IMU 146, GNSS subsystem 15, and/or RF subsystem 130, the motion determination system 120 may ignore data from the failed IMU 146, GNSS subsystem 150, and/or RF subsystem 130.

Figure 5:
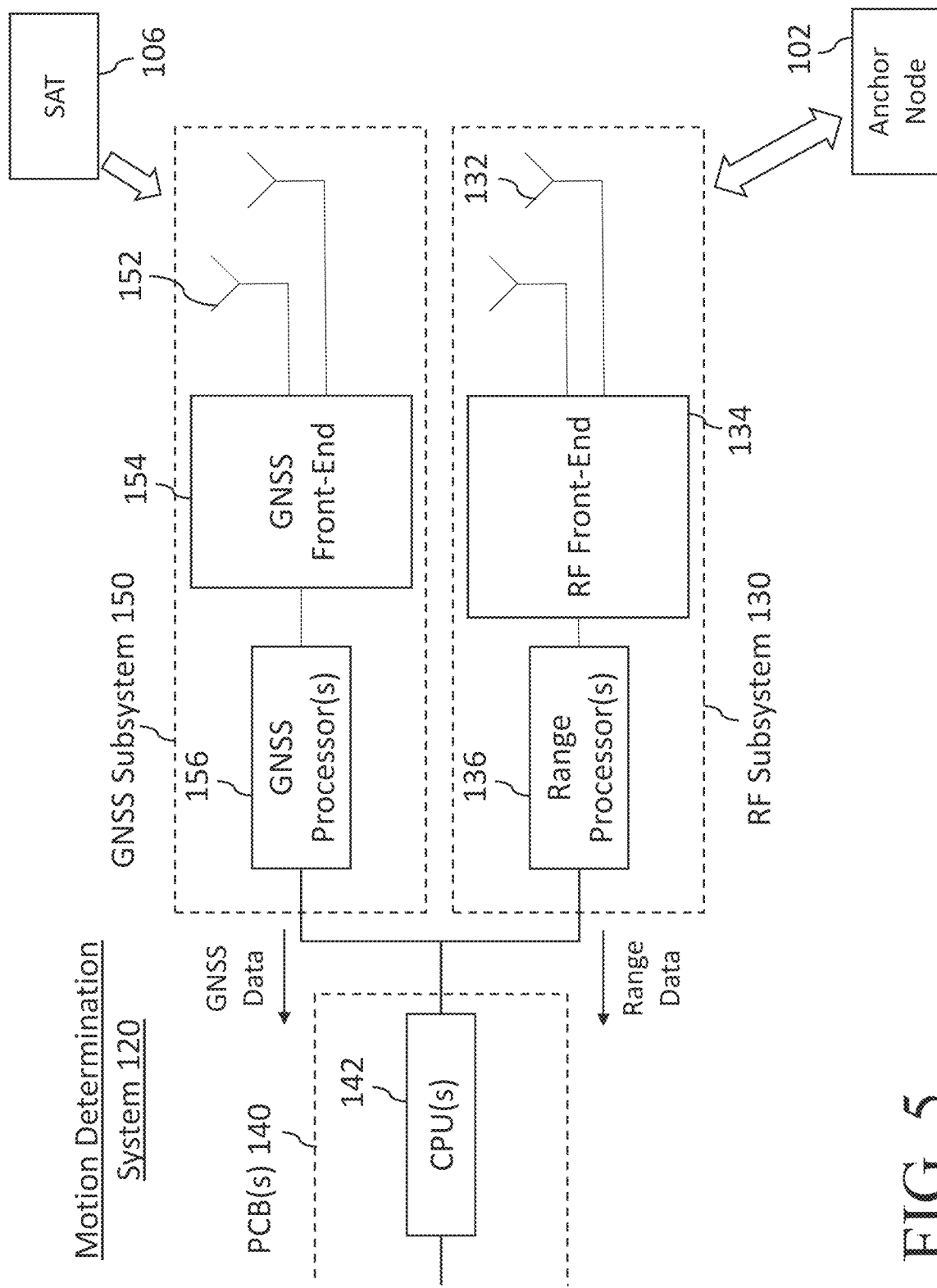
FIG. 5 is a drawing of illustrative components of a system 120 for determining motion characteristics of a train traveling along a train track, in accordance with some embodiments of the technology described herein.

FIG. 5 is a drawing of illustrative components of a system 120 for determining motion characteristics of a train traveling along a train track, in accordance with some embodiments of the technology described herein. In FIG. 5, RF subsystem 130 includes one or more range processors 136 coupled to multiple RF antennas 132 via an RF front-end 134. Also shown in FIG. 5, GNSS subsystem 150 includes one or more GNSS processor(s) 156 coupled to multiple GNSS antennas 152 via a GNSS front-end 154.

In some embodiments, RF antennas 132 may be configured to transmit RF signals to and/or receive RF signals from one or more anchor nodes 102. In some embodiments, RF front-end 134 may be configured to prepare baseband signals for transmission by RF antennas 132 and/or prepare RF signals received by RF antennas 132 for processing by range processor(s) 136. In some embodiments, range processor(s) 136 may be configured to determine a distance between RF antennas 132 and an anchor node 102 using signals exchanged between the RF antenna(s) 132 and the anchor nodes 102.

In some embodiments, RF antennas 132 may be positioned in a part of a train car that facilitates communication with anchor nodes positioned adjacent the train track. For instance, RF antennas 132 may be positioned on an external face of the train car, and/or near an interior wall of the train car that is not shielded with metal or other electrical conductors. In some embodiments, a first RF antenna may be positioned at or near the front of a train car and a second RF antenna may be positioned at or near the rear of the train car. While multiple RF antennas 132 are shown in FIG. 5, it should be appreciated that a single RF antenna 132 may be included in an RF subsystem 130. For example, the same RF antenna 132 may be used for both transmission and reception. Alternatively, the same RF antenna 132 may be used only for transmission or only for reception. According to various embodiments, one or each RF antenna 132 may include one or more antenna elements, such as a single element (e.g., a dipole) and/or an array of elements (e.g., a dipole array). For example, an array of elements may be operated as a phased array, and/or may be operated together to transmit and/or receive RF signals.

In accordance with various embodiments, RF antennas 132 may include ultra-wideband (UWB) antennas. For example, RF antenna(s) 132 may be configured to receive signals having a center frequency on the order of 3-10 GHz, such as between 3-5 GHz, between 3-5 GHz, between 4-5 GHz, and/or between 7-10 GHz. RF antenna(s) 132 may have a bandwidth of at least 400 MHz and/or at least 500 MHz, such as at least 1 GHz and/or at least 2 GHz. In one example, RF antennas 132 may be configured to transmit and/or receive over a frequency range from 3.1-4.8 GHz. RF antennas 132 may be configured to communicate with anchor nodes 102 that are configured for the same or an overlapping frequency range. In one example, RF antennas 132 may have a gain of approximately 6 dB, whereas antennas of anchor nodes 102 may be substantially omnidirectional (e.g., having a gain of approximately 0 dB). In another example, anchor node antennas may have a gain of approximately 6 dB, with antennas of an anchor node oriented in at least two different directions. In one example, an anchor node 102 may include one or more RF antennas coupled to circuitry configured to responsively transmit signals after receiving one or more signals from RF antennas 132 of the system 120 at a same or different frequency. It should be appreciated that RF antennas 132 may be configured to operate in any suitable frequency range and with any suitable gain level. While RF antennas 132 are shown including two antennas in FIG. 5, in some embodiments, RF antennas 132 may include greater or fewer than two antennas.

In some embodiments, RF front-end 134 may include circuitry for modulating, up-converting, and amplifying signals transmitted to the anchor node(s) via RF antennas 132, and/or amplifying, down-converting, and/or demodulating signals received from the anchor node(s) 102 via RF antenna(s) 132. For instance, RF front-end 134 may be configured for modulating and/or demodulating signals using ALOHA modulation and/or time division multiple access (TDMA) modulation. RF front-end 134 may further include one or more mixers and local oscillators for up-converting signals from baseband to an RF carrier frequency for transmission, and/or down-converting received signals from the same or a different RF carrier frequency to baseband for processing by range processor(s) 136. Additionally, RF front-end 134 may include one or more transmit (e.g., power) amplifiers for signal transmission and/or one or more receive (e.g., low noise) amplifiers for signal reception. In some embodiments, multiple mixers and/or local oscillators and/or phase shifters or time delay units may be used, such as for in-phase and quadrature demodulation and/or beamforming (e.g., using an array of RF antennas 132). In some embodiments, RF front-end 134 may include a digital-to-analog converter (DAC) for signal transmission and/or an analog-to-digital converter (ADC) for signal reception. In some embodiments, RF antennas 132 and/or the RF antenna(s) of the anchor node(s) 102 may be capable of signal transmission over a range of 500 meters and/or 1000 meters while maintaining a range data precision on the order of centimeters (cm) (e.g., 2-3 cm).

In some embodiments, the range processor(s) 136 may be configured to determine range data using RF signals transmitted to and/or received from the anchor node(s) 102. For example, range processor(s) 136 may be configured to determine a distance between RF antenna(s) 132 and an anchor node 102, such as by calculating a one-way time of flight between RF antennas 132 and the anchor node(s) 102 using signals transmitted to and received from the anchor node(s) 102. For instance, in some embodiments, range processor(s) 136 may be configured to record a time when RF signals are transmitted to the anchor node(s) 102 using RF antennas 132 such that, upon reception of RF signals from the anchor node(s) 102, range processor(s) 136 may be configured to determine the round-trip travel time between when the RF signals were transmitted to the anchor node(s) 102 and when the RF signals were received from the anchor node(s) 102. Range processor(s) 136 may be configured to subtract from the round-trip travel time a known delay between when the anchor node(s) 102 are configured to receive RF signals and transmit RF signals in response, and divide the resulting time by two to obtain the one-way travel time of signals transmitted between RF antennas 132 and the anchor node(s) 102. Range processor(s) 136 may be further configured to multiply the one-way travel time by the wave speed of the RF signals (e.g., the speed of light in air) to obtain a distance between RF antennas 132 and the anchor node(s) 102. In some embodiments, range processor(s) 136 may be configured to determine a velocity, which may be included in the range data, such as using doppler information in received RF signals. For example, the doppler information may include a doppler shift in frequency and/or other artifacts of received RF signals indicating the velocity of the train 110.

In some embodiments, GNSS antennas 152 may be configured receive GNSS signals from one or more satellites 106. In some embodiments, GNSS front-end 154 may be configured to prepare GNSS signals received by GNSS antennas 152 for processing by GNSS processor(s) 156. In some embodiments, GNSS processor(s) 156 may be configured to determine a global position of GNSS subsystem 150 using GNSS signals exchanged received by GNSS antenna(s) 152 from the satellite(s) 106.

In some embodiments, GNSS antenna(s) 152 may be positioned in a part of a train car that facilitates reception of GNSS signals from satellites RF visible overhead and/or outdoors. For instance, GNSS antennas 152 may be positioned on an external face of the train car, and/or in or near an interior wall of the train car that is not shielded with metal or other electrical conductors. In some embodiments, GNSS antennas 152 may be configured to receive signals having a center frequency on the order of 1-3 GHz, such as to receive GNSS signals from one or a variety of satellite-based transmitters. Examples of suitable satellite-based transmission systems and associated constellations include the Global Positioning System (GPS), Galileo, GLONASS, BeiDou, India Regional Navigation Satellite System (NavIC), Quasi-Zenith Satellite System (QZSS). In some embodiments, one or more of GNSS antennas 152 may be omnidirectional. Alternatively or additionally, one or more of GNSS antennas 152 may be at least partially directional so as to focus signal reception in the expected direction of satellite(s) (e.g., when oriented toward the sky). It should be appreciated that GNSS antennas 152 may be configured to operate in any suitable frequency range and with any suitable gain level. While GNSS antennas 152 are shown including two antennas in FIG. 5, in some embodiments, GNSS antennas 152 may include greater or fewer than two antennas.

In some embodiments, GNSS front-end 154 may include circuitry for amplifying, down-converting, and/or demodulating GNSS signals received from the satellite(s) 106 via GNSS antenna(s) 152. For instance, GNSS front-end 154 may be configured for demodulating signals using multiple access modulation, such as code division multiple access (CDMA), frequency division multiple access (FDMA), TDMA, and/or combinations thereof. GNSS front-end 154 may further include one or more mixers and local oscillators for down-converting received signals from the same or a different carrier frequency to baseband for processing by GNSS processor(s) 156. Additionally, GNSS front-end 154 may include one or more receive amplifiers for signal reception. In some embodiments, multiple mixers and/or local oscillators and/or phase shifters or time delay units may be used, such as for in-phase and quadrature demodulation and/or beamforming (e.g., using an array of GNSS antennas 152). In some embodiments, GNSS front-end 154 may include an ADC for signal reception.

In some embodiments, GNSS processor(s) 156 may be configured to determine GNSS data using GNSS signals received from satellite(s) 106. For example, GNSS processor(s) 156 may be configured to determine an observed position of GNSS subsystem 150, such as by triangulation using calculated pseudo ranges between GNSS subsystem 150 and the satellite(s) 106. For instance, GNSS processor(s) 156 may be configured to record a time when GNSS signals are received from the satellite(s) 106 and determine the travel time between when the GNSS signals were transmitted by the satellite(s) 106 and when the GNSS signals, thereby indicating pseudo ranges. In some embodiments, GNSS processor(s) 156 may be configured to identify the satellite(s) 106 that transmitted the received GNSS signals to determine the travel time. In some embodiments, GNSS processor(s) 156 may be configured to triangulate the observed position of GNSS subsystem 150 using one or more positions of satellite(s) 106 and calculated pseudo ranges. GNSS processor(s) 156 may be further configured to apply correction techniques (e.g., dilution of precision and/or reference clock bias correction) when determining the observed position of the GNSS subsystem 150. In some embodiments, GNSS processor(s) 156 may be configured to output to processor(s) 142 GNSS data indicating coordinates of one or more observed geographic positions in 3D space. In some embodiments, GNSS processor(s) 156 may be configured to observe and output one or more velocities using multiple observed positions and an elapsed time between the observed positions.

In some embodiments processor(s) 142 may be configured to provide one or more observed, estimated, and/or determined positions, velocities, and/or accelerations to range processor(s) 136 and/or GNSS processor(s) 156 to be included in generating range data and/or GNSS data. As one example, range processor(s) 136 may be configured to use an observed position from GNSS processor(s) 136 to filter out range data that is inconsistent with the observed position, and/or vice versa. Alternatively or additionally, in some embodiments, range processor(s) 136 and/or GNSS processor(s) 136 may be configured to integrate observed positions and/or distances with the geometry of the train track stored in memory 144.

As described herein, a satellite or anchor node is RF visible to the appropriate subsystem when signals may be transmitted to and/or received from the satellite or anchor node having power levels exceeding the sensitivity levels of the receivers. For example, a GNSS receiver may need to be in the line-of-sight of a satellite to receive signals exceeding the sensitivity level of the receiver, which may be obstructed by some tunnels or bridges. As another example, an RF subsystem and/or anchor node may need to be in the optical line-of-sight and antenna beamwidth of one another to receive signals exceeding their respective sensitivity levels. Signals may be obstructed by tunnel walls or other trains, and/or may be too attenuated over a large distance (e.g., over 2000 meters) to exceed the receiver sensitivity level. It should be appreciated, however, that optical line-of-sight is not necessarily required to be RF visible. For example, in the case of anchor nodes and RF subsystems, RF signal processing may be used to account for multipath effects due to non-line of sight communication. Alternatively or additionally, attenuation from optical line-of-sight blocking objects may be small enough over a short communication range and/or for a small object to satisfy the sensitivity of the receiver.

Figure 6:
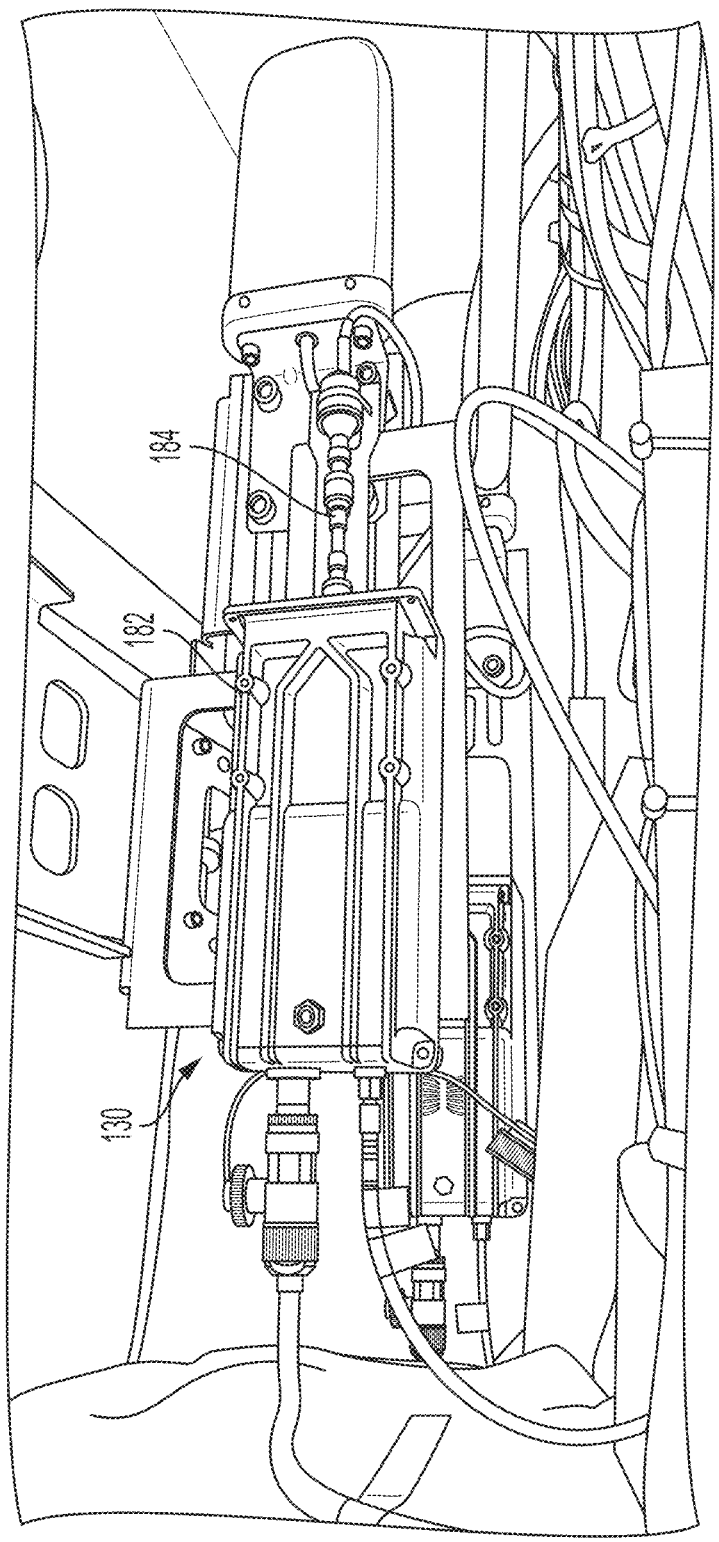
FIG. 6 is a drawing of illustrative RF and GNSS subsystems 130 and 150 of the system 120 for determining motion characteristics of a train, in accordance with some embodiments of the technology described herein.

FIG. 6 is a drawing of an illustrative RF subsystem 130 of a system 120 for determining motion characteristics of a train, in accordance with some embodiments of the technology described herein. In some embodiments, RF subsystem 130 may be positioned onboard a train. For example, in FIG. 6, RF subsystem 130 is shown in an upper portion of a train car, which may be positioned above the cabin of the train car. In this example, the cabin may house the train crew, passengers, and/or cargo. In some embodiments, multiple RF subsystems 130 or multiple RF antennas of a single RF subsystem may be positioned in a single train car, such as at opposite ends of the train car. For example, an RF subsystem and/or RF antenna positioned at an end of a train car that is not adjacent another train car may be configured to transmit and/or receive RF signals used in range data determination. In this example, RF subsystems 130 positioned on different train cars at ends of the train cars that are adjacent one another may be configured to communicate range data and/or motion characteristics to one another such that the range data and/or motion characteristics may be shared among multiple motion determination systems 120 on the different train cars.

As shown in FIG. 6, RF subsystem 130 includes a housing 182 containing other components of RF subsystem 130. RF subsystem 130 is also shown coupled to an electrical connector 184, which may be a coaxial connector. In some embodiments, electrical connector 184 may be configured to transport high frequency (e.g., RF or baseband) signals to other components of motion determination system 120. For example, one or more RF antennas contained in housing 182 may be configured to provide received signals to electrical connector 184 and/or transmit signals received from electrical connector 184. Alternatively or additionally, the RF antenna(s) may be configured to transmit signals in response to receiving signals via electrical connector 184. In some embodiments, RF antennas of RF subsystem 130 may be positioned outside of housing 182 and coupled to other components (e.g., processor(s)) of RF subsystem contained within housing 182.

Figure 7A:
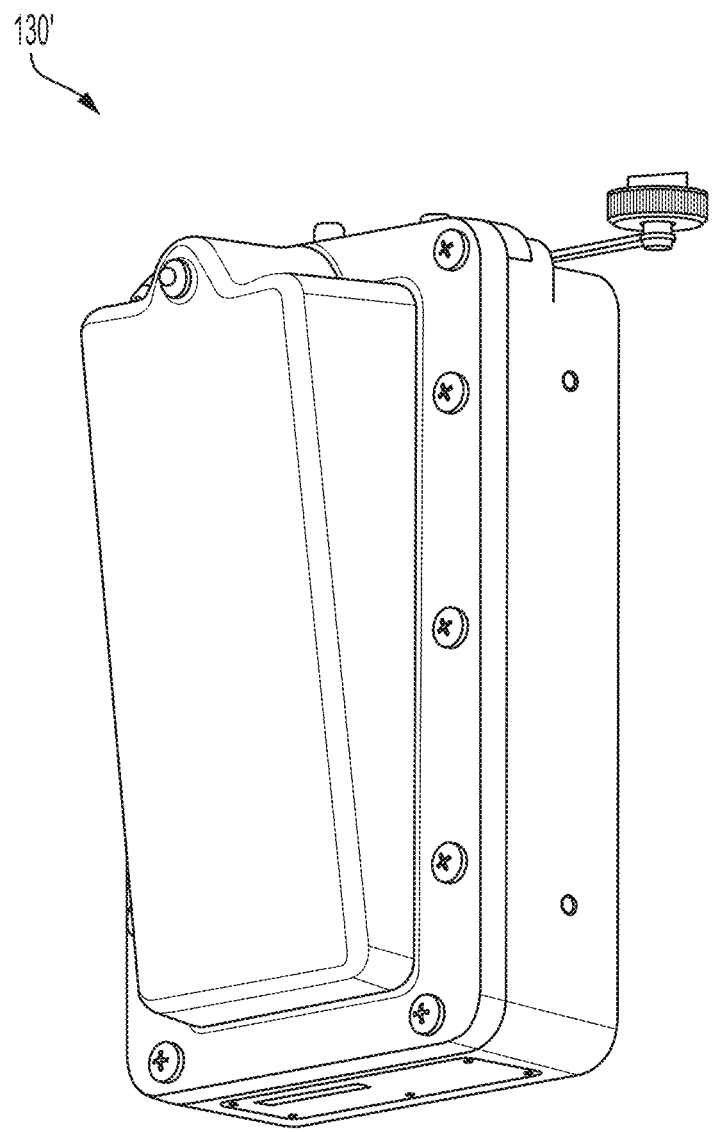
FIG. 7A is a drawing of an alternative illustrative RF subsystem 130' that may be included in a system for determining motion characteristics of a train, in accordance with some embodiments of the technology described herein.
Figure 7B:
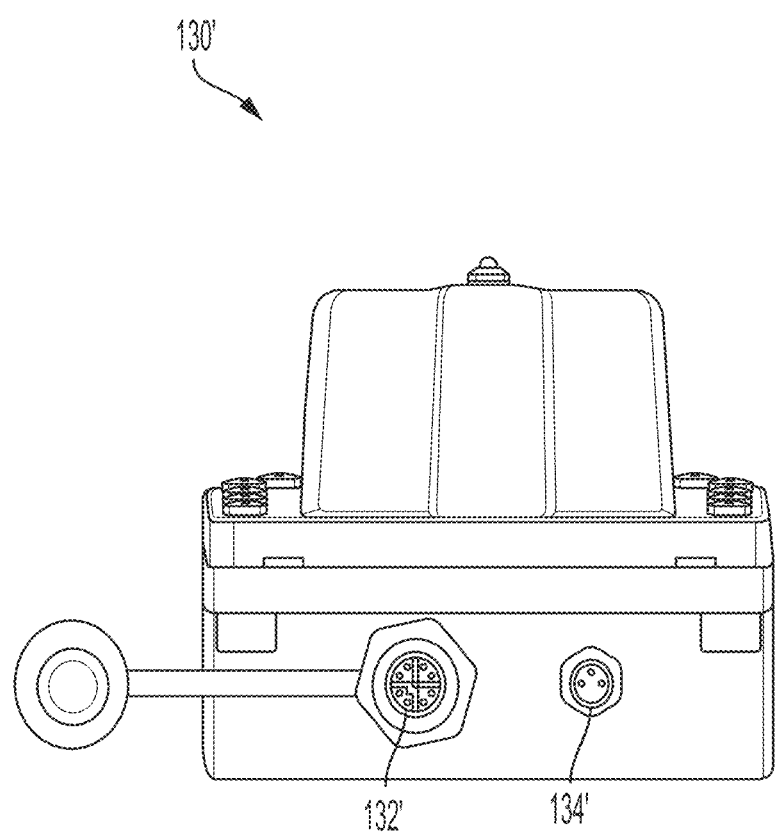
FIG. 7B is a drawing of the RF subsystem 130' further illustrating power and data ports of the RF subsystem 130', in accordance with some embodiments of the technology described herein.

FIG. 7A is a drawing of an alternative illustrative RF subsystem 130' that may be included in a system for determining motion characteristics of a train, in accordance with some embodiments of the technology described herein. FIG. 7B is a drawing of the RF subsystem 130' further illustrating power and data ports of the RF subsystem 130', in accordance with some embodiments of the technology described herein.

In some embodiments, RF subsystem 130' may be configured in the manner described herein for RF subsystem 130. For example, RF subsystem 130' may include one or more range processors coupled to one or more RF antennas via an RF front-end.

In some embodiments, multiple RF subsystems 130' may be positioned onboard a train with their antennas oriented in different directions. For example, as shown in FIG. 7A, RF subsystem 130' includes a housing member that may include an antenna, such that when multiple RF subsystems 130' face in different directions, the antennas face in different directions. As shown in FIG. 7B, a data port 132' and a power port 134' are exposed at a surface of the housing member. In some embodiments, data port 132' may be configured to transmit and/or receive data, such as to provide range data to a processor of a motion determination system. In some embodiments, power port 134' may be configured to power the RF subsystem and/or a range processor within the housing member.

In some embodiments, RF subsystems 130' may be positioned onboard a train, each configured to transmit and/or receive signals to and/or from anchor nodes on different sides of the train along the geometry of a train track. For example, a first RF subsystem 130' may be configured to transmit and/or receive signals to and/or from anchor nodes on a first side of the train (e.g., in front of the train) and a second RF subsystem may be configured to transmit and/or receive signals to and/or from anchor nodes on a second side of the train (e.g., behind the train). In some embodiments, at least one RF subsystem 130' may be placed at the front and/or rear of the train and/or at the front and/or rear of each train car.

Figure 8:
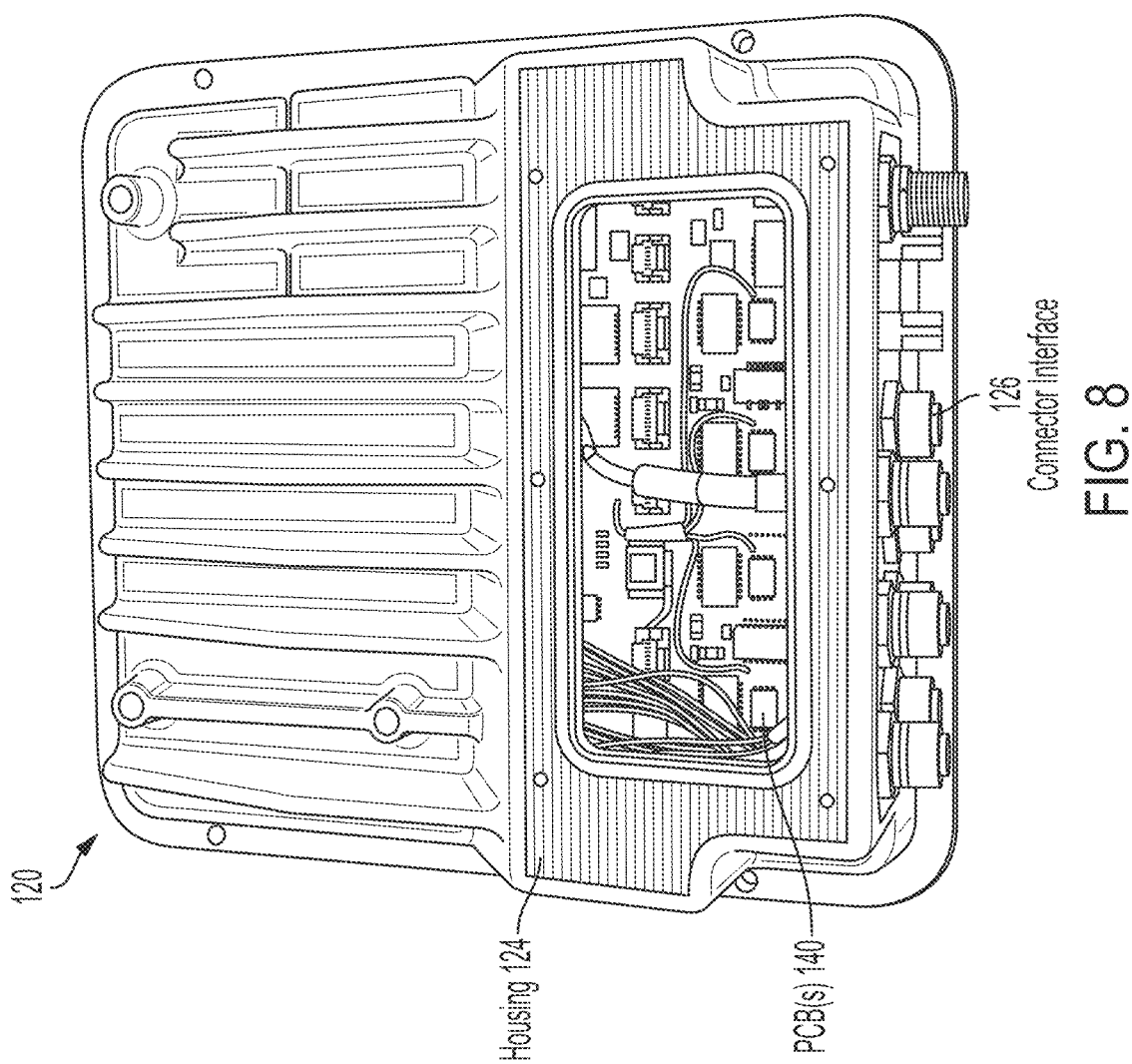
FIG. 8 is drawing of illustrative components of a system for determining motion characteristics of a train, including printed circuit boards 140, a connector interface 126, and a housing 124, in accordance with some embodiments of the technology described herein.

FIG. 8 is drawing of illustrative components of a system 120 for determining motion characteristics of a train, including one or more printed circuit boards (PCBs) 140, a connector interface 126, and a housing 124, in accordance with some embodiments of the technology described herein. As shown in FIG. 8, housing 124 contains PCB(s) 140 and connector interface 126. In some embodiments, housing 124 may have a window exposing at least a portion of PCB(s) 140 to facilitate maintenance of system 120. For example, equipment may be inserted through the window and used to test components of PCB(s) 140. In some embodiments, PCB(s) 140 may include one or more processors, IMU(s), and/or a memory, as described herein including with reference to FIG. 4. In some embodiments, connector interface 126 may be configured for electrically coupling to RF subsystem 130 and/or GNSS subsystem 150. For example, one or more electrical cables may connect the electrical connector 184 of RF subsystem 130 to connector interface 126 of system 120. Alternatively or additionally, in some embodiments, connector interface 126 may be configured for electrically coupling to train control system 160 via one or more electrical cables and/or over a communication network, and/or other motion determination systems 120 onboard the train via one or more electrical cables and/or over a communication network.

Figure 9:
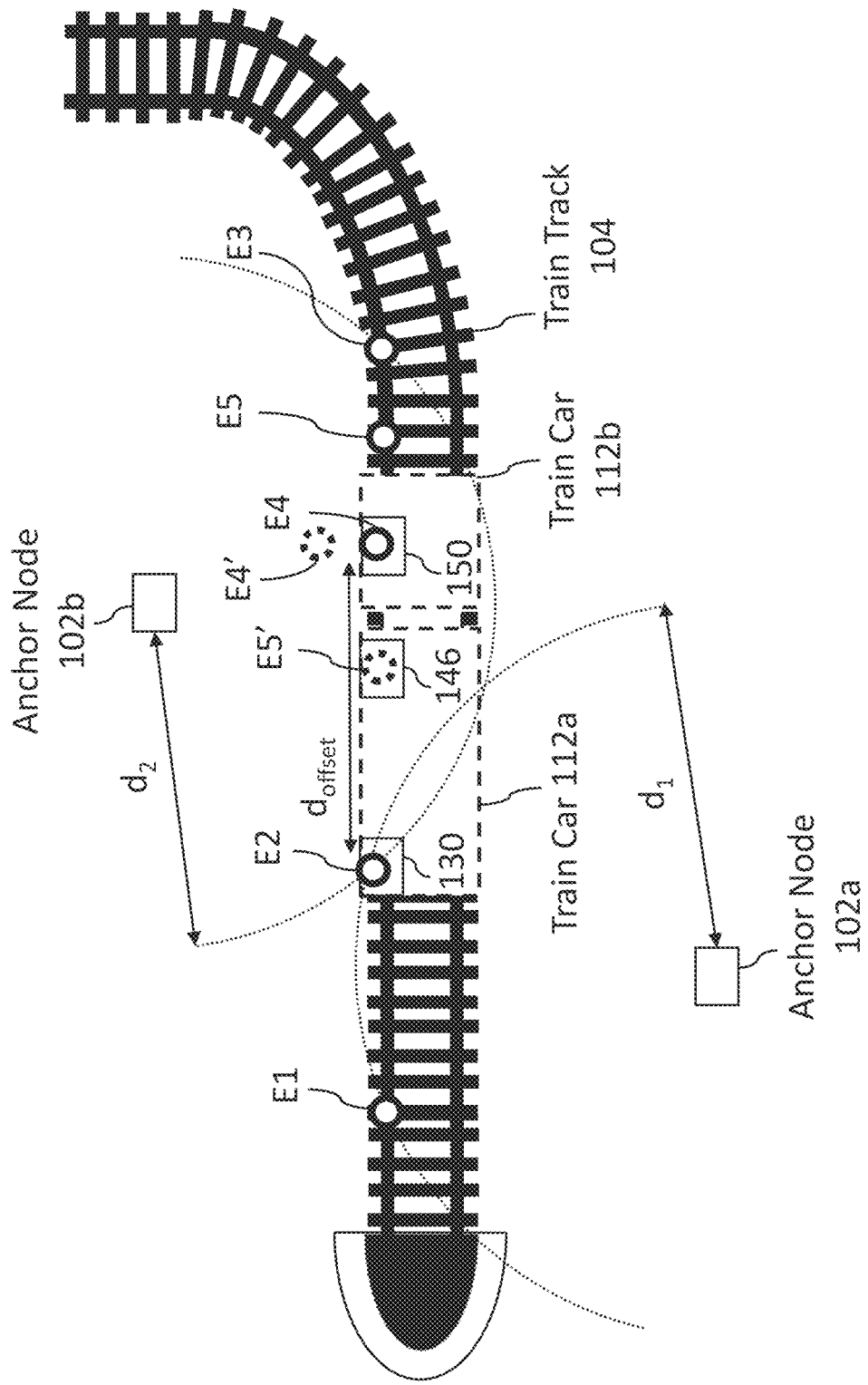
FIG. 9 is a drawing of the illustrative train 110 traveling along the train track 104 and a plurality of estimated positions of the train 110 along the train track 104, in accordance with some embodiments of the technology described herein.

FIG. 9 is a drawing of the illustrative train 110 traveling along the train track 104 and a plurality of observed positions E1-E5 of the train 110 along the train track 104, in accordance with some embodiments of the technology described herein.

As shown in FIG. 9, train 110 may have several observed positions E1-E5 along the train track 104. First and second observed positions E1 and E2 may be determined based on RF signals exchanged between RF subsystem 130 and first anchor node 102a. For example, a time of flight of the RF signals (e.g., from the transmit time of the first signal to the arrival time of the second signal) may indicate a first distance $d_1$ between RF subsystem 130 and first anchor node 102a, and the position of first anchor node 102a may be known (e.g., stored in memory 144. Accordingly, all points along train track 104 positioned at distance $d_1$ from first anchor node 102a may be potential observed positions for train 110 based on RF signals exchanged with first anchor node 102a.

Similarly, as shown in FIG. 9, second and third estimates E2 and E3 may be determined based on RF signals exchanged between RF subsystem 130 and second anchor node 102b (e.g., having a known position) indicating second distance $d_2$ between RF subsystem 130 and second anchor node 102b. In this example, second observed position E2 may be obtained using RF signals from either or both of anchor nodes 102a and 102b, as the RF signals from both anchor nodes 102a and 102b are compatible with second observed position E2. At the same time, in this example, observed positions E1 and E3 may not be compatible with observed position E2. For instance, observed positions E1 and E3 may be too far from observed position E2 to be within an expected ranging error tolerance. Rather, the discrepancies between observed position E2 and observed positions E1 and E3 may be caused by the presence of multiple intersections between the range circle of first anchor node 102a and train track 104 and between the range circle of second anchor node 102b and train track 104. Alternatively or additionally, in some cases, observed position E1 and/or E3 may be rejected as outside a known visibility (e.g., stored in memory 144) of first anchor node 102a and/or second anchor node 102b. As yet another alterative or additional case, observed position E1 and/or E3 may be rejected based on proximity in time to receiving GNSS signals from satellite(s) 106, such as when observed position E1 and/or E3 is outside a known visibility (e.g., stored in memory) of satellite(s) 106. Accordingly, observed positions E1 and E3 may be determined to be incorrect and disregarded from determination of motion characteristics.

Also shown in FIG. 9, fourth observed position E4 may be determined based on GNSS signals received by GNSS subsystem 150 onboard train 110. For example, a time of flight of the GNSS signals may indicate a triangulated position E4' of GNSS subsystem 150, which may be converted to the along-track observed position E4. In this example, fourth observed position E4 is compatible with second observed position E2, indicating the same observed position of train 110, as the distance between second and fourth observed positions E2 and E4 is the same as the offset distance $d_{offset}$ between RF subsystem 130 and GNSS subsystem 150 onboard train 110. Since fourth observed position E4 is compatible with second observed position E2, fourth observed position E4 may serve as a basis for disregarding observed positions E1 and E3 as incorrect.

Also shown in FIG. 9, fifth observed position E5 may be determined based on IMU data generated by IMU(s) 146 onboard train 110. For example, acceleration along track 104 detected by IMU(s) 146 may be integrated (e.g., over time) from a previously observed position of train 110, resulting in fifth observed position E5. In this example, fifth observed position E5 may still be compatible with second and fourth position estimates E2 and E4, despite not coinciding with an expected position E5' that could be derived from second and fourth position estimates E2 and E4. For instance, the discrepancy between observed position E5 and expected position E5' may be within an expected error tolerance of IMU(s) 146, such as due to bias and/or drift. In such a case, the discrepancy between observed position E5 and expected position E5' could be used to correct for bias and/or drift in IMU(s) 146.

During operation of motion determination system 120, RF subsystem 130 may be configured to provide range data to processor(s) 142 indicating distances $d_1$ and $d_2$. In response, processor(s) 142 may be configured to determine observed positions E1, E2, and E3 using distances $d_1$ and $d_2$, known positions of first anchor node 102a and second anchor node 102b, and a geometry of track 104. Similarly, GNSS subsystem 150 may be configured to provide GNSS data to processor(s) 142 indicating triangulated position E4', responsive to which processor(s) 142 may be configured to determine observed position E4 using triangulated position E4' and the geometry of track 104. IMU(s) 146 may be configured to provide IMU data to processor(s) 142 indicating acceleration over a period of time since the most recent motion determination, response to which processor(s) 142 may be configured to determine observed position E5 using the IMU data, one or more previously observed positions of train 110 along track 104, and the geometry of track 104.

In some embodiments, processor(s) 142 may be configured to use observed positions E1-E5 to determine motion characteristics of train 110. In one example, processor(s) 142 may be configured to constrain a graph by using observed positions E1-E5 to form residuals to be minimized. Alternatively or additionally, processor(s) 142 may be configured to use observed positions E1-E5 to form an estimated position in a recursive state estimator bank having a plurality of recursive state estimators. For example, each observed position may be used to generate a recursive state estimator and/or may be accepted into a recursive state estimator into which it is compatible, as described further herein.

In some embodiments, discrepancies in along-track positions observed using two or more anchor nodes may be counted against observations made the anchor node(s), as such discrepancies may indicate the presence of multipath and/or anchor node positioning errors in the system. For example, in some embodiments, an along-track position observed using a first distance (e.g., $d_1$) derived from signals received and/or transmitted by a first anchor node (e.g., 102a) may be inconsistent with an along-track position observed using a second distance (e.g., $d_2$) derived from signals received and/or transmitted by a second anchor node (e.g., 102b). For instance, multipath errors (e.g., due to reflections off of one or more objects) and/or an incorrect known position of one of the anchor nodes may cause one of the determined distances (e.g., $d_1$ or $d_2$) to result in an erroneously observed position. In this example, instances of inconsistencies between positions observed using different anchor nodes may be counted (e.g., using an error counter executed by a processor of the motion determination system), with the error count used as a basis for discounting observations from at least one of the anchor nodes and/or updating uncertainties associated with distances determined with respect to the anchor node(s). In some embodiments, error checking may be performed in this manner every time the system determines the motion of the train, at the time of system initialization, and/or periodically during operation as a system health check.

While observed positions E1-E3 are described herein as observed using time of flight measurements, it should be appreciated that positions may be observed using TDOA or iTDOA measurements. For example, signals may be transmitted from anchor nodes 102a and 102b to RF subsystem 130 at the same time and may arrive at RF subsystem 130 at different times. As described further herein, the arrival times of the signals and known positions of anchor nodes 102a and 102b may be consistent with a set of points along the train track (e.g., including observed position E2) that may be used to observe positions along the train track in like manner.

Figure 10:
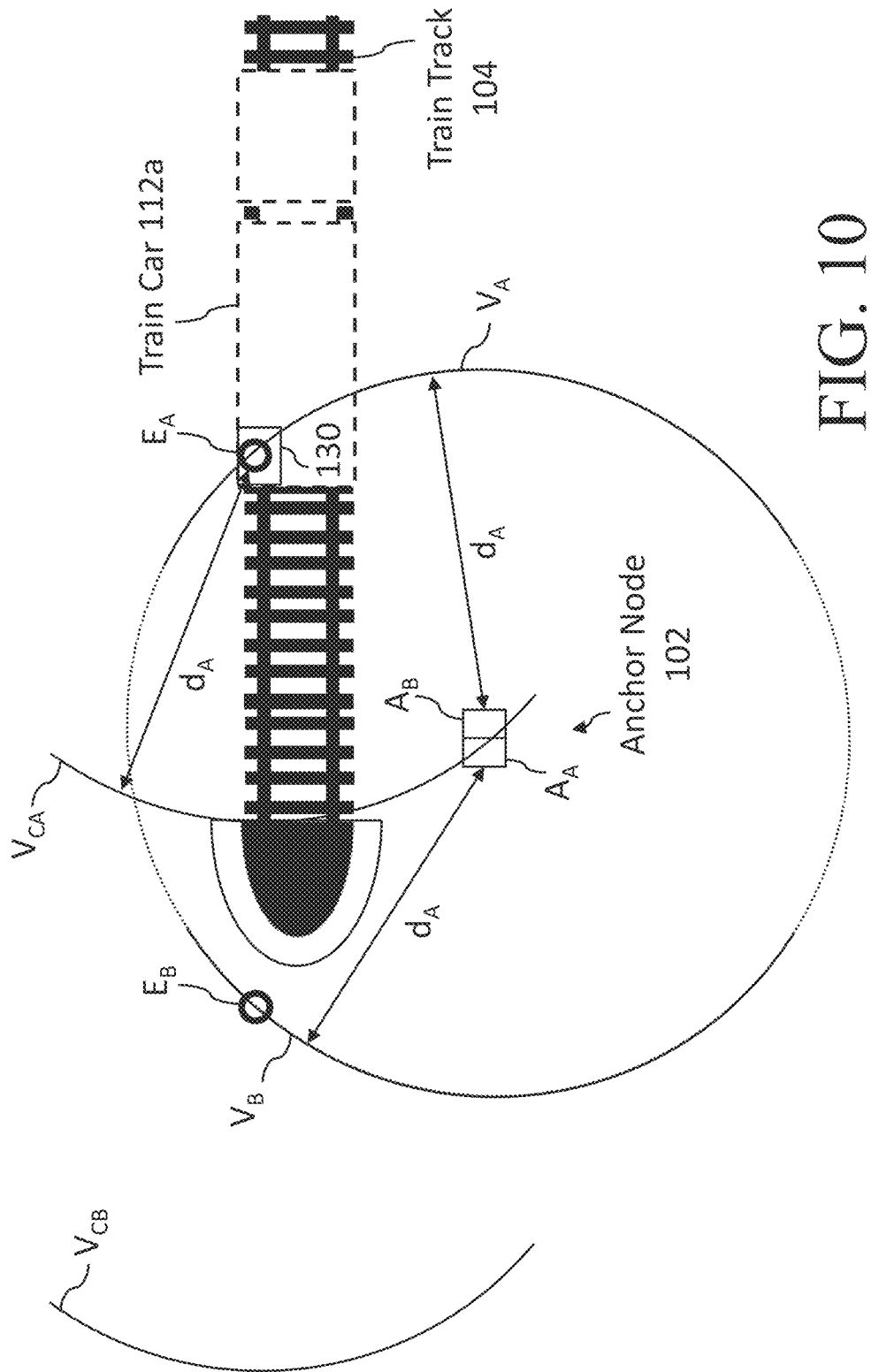
FIG. 10 is a drawing of the illustrative train 110 traveling along the train track 104 and two observed positions of the train 110 along the train track 104, only one of which is RF visible to and from an anchor node 102, in accordance with some embodiments of the technology described herein.

FIG. 10 is a drawing of the illustrative train 110 traveling along the train track 104 and two observed positions $E_A$ and $E_B$ of the train 110 along the train track 104, in accordance with some embodiments of the technology described herein.

In some embodiments, positions observed using RF signals may be filtered out where the observed positions conflict with RF visibility of the anchor nodes and/or RF subsystem. For example, as shown in FIG. 10, RF subsystem 130 is estimated to be at two positions, $E_A$ and $E_B$. Positions $E_A$ and $E_B$ may result from a determined range $d_A$ observed by an anchor node 102 and possible positions along the geometry of train track 104 where anchor node 102 would be separated from train 110 by the determined range $d_A$. In some embodiments, estimated position $E_B$ may be filtered out due to RF invisibility of train 110 by antenna $A_a$ of anchor node 102. For example, anchor node 102 may include multiple RF subsystems coupled to antennas $A_a$ and $A_b$ such that ranges determined using antennas $A_a$ and $A_b$ by exchanging one or more signals with RF subsystem 130 are identified as corresponding to the antenna that exchanged the signal(s). In this example, the determined range $d_A$ may be accompanied by an identification of antenna $A_a$ and the angular visibility $V_A$ of antenna $A_a$ at range $d_A$, such as due to a limited antenna beamwidth of antenna $A_a$. As shown in FIG. 10, estimated position $E_B$ is not within the angular RF visibility $V_A$ of antenna $A_a$, and thus may be filtered out.

In some embodiments, estimated position $E_B$ may be filtered out due to RF invisibility of anchor node 102 from RF system 130 at estimated position $E_B$. For example, anchor node 102 may include a single RF subsystem coupled to antennas $A_A$ and $A_B$ such that ranges determined using antennas $A_A$ and $A_B$ are indistinguishable as to which antenna $A_A$ and $A_B$ exchanged the signal(s) with RF subsystem 130. In this example, only one of estimated positions $E_A$ and $E_B$ would make anchor node 102 visible to RF subsystem 130 due to its angular RF visibility. As shown in FIG. 10, RF subsystem has an angular RF visibility $V_{CA}$ at the determined range $d_A$ from estimated position $E_A$ and an angular RF visibility $V_{CB}$ at the determined range $d_A$ from estimated position $E_B$, and anchor node 102 is not in the angular RF visibility $V_{CB}$, so it may be filtered out.

It should be appreciated that filtering techniques are described herein by way of illustrative examples and are not limited by the relationship between the number of antennas and RF subsystems within an anchor node. It should also be appreciated that other modalities such as GNSS may be similarly filtered out based on known RF visibility between satellites and GNSS antennas, such as when an estimated position resulting from a GNSS observation would place the train inside a tunnel where there is no RF visibility from satellites.

Figure 11:
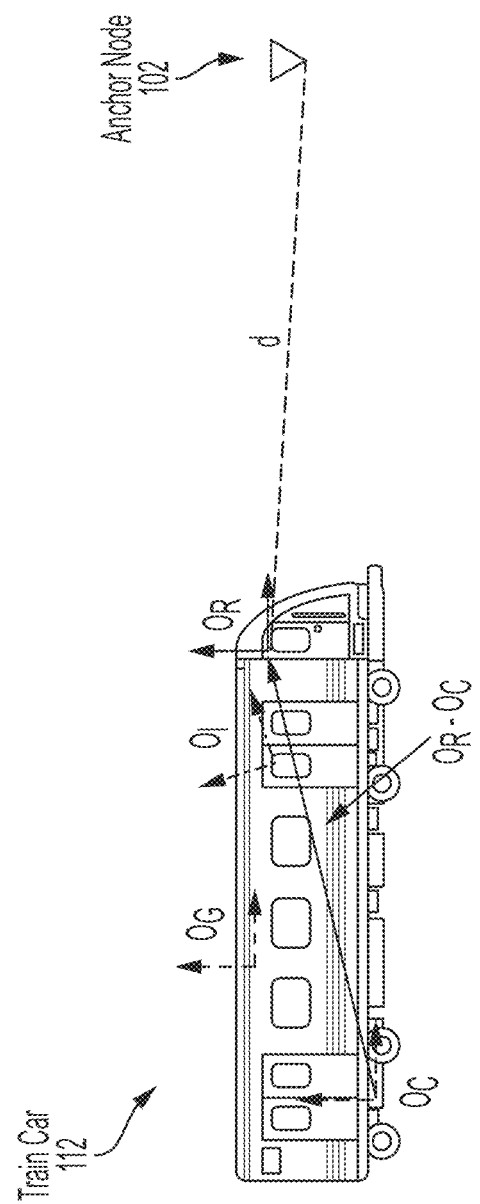
FIG. 11 is a drawing of an illustrative train car 112 having a motion determination system 120 onboard that is traveling along a train track toward an anchor node 102, in accordance with some embodiment of the technology described herein.

FIG. 11 is a drawing of an illustrative train car 112 having a motion determination system 120 onboard that is traveling along a train track toward an anchor node 102, in accordance with some embodiment of the technology described herein.

In some embodiments, the train car 112 shown in FIG. 11 may have a motion determination system 120 onboard, including an RF subsystem, GNSS subsystem, and/or one or more IMUs as motion observation modalities, such as described herein in connection with FIGS. 1-8. In some embodiments, the motion determination system 120 may further include one or more processors configured to convert motion characteristic observations from the RF subsystem, GNSS subsystem, and/or IMU(s) from the individual reference frames of some or each of the motion observation modalities to the reference frame of the track geometry.

In some embodiments, each motion observation modality onboard train car 112 may be associated with its own reference frame in 3D space. In the example shown in FIG. 11, the motion determination system 120 onboard train car 112 may have an RF subsystem with at least one RF antenna in a first position onboard train car 112 (e.g., at or near the front), resulting in the illustrated reference frame $O_R$ for the RF subsystem (e.g., centered at the RF antenna(s)). The motion determination system 120 may also have a GNSS subsystem with at least one GNSS receiver in a second position onboard train car 112 (e.g., near the center of the front-to-back length of train car 112), resulting in the illustrated reference frame $O_G$ for the GNSS subsystem. The motion determination system 120 may also have one or more IMU(s) in a third position onboard train car 112 (e.g., between the GNSS subsystem and the RF subsystem), resulting in the illustrated reference frame $O_I$ for the IMU(s). In the example illustrated in FIG. 11, each motion observation modality reference frame $O_R$, $O_G$, and $O_I$ is offset in position from the others. Moreover, as shown in FIG. 11, the reference frame $O_I$ of the IMU(s) is also angularly offset from the other motion observation modality reference frames $O_R$ and $O_G$.

While offsets are shown in FIG. 11 in one plane, it should be appreciated that offsets may be in 3D space. For example, reference frame $O_R$ is shown in FIG. 11 offset from reference frame $O_G$ in the directions of the length and height of the train, reference frames $O_R$ and $O_G$ may be alternatively or additionally offset in the direction of the width of the train, although not shown in FIG. 11.

In some embodiments, the geometry of the track on which train car 112 is traveling may be associated with a reference frame. For example, the motion determination system 120 may be in communication with a train control system (e.g., onboard the same or another train car 112) that is configured to control operation of the train and/or to communicate motion information to a central control system (e.g., a central communications-based train control (CBTC) controller). The train control system and/or central control system may be associated with the illustrated reference frame $O_C$. In some embodiments, reference frame $O_C$ may be coordinated with the geometry of the train track, although in other embodiments reference frame $O_C$ may be offset from the geometry of the train track. As shown in FIG. 11, the reference frame $O_C$ may be offset in position and/or angularly offset from the motion observation modality reference frames. In some embodiments, such offsets may be measured and saved in memory for the processor(s) of motion determination system 120 to take into account. In some embodiments, modality reference frames may be offset from the reference frame of the geometry of the train track, which in turn may be offset from the reference frame of the train control system and/or central control system.

In some embodiments, the processor(s) of the motion determination system 120 onboard train 112 may be configured to take differences in motion observation modality reference frames into account when converting observed motion characteristics from the motion determination modalities to a frame of a geometry of a train track. For example, as shown in FIG. 11, the RF subsystem associated with reference frame $O_R$ may be configured to exchange RF signals with the illustrated anchor node 102 to determine a distance d separating the RF subsystem from the anchor node 102. In this example, the processor(s) of the motion determination system 120 onboard train 112 may be configured to take into account the vector offset $O_R$-$O_C$ (e.g., in 3D space) when using the determined distance d as a basis for an observed position of train car 112. For instance, the distance d and the known location of the anchor node 102 may indicate two possible positions along the train track within the reference frame $O_R$ (e.g., such as shown in FIG. 9), and the vector offset $O_R$-$O_C$ may indicate that one of the two possible positions would make the anchor node 102 RF invisible to RF subsystem, providing a basis for eliminating that position. Alternatively or additionally, one of the two possible positions may be close to a position observed using GNSS subsystem once the offset between reference frames $O_G$ and $O_R$ is taken into account, providing a basis for eliminating the other possible position.

While motion observation modalities are shown in FIG. 11 onboard a single train car 112, it should be appreciated that such modalities may be distributed over a number of train cars with position and/or orientation offsets among reference frames of the modalities taken into account.

FIG. 12A is a drawing of an illustrative track segment 200 from a first point P to a second point Q and a point R at which a train is observed to be positioned, in accordance with some embodiments of the technology described herein. In some embodiments, track segment 200 may be one of a plurality of track segments stored in memory 144 indicating the geometry of a train track. For example, track segment 200 may be a segment of track 104 shown in FIG. 9. An adjacent track segment starting at P' is shown adjacent point Q. For example, point Q may be linked to point P' in memory 144 indicating that the track segment starting at point P' is the next segment from track segment 200. In some embodiments, geographic positions in 3D space corresponding points P, Q, and other points along track segment 200 may be stored in memory 144, and the geographic positions in 3D space may be used for integrating motion observations with the geometry of the train track.

In some embodiments, processor(s) 142 may be configured to integrate motion observations from one or more modalities with the geometry of a train track to determine motion characteristics of a train traveling along the train track. For example, in FIG. 12A, track segment 200 may have a geometry from point P to point Q over a distance L, and the observations received from the modality or modalities may include an observed position R. For instance, observed position R may be a triangulated position (e.g., E4' in FIG. 9) indicated in GNSS data received from GNSS subsystem 150. In this example, points along track segment 200 may have positions in 3D space corresponding to positions along the track geometry stored in memory 144.

In some embodiments, processor(s) 142 may be configured to integrate the observed position R with track segment 200 by determining a point along track segment 200 having a minimum distance to observed position R. For example, in FIG. 12A, multiple points $P_i$ and $P_j$ along track segment 200 have different distances $d_i$ and $d_j$ to point R. In this example, point $P_i$ may be selected as the closest point to point R because distance $d_1$ may be the shortest distance to point R of any point on track segment 200.

In some embodiments, processor(s) 142 may be configured to integrate the observed position R with multiple track segments to determine which track segment contains the closest point along the train track to the observed position R. For example, processor(s) 142 may be configured to repeat the process of integrating observed position R as described herein for track segment 200 for a plurality of track segments and determine a vector distance from the starting point of the segment to the point along the segment determined to have the minimum distance to point R. For example, in FIG. 12A, the vector distance from P to $P_i$ is denoted $S_i$. In this example, $S_i$ is greater than zero (in the direction from point P to point Q) and less than the length L of track segment 200, from which the processor(s) 142 may be configured to determine that track segment 200 contains the closest point along the track to observed position R. Accordingly, the processor(s) 142 may be configured to determine that point $P_i$ in track segment 200 is the closest point to observed position R, and thus point $P_i$ may be an along-track observed position (e.g., E4) for the observed position R. In some embodiments, the processor(s) 142 may be configured to determine the vector distance $S_i$ to the closest point $P_i$ to point R using the following equation:

$$S_i = PR \cdot u \qquad (1)$$

where PR is the vector from point P to point R and u is a unit vector in the direction of track segment 200 from point P to point Q.

For other track segments, such as the segment beginning with point P', the vector distance to the closest point along the track segment may be negative (e.g., toward point $P_i$ of track segment 200), indicating that the segment beginning with point P' does not contain the closest point along the track to observed position R. Likewise, for the track segment preceding track segment 200, the vector distance to the closest point along the track segment may be greater than the length of the track segment, also indicating that that track segment t does not contain the closest point along the track to observed position R.

In some embodiments, point $P_i$ may be identified as the closest point along the train track to observed position R using geographic points in 3D space for points $P_i$ and R, and processor(s) 142 may be configured to use a track geometry point stored in memory 144 corresponding to point $P_i$ in geographic 3D space for motion determination based on the integration.

FIG. 12B is a drawing of the illustrative track segment 200 and a point R' from which the train is observed to be separated by a distance d, in accordance with some embodiments. In some embodiments, processor(s) 142 may be configured to integrate motion observations from one or more modalities with the geometry of a train track where the observations include an observed distance d from a known point R'. For instance, known point R' may be a known location of an anchor node 102 and distance d may be a distance indicated in range data (e.g., an arrival time of an RF signal) received from RF subsystem 130 in response to RF signals exchanged between RF subsystem 130 and the anchor node 102. In this example, point R' may be a geographic point in 3D space.

In some embodiments, processor(s) 142 may be configured to integrate the distance d and known point R' with track segment 200 by determining one or more points along track segment 200 having the distance d to the known point R'. For example, in FIG. 12B, multiple points $P_i'$ and $P_j'$ along and in the vicinity of track segment 200 are positioned at distance d from known point R', with a vector distance $S_i'$ separating point P from point $P_i'$ and a vector distance $S_j'$ separating point P from point $P_j'$. In this example, the processor(s) 142 may be configured to determine that point $P_i'$ is within track segment 200 and point $P_j'$ is not, such as by determining that the vector distance $S_i'$ is nonzero in the direction of track segment 200 and less than the length L of track segment 200, whereas the vector distance $S_j'$ is negative in the direction of track segment 200. In some embodiments, the processor(s) 142 may be configured to determine the vector distances $S_i'$ and $S_j'$ as roots, solving for S using the quadratic formula, in the following equation approximating the range circle of distance d about known point R':

$$S^2 + 2S[v \cdot (P-R')] + \|P-R'\|^2 - d^2 = 0 \qquad (2)$$

where v is a unit vector in the direction of track segment 200 and P-R' is the vector distance between points P and R'.

In some embodiments, processor(s) 142 may be configured to integrate the known point R' and distance d with multiple track segments to determine which track segment contains the one or more points at the distance d from the known point R'. For example, processor(s) 142 may be configured to repeat the process of integrating known point R' and distance d as described herein for track segment 200 for a plurality of track segments and determine one or more points along the track at the distance d from known point R'. For example, in FIG. 12B, the processor(s) 142 may be configured to determine that point $P_i'$ is within track segment 200 and may form the basis for an observed position (e.g., E2). At the same time, the processor(s) 142 may be configured to determine that point $P_j'$ is not within track segment 200 since the vector distance $S_j'$ is less than zero (in the direction from point P to point Q), and so the processor(s) 142 may be configured to determine that point $P_j'$ is in a different track segment. Accordingly, the processor(s) 142 may be configured to determine that point $P_j'$ is the basis for a different observed position (e.g., E1).

In some embodiments, points $P_i'$ and $P_j'$ may be identified as observed positions of the train along the train track using geographic points in 3D space for points $P_i'$, $P_j'$, and R', and processor(s) 142 may be configured to use track geometry points stored in memory 144 corresponding to points $P_i'$ and $P_j'$ in geographic 3D space for motion determination based on the integration.

Figure 12C:
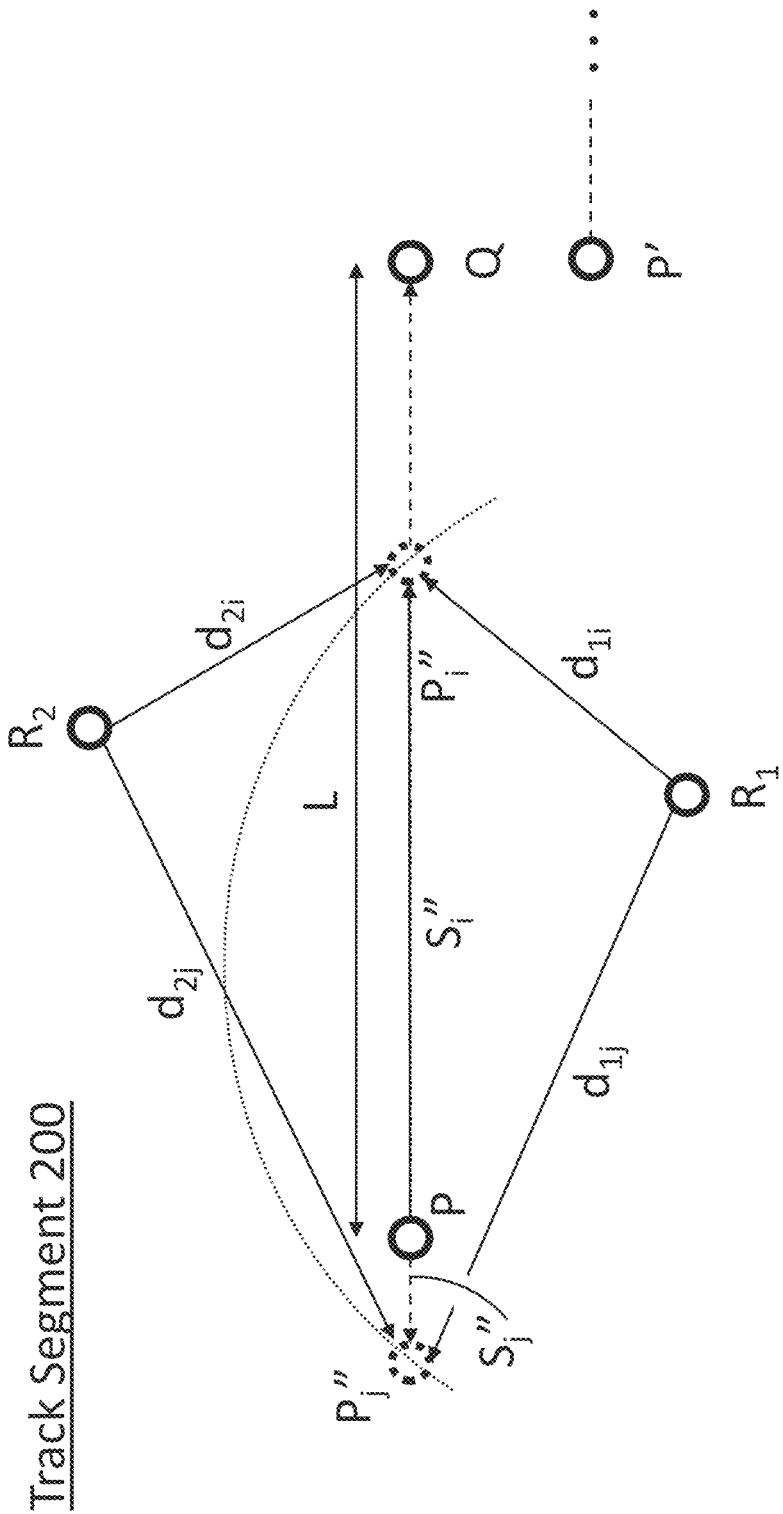
FIG. 12C is a drawing of the illustrative track segment 200 and two points $R_1$ and $R_1$ from which the train is observed using RF signals having different arrival times, in accordance with some embodiments of the technology described herein.

FIG. 12C is a drawing of the illustrative track segment 200 and two points $R_1$ and $R_2$ from which the train is observed using RF signals having different arrival times, in accordance with some embodiments of the technology described herein. In some embodiments, processor(s) 142 may be configured to integrate motion observations from one or more modalities with the geometry of a train track where the observations include an observed difference in arrival times of RF signals exchanged between the train and anchor nodes 102 located at respective known points $R_1$ and $R_2$. For example, the difference in arrival times (e.g., iTDOA or TDOA) of the RF signals (e.g., at the train or at the anchor nodes 102) may be due to a difference in distances between the train and the respective known points $R_1$ and $R_2$. In the example illustrated in FIG. 12C, points $R_1$ and $R_2$ may be geographic points in 3D space.

In some embodiments, processor(s) 142 may be configured to integrate a difference in arrival times of RF signals and known points $R_1$ and $R_2$ of anchor nodes 102 that transmitted or received the RF signals with a track segment 200 by determining one or more points along track segment 200 consistent with the difference in arrival times. For example, in FIG. 12C, multiple points $P_i''$ and $P_j''$ along and in the vicinity of track segment 200 are positioned at the same difference in distance from known points $R_1$ and $R_2$, as the distance $d_{1i}$ from point $P_i''$ to point $R_1$ may be less than the distance $d_{2i}$ from point $P_i''$ to point $R_2$ by the same difference as the distance $d_{1j}$ from point $P_j''$ to point $R_1$ may be less than the distance $d_{2j}$ from point $P_j''$ to point $R_2$. For instance, the difference in distance may be derived from the difference in arrival times. Also shown in the example of FIG. 12C, a vector distance $S_{i1}'$ separates point P from point $P_i''$ and a vector distance $Sj_1''$ separates point P from point $P_j''$. In this example, the processor(s) 142 may be configured to determine that point $P_i''$ is within track segment 200 and point $P_j''$ is not, such as by determining that the vector distance $S_i''$ is nonzero in the direction of track segment 200 and less than the length L of track segment 200, whereas the vector distance $S_j''$ is negative in the direction of track segment 200. In some embodiments, the processor(s) 142 may be configured to determine the vector distances $S_i''$ and $S_j''$ as intersections between a track segment and the set of points consistent the difference in arrival times of signals received at or from anchor nodes at points $R_1$ and $R_2$. For example, the vector distances $S_i''$ and $S_j''$ may be solutions for S in the following equation:

$$\|P - R_1 + Sv\| - \|P - R_1 + Sv\| = c(t_1 - t_2) \qquad (3)$$

where c is the speed of light, $t_1$ is the time of arrival of a signal at or from a first anchor node located at point $R_1$, $t_2$ is the time of arrival of a signal at or from a second anchor node located at point $R_2$, v is a unit vector in the direction of track segment 200, $P-R_1$ is the vector distance between points P and $R_1$ and $P-R_2$ is the vector distance between points P and $R_2$.

In some embodiments, processor(s) 142 may be configured to integrate the known points $R_1$ and $R_2$ and a difference in arrival times of RF signals with multiple track segments to determine which track segment contains the one or more points consistent with the difference in arrival times. For example, processor(s) 142 may be configured to repeat the process of integrating known points $R_1$ and $R_2$ and a difference in arrival times of RF signals as described herein for track segment 200 for a plurality of track segments and determine one or more points along the track consistent with the difference in arrival times of RF signals received at or from anchor nodes at known points $R_1$ and $R_2$. For example, in FIG. 12C, the processor(s) 142 may be configured to determine that point $P_i''$ is within track segment 200 and may form the basis for an observed position. At the same time, the processor(s) 142 may be configured to determine that point $P_j''$ is not within track segment 200 since the vector distance $S_j''$ is less than zero (in the direction from point P to point Q), and so the processor(s) 142 may be configured to determine that point $P_j''$ is in a different track segment. Accordingly, the processor(s) 142 may be configured to determine that point $P_j''$ is the basis for a different observed position.

In some embodiments, points $P_i''$ and $P_j''$ may be identified as observed positions of the train along the train track using geographic points in 3D space for points $P_i''$, $P_j''$, $R_1$ and $R_2$, and processor(s) 142 may be configured to use track geometry points stored in memory 144 corresponding to points $P_i''$ and $P_j''$ in geographic 3D space for motion determination based on the integration.

Figure 13:
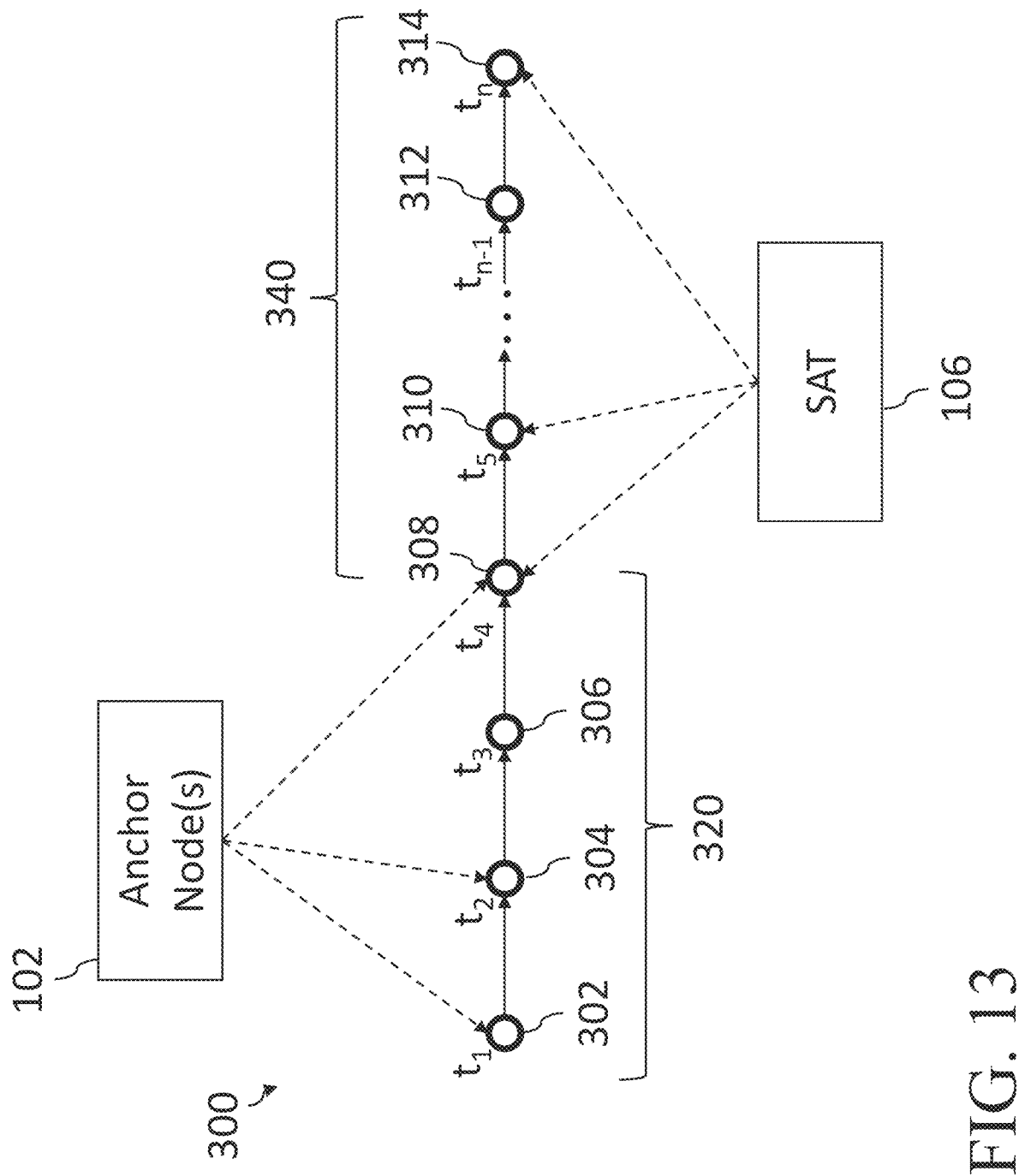
FIG. 13 is a drawing of an illustrative graph 300 of motion characteristics of a train generated by a system for determining motion characteristics of a train, in accordance with some embodiments of the technology described herein.

FIG. 13 is a drawing of an example graph 300 of motion characteristics of a train generated by a system for determining motion characteristics of a train, in accordance with some embodiments of the technology described herein. In FIG. 13, graph 300 includes vertices 302, 304, 306, 308, 310, 312, and 314 arranged in a line, each of which may include motion and/or motion determination characteristics of the train at particular time $t_1$-$t_n$. FIG. 13 also shows an anchor node 102 used to determine motion and/or motion determination characteristics for vertices 302, 304, and 308 and a satellite 106 used to determine motion and/or motion determination characteristics for vertices 308, 310, and 314. For example, vertices 302 to 308 may correspond to a time $t_1$ to $t_4$ in which the train is moving in a tunnel 320 and RF visible to one or more anchor nodes 102, whereas vertices 308 to 314 may correspond to a time $t_4$ to $t_n$ in which the train is moving outdoors 340 and RF visible to one or more satellites 106. In this example, the train may be near the start or end of tunnel 320 at time $t_4$ so as to be RF visible to both anchor node(s) 102 and satellite(s) 106. In some embodiments, vertices of graph 300 may be determined by processor(s) 142 and stored in a memory 144 of a motion determination system 120, as described herein. For example, motion characteristics for each vertex may be stored in memory 144. While the vertices of graph 300 are shown in FIG. 13 arranged in a line, it should be appreciated that the vertices may be alternatively or additionally positioned along the geometry of the train track and/or have any disposition, such as including curves and/or loops rather than or in addition to a straight line.

In some embodiments, each vertex in graph 300 may include motion and/or motion determination characteristics of the train at a particular time $t_1$-$t_1$. For example, the motion characteristics may include a position of the train, a velocity of the train, an acceleration of the train, a pitch of the train, and/or other motion characteristics as described herein. Motion determination characteristics of the train may include gyroscope and/or accelerometer biases for the IMU(s) 146. For example, the biases may change as the gyroscope and/or accelerometer drift over time, impacting determination of motion characteristics. In some embodiments, the vertices may be spaced evenly in time such that $t_3$-$t_2$ is equal to $t_2$-$t_1$. In some embodiments, the vertices may not be evenly spaced in time, such that $t_3$-$t_2$ is greater than or less than $t_2$-$t_1$.

In some embodiments, a motion determination system 120 onboard the train may be configured to determine the motion and/or motion determination characteristics of each vertex. In FIG. 13, vertex 302 includes motion characteristics that may be determined using RF signals transmitted between the motion determination system 120 and one of the anchor nodes 102, as indicated by the dotted arrow from the anchor node 102 to vertex 302. For example, an RF subsystem 130 of the motion determination system 120 may be configured to determine and provide a distance between the train and the anchor node 102 to processor(s) 142, which may be configured to determine the motion characteristics using the determined distance in combination with a known position of the anchor node 102 and a geometry of the train track each stored in memory 144.

Similarly, vertex 310 includes motion characteristics that may be determined using GNSS signals received from one or more satellites 106, as indicated by the dotted arrow from satellite(s) 106 to vertex 310. For example, a GNSS subsystem 150 of the motion determination system 120 may be configured to determine and provide a triangulated position of the GNSS subsystem 150 to processor(s) 142, which may be configured to determine the motion characteristics using the triangulated position in combination with the geometry of the train track stored in memory 144.

Motion characteristics of vertex 302 may also be determined using the IMU(s) 146 of the motion determination system 120. For example, if there is a conflict between the motion characteristics determined using RF signals and the IMU(s) 146, the motion characteristics determined using RF signals may be used to correct motion characteristics determined using the IMU(s) 146, such as by updating gyroscope and/or accelerometer biases of the motion characteristics of vertex 302 to reduce and/or minimize a residual between the motion characteristics determined using the RF signals and the IMU(s).

As shown in FIG. 13, the train may be within RF transmission range of different anchor nodes 102 at different times. For example, the train may be within RF transmission range of the same anchor node 102 at times $t_1$, $t_2$, and $t_4$, and/or within range of multiple anchor nodes 102 at some or each of times $t_4$, $t_5$, and $t_n$. In some embodiments, motion determination system 120 may prioritize only a subset of anchor nodes 102 within RF transmission range of the train, such as anchor nodes 102 that are positioned closest to the train. For example, RF subsystem 130 of motion determination system 130 may be configured to transmit RF signals to each anchor node 102 (e.g., sequentially) and only provide a predetermined number of the smallest determined distances to processor(s) 142 for determination of motion characteristics. At time $t_4$, the train is within RF transmission range of an anchor node 102 and within GNSS reception range of one or more satellites 106. In some embodiments, motion determination system 120 may prioritize GNSS data based on GNSS signals received from the satellite(s) 106 over range data based on RF signals exchanged with anchor node(s) 102.

While the train is moving in tunnel 320, vertices 302, 304, and 308 include motion characteristics determined using RF signals transmitted between the motion determination system 120 and the anchor node(s) 102, whereas vertex 306 includes motion characteristics that are not determined using RF signals. For example, at time $t_3$, no anchor nodes 102 may be in RF transmission range of the train. In some embodiments, motion characteristics of vertex 306 may be determined using the IMU(s) 146 of motion determination system 120. For example, the IMU(s) 146 may provide signals indicative of the train's acceleration along the geometry of the train track that may be used to determine motion characteristics in combination with motion characteristics determined at previous vertices (e.g., using motion characteristics of vertices 302 and/or 304 for vertex 306). In some embodiments, to compensate for drift in signals from IMU(s) 146, motion characteristics determined using IMU(s) 146, such as for vertex 306, may be updated when motion characteristics are next able to be determined using RF signals, such as for vertex 308 in graph 300. In some embodiments, motion characteristics determined using IMU(s) 146 may be stored with associated uncertainties for the motion characteristics that may be useful in updating the motion characteristics at a later time.

While the train is moving outdoors 340, vertices 308, 310, and 314 include motion characteristics determined using GNSS signals received by the motion determination system 120 from the satellite(s) 106, whereas vertex 312 includes motion characteristics that are not determined using GNSS signals. For example, at time $t_{n-1}$, no satellites 106 may be RF visible to GNSS subsystem 150. In some embodiments, motion characteristics of vertex 312 may be determined using the IMU(s) 146 of motion determination system 120. For example, the IMU(s) 146 may provide signals indicative of the train's acceleration along the geometry of the train track that may be used to determine motion characteristics in combination with motion characteristics determined at previous vertices (e.g., using motion characteristics of vertices 308 and/or 310 for vertex 312). In some embodiments, to compensate for drift in signals from IMU(s) 146, motion characteristics determined using IMU(s) 146, such as for vertex 312, may be updated when motion characteristics are next able to be determined using GNSS signals, such as for vertex 314 in graph 300. In some embodiments, motion characteristics determined using IMU(s) 146 may be stored with associated uncertainties for the motion characteristics that may be useful in updating the motion characteristics at a later time.

In one example, each vertex of graph 300 may include the following motion and motion determination characteristics: (1) a position of the train along the geometry of the train track; (2) a velocity of the train along the geometry of the train track (e.g., based on the track segment in which the train is observed, estimated, and/or determined to be moving); (3) a pitch of the train rotationally about a pitch axis parallel to the ground below the train track and perpendicular to the geometry of the train track; (4) an accelerometer bias along the geometry of the train track; (5) an accelerometer bias along a yaw axis perpendicular to the pitch axis and the geometry of the train track; (6) a gyroscope bias along the pitch axis; and/or (7) an orientation of the train along the geometry of the train track (e.g., whether the train is facing forward or rearwards). In this example, the position of the train along the geometry of the train track may be an absolute position with reference to the geometry and length of the train track (e.g., stored in memory 144 and/or associated with geographic coordinates), and the orientation of the train may be fixed during initialization of the motion determination system 120 and may remain static during operation. In this example, the position, velocities, pitch, and orientation of the train are motion characteristics and the accelerometer and gyroscope biases are motion determination characteristics used to determine motion characteristics, as described further herein.

In some embodiments, motion determination characteristics may be initialized to a predetermined value (e.g., 0) and updated as motion characteristics are determined over time, as described further herein. In some embodiments, motion determination characteristics may be calibrated to certain values when the train is expected to have zero acceleration (e.g., when the train is not moving).

In some embodiments, each vertex may also include an associated uncertainty of each motion characteristic. In some embodiments, the associated uncertainties may be used to determine whether to adjust motion determination characteristics. For example, it may be preferable to adjust motion determination characteristics that impact a velocity and/or position having a high uncertainty rather than adjust motion determination characteristics that impact a velocity and/or position having a low uncertainty.

In this example, the motion determination system 120 may apply a plurality of constraints to the motion and/or motion determination characteristics. Motion determination system 120 may adjust some or all of the motion characteristics of one or more vertices to reduce and/or minimize the residuals of each constraint. A first possible constraint incorporating range data received using RF subsystem 130 is given by the equation below:

$$\text{range\_residual} = \text{rangepos\_alongtrack} + \text{RFsubsys\_offset} - \text{pos\_map} \quad (4)$$

where rangepos_alongtrack is an observed position of the train along the geometry of the train track determined using a distance between an anchor node and RF subsystem 130, pos_map is the position being determined, and RFsubsys_offset is a distance indicating a position of RF subsystem 130 (e.g., RF antennas of the subsystem) along the train. In some embodiments, the first possible constraint may only be applied when a distance between the train and an anchor node can be determined, such as when the train is within RF transmission range of an anchor node (e.g., for vertices 302, 304, and 308). For example, if one or more anchor nodes are RF visible, range_residual as calculated above be returned as the range residual, whereas if no anchor nodes are RF visible, the range residual may be returned having a zero value.

In some embodiments, one or more constraints may incorporate GNSS data from GNSS subsystem 150. Such constraints may be applied at each vertex for which the train is RF visible to one or more satellites 106. A second possible constraint incorporating data from GNSS subsystem 150 is given by the equation below:

$$\text{GNSS\_residual} = \text{GNSSpos\_alongtrack} + \text{GNSSsubsys\_offset} - \text{pos\_map} \quad (5)$$

where GNSSpos_alongtrack is an observed position of the train along the geometry of the train track, pos_map is the position being determined, and GNSSsubsys_offset is a distance indicating a position of GNSS subsystem 150 (e.g., GNSS antennas) along the train.

In some embodiments, a plurality of constraints may incorporate data from IMU(s) 146. Such constraints may be applied at each vertex, even if the train is not within RF transmission range of an anchor node or RF visible to any satellites. A third possible constraint incorporating data from IMU(s) 146 is given by the equation below:

$$\text{pos\_residual} = \text{pos\_2} - (\text{pos\_1} + V\text{avg} * dt) \quad (6)$$

where pos_2 is the position of the train along the geometry of the train track for the current vertex (e.g., vertex 304), pos_1 is an observed, estimated, and/or determined position of the train along the geometry of the train track for a previous vertex (e.g., vertex 302), Vavg is an observed average velocity of the train along the train track between pos_1 and pos_2 (e.g., using an observed, estimated and/or determined velocity of one or more previous vertices), and dt is a time elapsed between the current vertex and the previous vertex or vertices (e.g., $t_2-t_1$). In some embodiments, the average velocity Vavg may be calculated using velocities described further herein.

A fourth possible constraint is given by the equation below:

$$Vx\_\text{residual} = V\_2 - (V\_1 + \text{est\_accelx} * dt) \quad (7)$$

where V_2 is the velocity of the train along the geometry of the train track for the current vertex (e.g., vertex 304), V_1 is an observed, estimated, and/or determined velocity of the train along the geometry of the train track for a previous vertex (e.g., vertex 302), est_accelx is an observed acceleration of the train along the geometry of the train track between V_1_and V_2, and dt is the time elapsed between the current vertex and the previous vertex or vertices (e.g., $t_2-t_1$).

In some embodiments, the observed acceleration est_accelx may be determined using current IMU data, as given by the equation below:

$$\text{est\_accelx} = \text{IMU\_accelx} - \text{gravityx} - \text{accel\_bias\_}x \tag{8}$$

where IMU_accelx is an acceleration of the train along the geometry of the train track determined using one or more signals output from IMU(s) 146, gravityx is the gravitational acceleration of the train along the geometry of the train track, and accel_bias_x is the accelerometer bias along the geometry of the train track. In some embodiments, IMU_accelx may be taken along the geometry of the train track when the axis of the IMU(s) used to obtain IMU_accelx aligns with the front-to-back direction of the train, which is assumed to align with the geometry of the train track. In some embodiments, IMU_accelx may be obtained by integrating the axial acceleration of the IMU(s) with the geometry of the train track. For example, a dot product may be computed between axial acceleration along one or more axes of the IMU(s) and the geometry of a track segment the train is observed, estimated, and/or determined to be traveling along.

In some embodiments, the gravitational acceleration gravityx may be determined using current IMU data and a previously observed, estimated, and/or determined pitch of the train rotationally about the pitch axis, as given in the equation below:

$$\text{gravityx} = (\text{gravity}/\text{est\_gyro}) * (\cos(P\_1) - \cos(P\_2))/dt \tag{9}$$

where gravity is the gravitational constant of approximately 9.8 m/s$^2$, est_gyro is an observed acceleration of the train rotationally about the pitch axis, P_2 is an observed pitch of the train rotationally about the pitch axis for the current vertex (e.g., vertex 304), P_1 is an observed, estimated, and/or determined pitch of the train rotationally about the pitch axis for a previous vertex (e.g., vertex 302), and dt is the time elapsed between the current vertex and the previous vertex (e.g., $t_2-t_1$). In some embodiments, the gravitational acceleration gravityx may be taken along the geometry of the train track as described for IMU acceleration.

In some embodiments, the observed acceleration est_gyro may be determined using current IMU data as given by the equation below:

$$\text{est\_gyro} = \text{IMU\_gyro\_}y - \text{gyro\_bias\_}y \tag{10}$$

where IMU_gyro_y is an acceleration of the train rotationally about the pitch axis observed using one or more signals output from IMU(s) 146 and gyro_bias_y is the gyroscope bias along the pitch axis. In some embodiments, the gyroscope bias along the pitch axis may be adjusted to be transverse to the geometry of the train track. A fifth possible constraint is given by the equation below:

$$Vz\_\text{residual} = \text{est\_accelz} * dt \tag{11}$$

where est_accelz is an observed acceleration of the train along the yaw axis for the current vertex (e.g., vertex 304) obtained using observed, estimated, and/or determined motion and/or motion determination characteristics of a previous vertex (e.g., vertex 302) and dt is the time elapsed between the current vertex and the previous vertex (e.g., $t_2-t_1$).

In some embodiments, the observed acceleration of the train along the yaw axis may be obtained using current IMU data and a previously observed, estimated, and/or determined pitch of the train rotationally about the pitch axis, as given by the equation below:

$$\text{est\_accelz} = \text{IMU\_accelz} - \text{gravityz} - \text{accel\_bias\_}z \tag{12}$$

where IMU_accelz is an acceleration of the train along the yaw axis determined using one or more signals output from IMU(s) 146, gravityz is the gravitational acceleration of the train along the yaw axis, and accel_bias_z is the accelerometer bias along the yaw axis.

In some embodiments, the gravitational acceleration gravityz may be obtained using current IMU data and a previously observed, estimated, and/or determined pitch of the train rotationally about the pitch axis, as given by the equation below:

$$\text{gravityz} = (\text{gravity}/\text{est\_gyro}) * (\sin(P\_1) - \sin(P\_2))/dt \tag{13}$$

where est_gyro, P_1, P_2, and dt are the same as described above for gravityx.

A sixth possible constraint is given by the equation below:

$$\text{pitch\_residual} = P\_2 - (P\_1 + \text{est\_gyro} * dt) \tag{14}$$

where P_2, P_1, est_gyro, and dt are the same as described above for gravityx and gravityz.

In some embodiments, motion determination system 120 may be configured to reduce and/or minimize each residual by adjusting the motion characteristics and/or motion determination characteristics of the current vertex and/or previous vertices. For example, pitch_residual may be reduced and/or minimized upon adjusting gyro_bias_y. When gyro_bias_y is adjusted by making it larger or smaller, gravityx and gravityz may be adjusted accordingly, thereby having an effect on Vz_residual and Vx_residual. The effect on Vz_residual and Vx_residual may be used, at least in part, to determine whether to make gyro_bias_y larger or smaller. Similarly, pos_2 may be set equal to pos_map, and pos_residual may be reduced and/or minimized by adjusting pos_1 and/or Vavg, which may also have an effect on Vz_residual and Vx_residual.

In some embodiments, processor(s) 142 of motion determination system may be configured to determine the motion and/or motion determination characteristics of the current and/or previous vertices using a best-fit optimization technique, such as a graph-based optimization technique. In some embodiments, the graph-based optimization technique may include pose graph optimization, factor graph optimization, and/or non-linear least squares optimization. In some embodiments, such techniques may employ a Bayesian estimation algorithm (e.g., executed on the processor(s)), such as including a Bayesian filter. In some embodiments, the filter may include an extended Kalman filter, an unscented Kalman filter, and/or a particle filter.

In some embodiments, each vertex of graph 300 may alternatively or additionally include a roll of the train rotationally a roll axis parallel to the geometry of the train track and/or a yaw of the train rotationally about the yaw axis.

Figure 14:
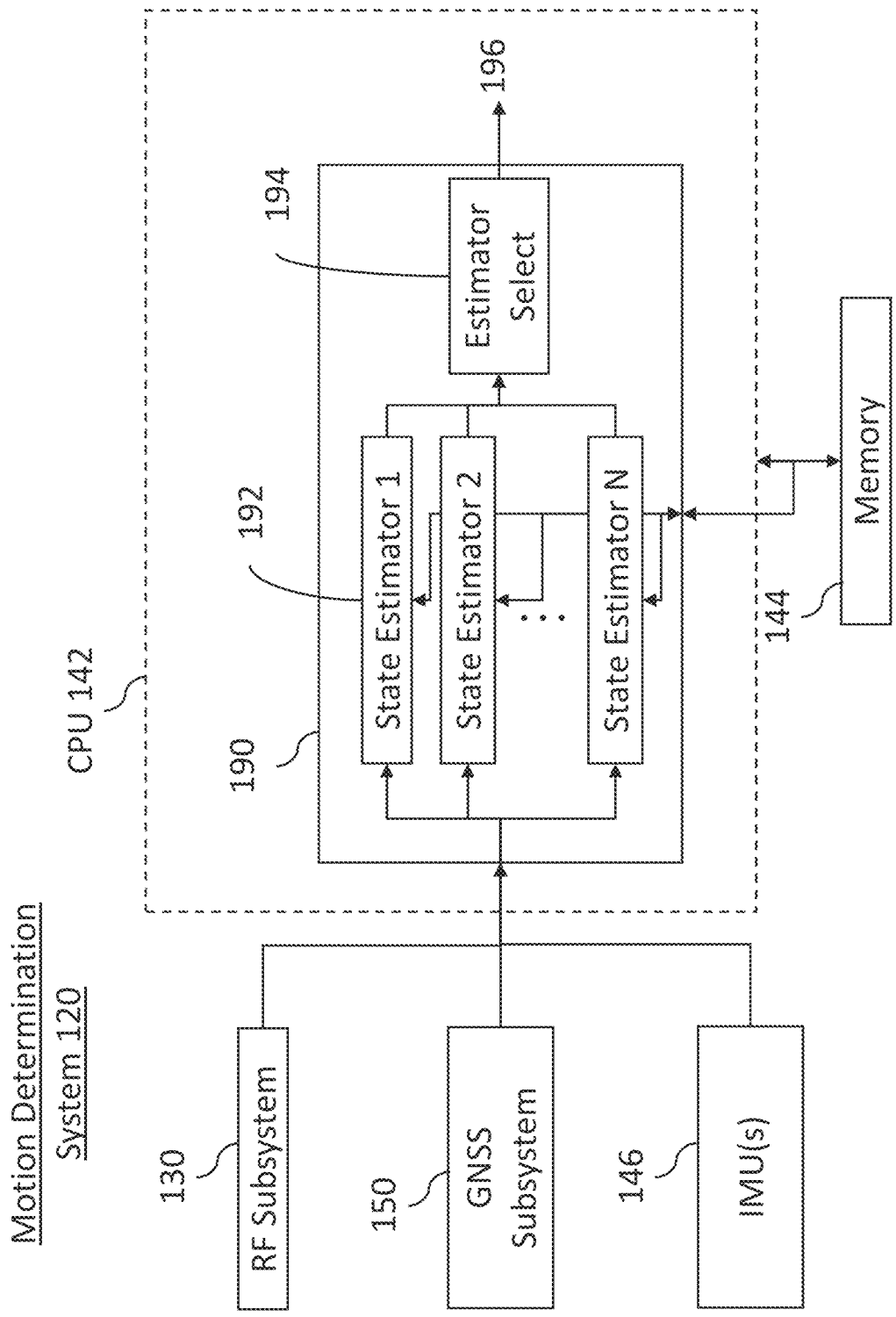
FIG. 14 is a drawing of illustrative components of a system for determining motion characteristics of a train, including one or more processor(s) 142 configured to execute a recursive state estimator bank 190, in accordance with some embodiments of the technology described herein.

FIG. 14 is a drawing of illustrative components of the system 120 for determining motion characteristics of a train, including one or more processor(s) 142 configured to execute a recursive state estimator bank 190, in accordance with some embodiments of the technology described herein. In some embodiments, recursive state estimator bank 190 may include one or more recursive state estimators 192 configured to track estimated motion and/or motion characteristics of the train over time and a recursive state estimator selector 194 configured to select a subset of the motion and/or motion determination characteristics from recursive state estimator(s) 192 as one or more outputs 196. In some embodiments, processor(s) 142 may be configured to determine motion and/or motion characteristics of the train using output(s) 196.

In some embodiments, recursive state estimators 192 may include one or more linear recursive state estimators, such as Kalman filters and/or Kalman smoothers. Alternatively or additionally, recursive state estimators 192 may include one or more non-linear recursive state estimators, such as extended Kalman filters, extended Kalman smoothers, unscented Kalman filters, and/or unscented Kalman smoothers, Monte-Carlo-based recursive state estimators such as particle filters, Markov chain Monte-Carlo filters, sequential importance sampling-based filters, and/or any other suitable stochastic simulation methods. In some embodiments, by including one or more recursive state estimators 192, recursive state estimator bank 190 is itself a recursive state estimator.

In some embodiments, processor(s) 142 may be configured to execute recursive state estimator bank 190 to determine motion characteristics of a train using observations from one or more modalities of motion determination system 120. For example, as shown in FIG. 14, processor(s) 142 may be configured to receive and provide range data from RF subsystem 130, GNSS data from GNSS subsystem 150, and/or IMU data from IMU(s) 146 as input(s) to recursive state estimator bank 190. In some embodiments, the observations may include one or more distances observed between RF subsystem 130 and one or more anchor nodes 102, one or more positions and/or velocities observed using GNSS signals received by GNSS subsystem 150, and/or one or more accelerations observed using IMU(s) 146. In some embodiments, observations received by processor(s) 142 may further include sensor information, such as indications of which GNSS satellites transmitted the signals from which the GNSS data was obtained, which anchor nodes RF subsystem 130 interacted with to obtain the range data, and/or which IMU(s) 146 produced the IMU data.

In some embodiments, processor(s) 142 may be configured to receive observations that include geographic positions in 3D space, integrate the observed geographic positions to geographic positions along the geometry of the track, and/or convert the geographic positions along the geometry of the track to corresponding track geometry positions stored in memory 144 to provide to recursive state estimator bank 190. In this example, recursive state estimator(s) 192 of recursive state estimator bank 190 may be configured to use track geometry points to track motion and/or motion characteristics. In some embodiments, the observations and/or integration of observations can give rise to uncertainty (e.g., covariance) to be factored in by recursive state estimator(s) 192. For instance, uncertainty for an observed position and/or velocity can be modeled using the equation below:

$$\tilde{x}_i = Hx_k + v_k = [1\ 0]x_k + v_k \quad (15)$$

where v is measurement noise having a gaussian distribution specific to the modality. In some embodiments, the variance for the measurement noise value v may be set conservatively for RF distance observations, and/or may factor in dilution-of-precision based on the along-track component of the measured distance to the anchor node, such as due to distance being taken along a direction that is perpendicular or close to perpendicular with the track geometry. Alternatively or additionally, a different measurement noise value v may be used for observations made using different anchor nodes. In some embodiments, when $x_k$ includes an observed position, the above equation may be modified to incorporate along-track velocity when provided by a velocity sensing modality (e.g., GNSS subsystem 150), such as by setting $H=[1\ 0]^T$ and using measurement noise v specific to the velocity sensing modality. Alternatively or additionally, uncertainty for observed position and velocity may be modeled together, such as by setting H as the identity matrix and replacing v with a column vector of uncertainties for the corresponding observations.

In some embodiments, acceleration measurements from IMU(s) 142 may be projected along the geometry of the track using the following equation:

$$^t a \approx {^t_s}R({^s}\tilde{a} - ({_w^s}R{^w}g)) \quad (16)$$

where $^t a$ is the acceleration of the train in the frame of the track geometry, $_s^t R$ is the relative orientation from the frame of IMU(s) 146 to the frame of the track geometry, $^w g$ is the gravity vector, $_w^s R$ is the relative orientation from the frame of the gravity vector to the frame of IMU(s) 146, and $^s a$ is the acceleration in the frame of IMU(s) 146 given by the following equation:

$$^s\tilde{a} = [^s\tilde{a}_x\ ^s\tilde{a}_y\ ^s\tilde{a}_z]^T \quad (17)$$

where $^s\tilde{a}_x$, $^s\tilde{a}_y$, and $^s\tilde{a}_z$ are sensed accelerations in three orthogonal directions (e.g., front to back of the train, left to right of the train, and up and down with respect to the train). It should be appreciated that offsets, such as distances between IMU(s) 142 and other modalities (e.g., antennas of RF subsystems and/or GNSS components) should be taken into account when integrating such data into the along track frame. Moreover, uncertainties in the gravity vector and/or relative orientation components should be incorporated into associated observational uncertainties provided to the recursive state estimator bank 190.

It should be appreciated that, in some embodiments, the processor(s) 142 may be alternatively or additionally configured to convert and/or integrate observations with the geometry of the train track using recursive state estimators 192, as embodiments are not so limited.

In some embodiments, processor(s) 142 may be configured to filter out at least some received observations from reaching recursive state estimator(s) 192. For example, processor(s) 142 may be configured to perform filtering in response to converting observations to the track geometry and determining that an observation is inconsistent with the orientation and/or direction of train motion and/or visibility of sensors onboard the train. For instance, the orientation of the train may indicate that an anchor node that contributed to a pair of observed positions along the track geometry would not be RF visible to and/or from an RF subsystem onboard the train at one of the observed positions (e.g., as shown in FIG. 10). In response, processor(s) 142 may be configured to filter out that observed position rather than providing it to recursive state estimator(s) 192. As another example, an observed position may be filtered out when inconsistent with the track on which the train is traveling, such as in embodiments in which the track on which the train is traveling is fixed rather than estimated by the recursive state estimator(s) 192. As yet another example, an observed position may be filtered out when signals (e.g., RF and/or GNSS) used to observe the position have an SNR below an appropriate threshold. In some embodiments, filtering observations reduce the computational load on recursive state estimator bank 190.

In some embodiments, processor(s) 142 may be configured to execute recursive state estimator(s) 192 of recursive state estimator bank 190 to track motion and/or motion characteristics of the train based on received observations. For example, a recursive state estimator 192 may be configured to track the position, velocity, and/or acceleration of the train and/or associated modality biases (e.g., gyroscope biases) based on the observations. In some embodiments, a recursive state estimator may be configured to associate an anchor node with each observation provided by that anchor node.

In one implementation, a recursive state estimator 192 may apply a constant velocity model to track motion and/or motion characteristics of the train. For instance, the model may be given by the equation below:

$$x_{k+1} = \Phi x_k + \Gamma \omega_k = \begin{bmatrix} 1 & \tau \\ 0 & 1 \end{bmatrix} x_k + \tau \begin{bmatrix} \frac{1}{2}\tau \\ 1 \end{bmatrix} \omega_k \quad (18)$$

where $x_k$ is a column vector having position as the first component and velocity as the second component, $\omega_k$ is white noise acceleration having a gaussian distribution dependent on process noise tuned to maximum acceleration expected to be experienced, and $\tau$ is a timestep between states.

In some embodiments, acceleration measurements may be incorporated into the constant velocity model by replacing the $\omega_k$ term with $a_k+\omega_k$, where $a_k$ is the acceleration ${}^t a_x$ along the track in the frame of the track geometry at time $t=t_k$.

In the same or another implementation, a recursive state estimator 192 may apply a constant acceleration model to track motion and/or motion characteristics of the train. For instance, the model may be given by the equation below:

$$x_{k+1} = \Phi x_k + \Gamma \omega_k = \begin{bmatrix} 1 & \tau & \frac{1}{2}\tau^2 \\ 0 & 1 & \tau \\ 0 & 0 & 1 \end{bmatrix} x_k + \begin{bmatrix} \frac{1}{2}\tau^2 \\ \tau \\ 1 \end{bmatrix} \omega_k \quad (19)$$

where $\omega_k$ is the sum of white noise acceleration w and acceleration from IMU(s) 146 taken along the geometry of the train track. In some embodiments, acceleration measurements may be processed as measurement updates using $H=[0\ 0\ 1]^T$. For example, acceleration measurements may be received from one or more IMU(s) when no position measurements are received, such as when a train is traveling in a tunnel out of visibility of satellites and in a region of the tunnel where the train is also out of visibility of any anchor nodes.

In the same or another implementation, a recursive state estimator 192 may apply a constant jerk model to track motion and/or motion characteristics of the train. For instance, the model may be given by the equation below:

$$x_{k+1} = \Phi x_k + \Gamma \omega_k = \begin{bmatrix} 1 & \tau & \frac{1}{2}\tau^2 & \frac{1}{6}\tau^3 \\ 0 & 1 & \tau & \frac{1}{2}\tau^2 \\ 0 & 0 & 0 & \tau \\ 0 & 0 & 0 & 1 \end{bmatrix} x_k + \begin{bmatrix} \frac{1}{6}\tau^3 \\ \frac{1}{2}\tau^2 \\ \tau \\ 1 \end{bmatrix} \omega_k \quad (20)$$

In some embodiments, acceleration measurements may be processed as measurement updates using $H=[0\ 0\ 1\ 0]^T$.

In some embodiments, process noise variance (e.g., $Q=\Gamma q^2 \Gamma^T$) that is set with a high q value takes into account the limited accuracy that is inherent to the assumptive model used (e.g., constant velocity) as an approximation rather than a perfect reflection of real-world physics. In some embodiments, process noise variance that is set with a low q value provides low-latency estimations, although such estimations may be less accurate in some circumstances than when a high q value is used. In this respect, selection of an appropriate q value may be a tradeoff between accuracy and computational latency. In some embodiments, q values may be selected to obtain a desired level of accuracy with an acceptable amount of expected latency for the particular application.

In some embodiments, a recursive state estimator 192 may alternatively or additionally incorporate the orientation and/or direction of movement of the train. For example, the orientation and/or direction of movement of the train may be estimated as in one of two directions (e.g., forward and backward). In some cases, the orientation and/or direction of motion may be estimated even when the track is designated for one-way travel, as doing so facilitates determination of whether a train is oriented and/or moving in an improper direction (e.g., rolling backwards downhill). Although it should be appreciated that, in some embodiments, the orientation and/or direction of movement of the train and the track on which the train is estimated to be traveling may be fixed in the recursive state estimator 192 and not subject to change upon receiving updated observations, depending on the particular application.

In some embodiments, a recursive state estimator 192 may alternatively or additionally incorporate the track and/or track segment in which the train is estimated to be traveling. For example, one or more recursive state estimators 192 may estimate which track the train is traveling on as part of motion estimation. Alternatively, one or more recursive state estimators 192 may be fixed to a track rather than estimating the track on which the train is traveling. In some embodiments, when the train moves from one segment to another segment of track (e.g., an estimated track or a track to which the estimator is fixed), a recursive state estimator 192 may be configured to continue to estimate motion of the train in the new track segment using estimates from the previous track segment. In other embodiments, when the train moves from one segment to another segment, a previously accurate recursive state estimator 192 may become inaccurate due to only providing estimates in the previous segment of track and another (e.g., newer) recursive state estimator 192 may provide more accurate estimations in the new segment of track.

In some embodiments, processor(s) 142 may be configured to generate and/or update recursive state estimator(s) 192 of recursive state estimator bank 190 using observations received from one or more modalities of motion determination system 120. For example, processor(s) 142 may be configured to determine whether a received observation is compatible with motion and/or motion characteristic states tracked by recursive state estimator(s) 192 of recursive state estimator bank 190 and, if so, update the state(s) of the applicable recursive state estimator(s) 192. In this example, processor(s) 142 may be configured to update only one or more recursive state estimators 192 that are compatible with the observation, and/or generate a new recursive state estimator 192 based on the observation if no existing recursive state estimator(s) 192 are compatible with the received observation. For instance, processor(s) 142 may be configured initialize the recursive state estimator(s) 192 to an initial state and/or update the state based on the received observation.

In some embodiments, processor(s) 142 may be configured to determine whether a received observation is compatible with a recursive state estimator 192 by determining if the observation (e.g., an observed position) is consistent with one or more previous estimations (e.g., a previously estimated position, velocity, and acceleration). As one example, the observed position may be within a predefined range of positions that would be likely and/or expected based on a measure of consistency (e.g., Euclidean distance, covariance weighted distance, and/or other suitable distance(s)) with respect to the previous estimation(s). As another example, the processor(s) may be configured to determine whether the observation would result in a current and/or past estimate violating other constraints, such as indicating that an observed distance was received using an anchor node beyond the RF visible range of RF subsystem 130, an observed position is not confined to the geometry of the train track, and/or the observed position was received via GNSS subsystem 150 while outside the RF visible range of any satellites.

In some embodiments, processor(s) 142 may be configured to determine, for a recursive state estimator 192, how many anchor nodes have provided observations that the recursive state estimator 192 has accepted. For example, where a recursive state estimator 192 rejects observations from several anchor nodes and instead relies on a relatively small number of anchor nodes for its estimations, the resulting estimations may be inaccurate. At the same time, some anchor nodes may not be RF visible to antennas onboard the train, and thus an accurate recursive state estimator 192 may still provide accurate estimations where a majority of anchor nodes contribute to observations accepted by the recursive state estimator 192.

In some embodiments, processor(s) 142 may be configured to discard one or more recursive state estimators 192 if too few received observations are compatible with the recursive state estimator(s) 192. For example, the processor(s) 142 may be configured to determine, following a predefined period of time since a recursive state estimator 192 was generated, that fewer than a predefined amount of received observations were determined to be compatible with the recursive state estimator 192. As another example, the processor(s) 142 may be configured to determine that longer than a predefined period of time has elapsed since a received observation was determined to be compatible with the recursive state estimator 192. As yet another example, the processor(s) 142 may be configured to determine that the recursive state estimator 192 has accepted observations contributed to by too few anchor nodes, such as less than a predefined percentage of anchor nodes that have contributed to a pre-defined number of recent observations and/or to observations received over a predefined period of time.

In some embodiments, the processor(s) 142 may be configured to generate and/or update recursive state estimators 192 for multiple observed positions along the geometry of the train track derived from a distance measurement generated using an anchor node, and the use of multiple recursive state estimators 192 may facilitate rejecting at least one of the observed positions. As one example, one of the recursive state estimators 192 tracking one of the observed positions may be discarded, indicating that the observed position being tracked was likely inaccurate. As another example, no existing recursive estimator(s) 192 may be compatible with one of the observed positions, whereas several recursive estimators 192 may be compatible with the other of the observed positions, alternatively or additionally indicating that the incompatible observed position was likely inaccurate.

In some embodiments, estimator selector 194 may be configured to select one or more recursive state estimators 192 to provide output(s) 196 based on the recursive state estimator(s) having a lowest measure of consistency among estimations. Alternatively or additionally, estimator selector 194 may be configured to select the recursive state estimator(s) 192 having a highest rate of compatibility with received observations. In some embodiments, estimator selector 194 may be configured to only provide output(s) 196 after a predefined number of observations have been received and used to generate and/or update recursive state estimator(s) 192, and/or after at least a predefined number of received observations have been determined to be compatible with at least one recursive state estimator 192, and/or after observations to which at least a predefined number and/or percentage of anchor nodes contributed have been accepted by at least one recursive state estimator 192 over a predefined period of time.

Figure 15:
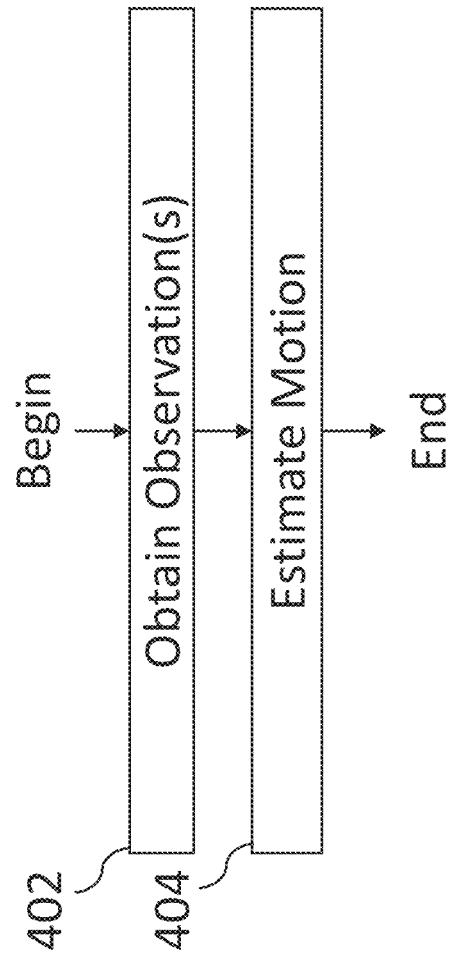
FIG. 15 is a drawing of an illustrative method 400 for determining motion characteristics of a train traveling along a train track, in accordance with some embodiments of the technology described herein.

FIG. 15 is a drawing of an illustrative method 400 for determining motion characteristics of a train traveling along a train track, in accordance with some embodiments of the technology described herein. In some embodiments, method 400 may be performed using motion determination systems 120 described herein. In FIG. 15, the method 400 includes obtaining one or more observations of motion (e.g., observed position, velocity, and/or acceleration) from one or more motion determination modalities (e.g., RF, GNSS, and/or IMU) of a motion determination system at step 402 and estimating motion of the train, by at least one processor of the motion determination system, at step 404.

In some embodiments, obtaining the observation(s) of motion at step 402 may include processor(s) 142 of motion determination system 120 receiving range data from RF subsystem 130 (e.g., including an arrival time of an RF signal and/or a distance obtained using the arrival time), an observed position and/or velocity from GNSS subsystem 150, and/or an observed acceleration from IMU(s) 146. For example, the range data from RF subsystem 130 may be generated using one or more RF signals exchanged between RF subsystem 130 and one or more anchor nodes 102. As another example, the observed position and/or velocity (e.g., in 3D space) from GNSS subsystem 150 may be generated using one or more GNSS signals received by GNSS subsystem 150. As yet another example, the observed acceleration from IMU(s) 146 may be generated using one or more accelerations detected by IMU(s) 146. In some embodiments, processor(s) 142 may determine one or more observed positions of the train along the train track using the range data from RF subsystem 130 and/or the position(s) from GNSS subsystem 150. For example, processor(s) 142 may convert (e.g., integrate) the range data (e.g., distance and/or arrival time(s)) and/or GNSS position(s) with the geometry of the train track using one or more representations of the geometry of the train track stored in memory 144, such as described herein including in connection with FIGS. 12A-12C.

In some embodiments, estimating motion of the train at step 404 may include processor(s) 142 using the observation(s) of motion obtained at step 402 to estimate the position, velocity, and/or acceleration of the train. For example, processor(s) 142 may generate, update, and/or constrain estimated motion in a graph (e.g., graph 300 in FIG. 13) based on the observed position, velocity, and/or acceleration obtained at step 402. Alternatively or additionally, processor(s) 142 may provide the observation(s) of motion to one or more recursive state estimators (e.g., in recursive estimator bank 190 in FIG. 14). In some embodiments, processor(s) 142 may determine the position, velocity, and/or acceleration of the train based on an output of the recursive state estimator(s) (e.g., output(s) 196 in FIG. 14). In some embodiments, the processor(s) may filter out observation(s) (e.g., prior to generating and/or updating a graph or providing to recursive state estimator(s)) that would be inconsistent with RF and/or GNSS visibility.

Figure 16:
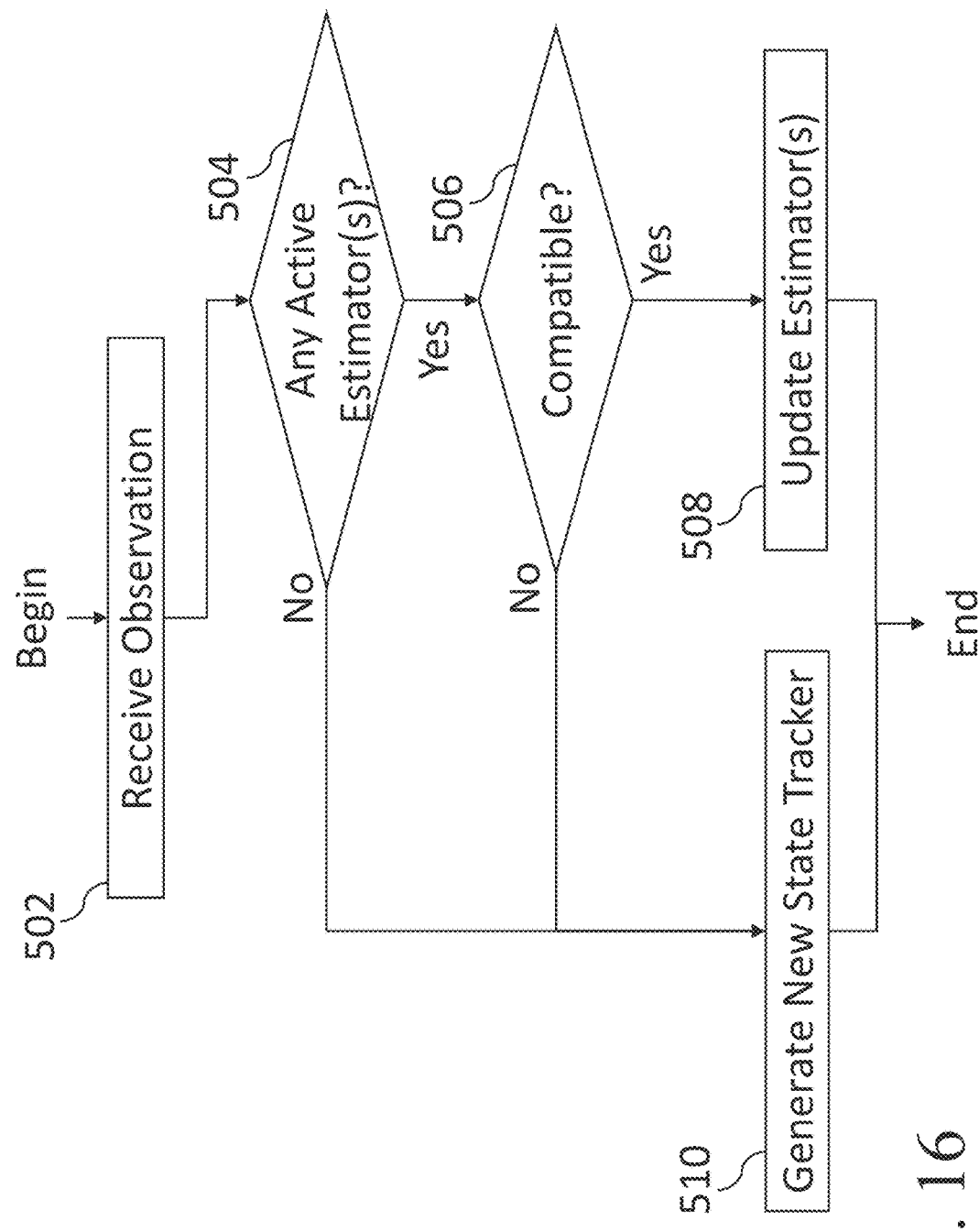
FIG. 16 is a drawing of an illustrative method 500 for determining motion characteristics of a train traveling along a train track, in accordance with some embodiments of the technology described herein.

FIG. 16 is a drawing of an illustrative method 500 for determining motion characteristics of a train traveling along a train track, in accordance with some embodiments of the technology described herein. In some embodiments, method 500 may be performed using motion determination systems 120 described herein, such as using a recursive state estimator bank executed by processor(s) 142. As shown in FIG. 16, method 500 includes receiving an observation of motion at step 502, determining whether any recursive state estimators are active at step 504, if so, determining whether any active recursive state estimators are compatible with the observation at step 506, and if so, updating the applicable recursive state estimators at step 508. If no recursive state estimators are determined to be active at step 504, or if no active recursive state estimators are compatible with the observation, method 500 proceeds to generating a new recursive state estimator at step 510.

In some embodiments, receiving an observation of motion at step 502 may include processor(s) 142 receiving an observed position, velocity, and/or acceleration of the train from RF subsystem 130, GNSS subsystem 150, and/or IMU(s) 146, which may be performed in the manner described herein in connection with step 402 of method 400.

In some embodiments, determining whether any recursive state estimators are active at step 504 may include processor(s) 142 determining whether any recursive state estimators 192 of recursive state estimator bank 190 are tracking the estimated position, velocity, and/or acceleration of the train based on one or more previously obtained observations of motion.

In some embodiments, determining whether any active recursive state estimators are compatible with the observation at step 506 may include processor(s) 142 determining if the observation (e.g., an observed position) is consistent with one or more previous estimations (e.g., a previously estimated position, velocity, and acceleration) of the active recursive state estimator(s). As one example, the observed position may be within a predefined range of positions that would be likely and/or expected based on a measure of consistency with respect to the previous estimation(s). As another example, the processor(s) may determine whether the observation would result in a current and/or past estimate violating other constraints, such as indicating that a position was observed using an anchor node beyond the RF visible range of RF subsystem 130, an observed position is not confined to the geometry of the train track, and/or the observed position was received via GNSS subsystem 150 while outside the RF visible range of any satellites. As yet another example, the processor(s) may determine whether the observation is inconsistent with a track segment, track, orientation, and/or direction of travel of one or more previous estimates.

In some embodiments, updating the applicable recursive state estimators at step 508 may include processor(s) 142 providing the observation to the recursive state estimator(s) to update the estimated position, velocity, and/or acceleration tracked by the recursive state estimator(s), such as described herein in connection with FIG. 14.

In some embodiments, generating a new recursive state estimator at step 510, following determinations that no active recursive state estimators are compatible with the observation, may include processor(s) 142 executing a new recursive state estimator to track the observation, such as described herein in connection with FIG. 14.

Figure 17:
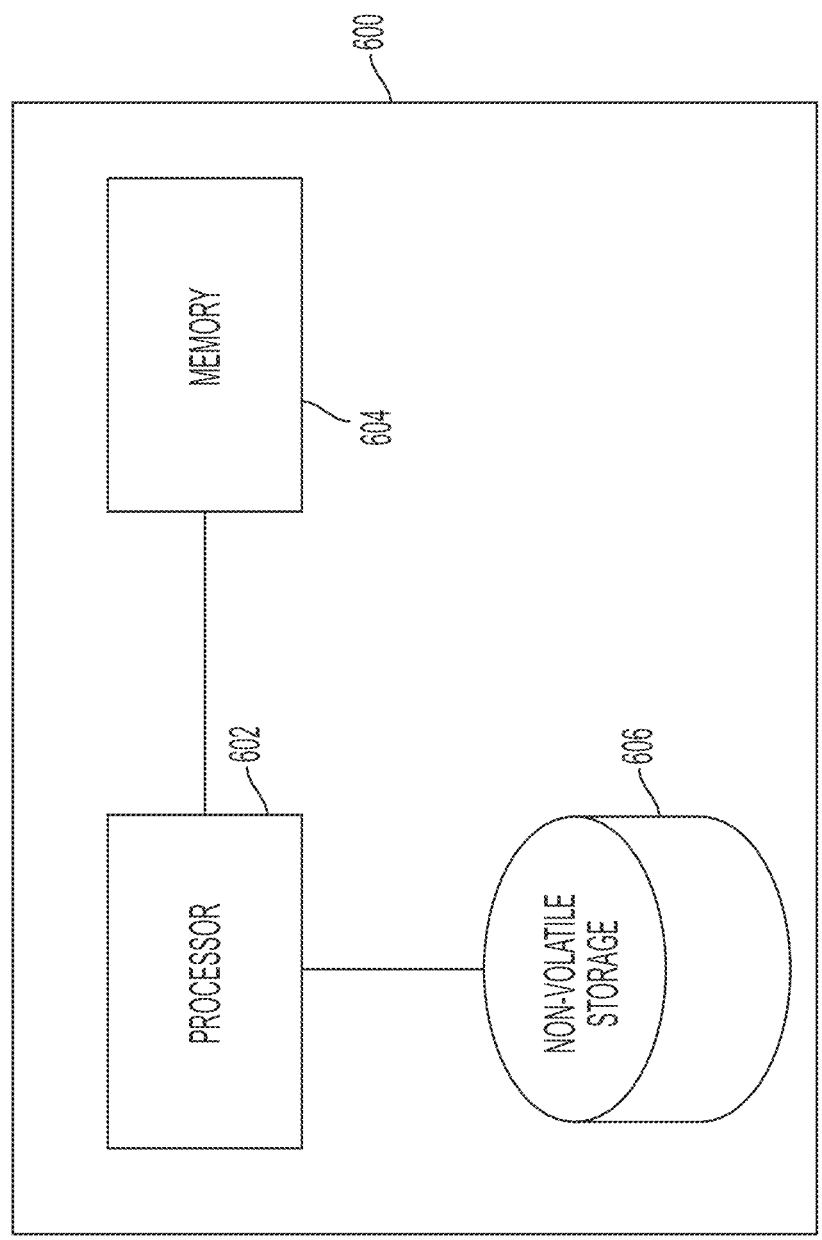
FIG. 17 is a drawing of an illustrative computer system 600 on which some embodiments described herein may be implemented.

FIG. 17 is a diagram of an illustrative computer system on which embodiments described herein may be implemented. An illustrative implementation of a computer system 600 that may be used in connection with any of the embodiments of the disclosure provided herein is shown in FIG. 17. For example, the processes described herein with reference to FIGS. 9-16 may be implemented using computer system 600. As another example, the computer system 600 may be used to train and/or use any of the neural network statistical models described herein. The computer system 600 may include one or more processors 602 and one or more articles of manufacture that comprise non-transitory computer-readable storage media (e.g., memory 604 and one or more non-volatile storage media 606). The processor 602 may control writing data to and reading data from the memory 604 and the non-volatile storage device 606 in any suitable manner, as the aspects of the disclosure provided herein are not limited in this respect. To perform any of the functionality described herein, the processor 602 may execute one or more processor-executable instructions stored in one or more non-transitory computer-readable storage media (e.g., the memory 604), which may serve as non-transitory computer-readable storage media storing processor-executable instructions for execution by the processor 602.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor, but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately" and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

What is claimed is:

1. A system for determining a position of a train traveling along a train track, the system comprising:
at least one positioning device selected from the group consisting of:
at least one radio-frequency ultra-wideband (UWB) antenna configured to transmit and/or receive at least one UWB signal to and/or from at least one anchor node positioned proximate the train track; and
at least one global navigation satellite system (GNSS) receiver configured to receive at least one GNSS signal,
wherein the at least one positioning device is configured to determine at least one observation of the train along the train track using the at least one UWB signal and/or the at least one GNSS signal; and
at least one processor configured to:
determine a plurality of estimated positions of the train using:
information specifying a geometry of the train track; and
the at least one observation of the train; and
select the position of the train from among the plurality of estimated positions.

2. The system of claim 1, wherein the at least one processor is configured to determine the plurality of estimated positions of the train along the train track by executing a recursive state estimator and select the position of the train using an output from the recursive state estimator.

3. The system of claim 2, wherein the at least one processor is configured to:
execute a bank of recursive state estimators that includes the recursive state estimator and select the position of the train from among a plurality of outputs from the bank of recursive state estimators; and
determine the plurality of estimated positions of the train along the train track at least in part by providing the at least one observation of the train as input to a plurality of recursive state estimators of the bank of recursive state estimators and obtaining the plurality of estimated positions of the train as outputs from the plurality of recursive state estimators.

4. The system of claim 3, wherein:
the bank of recursive state estimators comprises a bank of Kalman filters;
the at least one observation of the train comprises a first observed train position; and
the at least one processor is configured to determine the plurality of estimated positions of the train along the train track at least in part by:
determining whether to update any of the Kalman filters in the bank of Kalman filters using the first observed train position; and
when the at least one processor determines that at least one Kalman filter in the bank of Kalman filters is to be updated, providing the first observed train position as input to the at least one Kalman filter and updating at least one respective state of the at least one Kalman filter using the first observed train position.

5. The system of claim 4, wherein when the at least one processor determines not to update any of the Kalman filters in the bank of Kalman filters using the first observed train position, the at least one processor is configured to initialize a new Kalman filter in the bank of Kalman filters.

6. The system of claim 5, wherein:
the bank of Kalman filters comprises a first Kalman filter, and
the at least one processor is configured to:
determine whether to update any of the Kalman filters in the bank of Kalman filters at least in part by determining whether to update the first Kalman filter using the first observed train position, and
determine whether to update the first Kalman filter at least in part by determining a measure of consistency between a position of the train estimated by the first Kalman filter and the first observed train position.

7. A method of determining a position of a train traveling along a train track, the method comprising:
determining, by at least one positioning device, at least one observation of the train along the train track,
wherein the at least one positioning device is selected from the group consisting of:
at least one radio-frequency ultra-wideband (UWB) antenna configured to transmit and/or receive at least one UWB signal to and/or from at least one anchor node positioned proximate the train track; and
at least one global navigation satellite system (GNSS) receiver configured to receive at least one GNSS signal, and
wherein determining the at least one observation of the train comprises using the at least one UWB signal and/or the at least one GNSS signal;
determining, by at least one processor, a plurality of estimated positions of the train using:
information specifying a geometry of the train track; and
the at least one observation of the train; and
selecting, by the at least one processor, the position of the train from among the plurality of estimated positions.

8. The method of claim 7, wherein determining the plurality of estimated positions of the train along the train track comprises executing a recursive state estimator and selecting the position of the train comprises using an output from the recursive state estimator.

9. The method of claim 8, wherein:
executing the recursive state estimator comprises executing a bank of recursive state estimators that includes the recursive state estimator;
selecting the position of the train comprises using the output from among a plurality of outputs from the bank of recursive state estimators; and
determining the plurality of estimated positions of the train comprises providing the at least one observation of the train as input to a plurality of recursive state estimators of the bank of recursive state estimators and obtaining the plurality of estimated positions of the train as outputs from the plurality of recursive state estimators.

10. The method of claim 9, wherein:
the bank of recursive state estimators comprises a bank of Kalman filters;
the at least one observation of the train comprises a first observed train position; and determining the plurality of estimated positions of the train along the train track comprises:
  determining whether to update any of the Kalman filters in the bank of Kalman filters using the first observed train position; and
  when the at least one processor determines that at least one Kalman filter in the bank of Kalman filters is to be updated, providing the first observed train position as input to the at least one Kalman filter and updating at least one respective state of the at least one Kalman filter using the first observed train position.

11. The method of claim 10, further comprising, when the at least one processor determines not to update any of the Kalman filters in the bank of Kalman filters using the first observed train position, initializing a new Kalman filter in the bank of Kalman filters.

12. The method of claim 11, wherein:
the bank of Kalman filters comprises a first Kalman filter;
determining whether to update any of the Kalman filters in the bank of Kalman filters comprises determining whether to update the first Kalman filter using the first observed train position, and
determining whether to update the first Kalman filter comprises determining a measure of consistency between a position of the train estimated by the first Kalman filter and the first observed train position.

13. A non-transitory computer-readable medium having instructions stored thereon that, when executed by at least one processor, cause the at least one processor to perform a method of determining a position of a train traveling along a train track, the method comprising:
determining, by at least one positioning device, at least one observation of the train along the train track,
wherein the at least one positioning device is selected from the group consisting of:
  at least one radio-frequency ultra-wideband (UWB) antenna configured to transmit and/or receive at least one UWB signal to and/or from at least one anchor node positioned proximate the train track; and
  at least one global navigation satellite system (GNSS) receiver configured to receive at least one GNSS signal, and
wherein determining the at least one observation of the train comprises using the at least one UWB signal and/or the at least one GNSS signal;
determining, by at least one processor, a plurality of estimated positions of the train using:
  information specifying a geometry of the train track; and
  the at least one observation of the train; and
selecting, by the at least one processor, the position of the train from among the plurality of estimated positions.

14. The non-transitory computer-readable medium of claim 13, wherein determining the plurality of estimated positions of the train along the train track comprises executing a recursive state estimator and selecting the position of the train comprises using an output from the recursive state estimator.

15. The non-transitory computer-readable medium of claim 14, wherein:

executing the recursive state estimator comprises executing a bank of recursive state estimators that includes the recursive state estimator;
selecting the position of the train comprises using the output from among a plurality of outputs from the bank of recursive state estimators; and
determining the plurality of estimated positions of the train comprises providing the at least one observation of the train as input to a plurality of recursive state estimators of the bank of recursive state estimators and obtaining the plurality of estimated positions of the train as outputs from the plurality of recursive state estimators.

16. The non-transitory computer-readable medium of claim 15, wherein:
the bank of recursive state estimators comprises a bank of Kalman filters;
the at least one observation of the train comprises a first observed train position; and
determining the plurality of estimated positions of the train along the train track comprises:
  determining whether to update any of the Kalman filters in the bank of Kalman filters using the first observed train position; and
  when the at least one processor determines that at least one Kalman filter in the bank of Kalman filters is to be updated, providing the first observed train position as input to the at least one Kalman filter and updating at least one respective state of the at least one Kalman filter using the first observed train position.

17. The non-transitory computer-readable medium of claim 16, wherein:
the bank of Kalman filters comprises a first Kalman filter;
determining whether to update any of the Kalman filters in the bank of Kalman filters comprises determining whether to update the first Kalman filter using the first observed train position, and
determining whether to update the first Kalman filter comprises determining a measure of consistency between a position of the train estimated by the first Kalman filter and the first observed train position.

18. The system of claim 2, further comprising:
at least one inertial measurement unit (IMU) configured to generate IMU data responsive to motion of the train along the train track,
wherein the at least one processor is further configured to determine at least some of the plurality of estimated positions of the train using the IMU data.

19. The method of claim 8, wherein:
determining at least some of the plurality of estimated positions of the train comprises using inertial measurement unit (IMU) data generated by at least one IMU responsive to motion of the train along the train track.

20. The non-transitory computer-readable medium of claim 14, wherein: determining at least some of the plurality of estimated positions of the train comprises using inertial measurement unit (IMU) data generated by at least one IMU responsive to motion of the train along the train track.

* * * * *